(12) United States Patent
Gordon et al.

(10) Patent No.: US 10,782,657 B2
(45) Date of Patent: Sep. 22, 2020

(54) SYSTEMS AND METHODS OF GESTURAL INTERACTION IN A PERVASIVE COMPUTING ENVIRONMENT

(71) Applicant: Ultrahaptics IP Two Limited, Bristol OT (GB)

(72) Inventors: Robert Samuel Gordon, San Bruno, CA (US); Maxwell Sills, San Francisco, CA (US); Paul Alan Durdik, Foster City, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 600 days.

(21) Appl. No.: 14/625,635

(22) Filed: Feb. 19, 2015

(65) Prior Publication Data
US 2015/0346701 A1  Dec. 3, 2015

Related U.S. Application Data

(60) Provisional application No. 62/003,298, filed on May 27, 2014.

(51) Int. Cl.
*G05B 15/02* (2006.01)
*H04L 12/28* (2006.01)

(52) U.S. Cl.
CPC .......... *G05B 15/02* (2013.01); *H04L 12/2803* (2013.01); *H04L 12/2809* (2013.01); *G05B 2219/2642* (2013.01)

(58) Field of Classification Search
CPC ............ G05B 15/02; G05B 2219/2642; H04L 12/2803; H04L 12/2809
See application file for complete search history.

(56) References Cited

U.S. PATENT DOCUMENTS 6,002,808 A    12/1999  Freeman
6,421,453 B1    7/2002  Kanevsky et al.
(Continued)

FOREIGN PATENT DOCUMENTS

CN    101124534 A    2/2008
CN    102184014 A    9/2011
(Continued)

OTHER PUBLICATIONS

Solanki, Utpal V. and Nilesh H. Desai. "Hand Gesture Based Remote Control for Home Appliances: Handmote," 2011 World Congress on Information and Communication Technologies, Mumbai, (2011), p. 419-423.*

(Continued)

*Primary Examiner* — Elizabeth H Rosen
(74) *Attorney, Agent, or Firm* — Haynes Beffel & Wolfeld LLP; Paul A. Durdik; Andrew L. Dunlap

(57) ABSTRACT

The technology disclosed relates to selecting among devices room to interact with. It also relates operating a smart phone with reduced power consumption. It further relates to gesturally interacting with devices that lack gestural responsiveness. The technology disclosed also relates to distinguishing control gestures from proximate non-control gestures in a pervasive three dimensional (3D) sensory space. The technology disclosed further relates to selecting among virtual interaction modalities to interact with.

12 Claims, 48 Drawing Sheets

(56) References Cited

U.S. PATENT DOCUMENTS

| | | | |
|---|---|---|---|
| 8,542,320 B2* | 9/2013 | Berestov | H04N 21/4104 345/156 |
| 8,751,979 B1 | 6/2014 | Socha | |
| 8,781,234 B2 | 7/2014 | Zhang et al. | |
| 8,824,749 B2 | 9/2014 | Leyvand et al. | |
| 9,600,935 B2* | 3/2017 | Cohen | A63F 13/10 |
| 2007/0057764 A1* | 3/2007 | Sato | G06K 9/00006 340/5.52 |
| 2007/0203904 A1 | 8/2007 | Ren et al. | |
| 2008/0002860 A1 | 1/2008 | Super et al. | |
| 2008/0317292 A1 | 12/2008 | Baker et al. | |
| 2009/0239587 A1* | 9/2009 | Negron | G06F 3/04883 455/566 |
| 2012/0030637 A1 | 2/2012 | Dey et al. | |
| 2012/0257797 A1 | 10/2012 | Leyvand et al. | |
| 2012/0281884 A1 | 11/2012 | Whillock et al. | |
| 2013/0014052 A1* | 1/2013 | Frey | G06F 3/013 715/800 |

FOREIGN PATENT DOCUMENTS

| | | |
|---|---|---|
| CN | 102696057 A | 9/2012 |
| CN | 103090862 A | 5/2013 |

OTHER PUBLICATIONS

Franco, Michael. "Wave Your Hand to Control Smart Devices—Even if it's Out of Sight." Cnet (Feb. 28, 2014).*

Pointgrab LTD. "New Line of Acer All-in-One Devices Among the First Products to Feature PointGrab's Windows 8 Hand Gesture Control Solution," Business Wire (English), (Nov. 13, 2012).*

PCT/US2015/032705—International Preliminary Report on Patentablity dated Nov. 29, 2016, 11 page.

"EigenSolver <_MatrixType> Class Template Reference," Reference Eigen Values Module, retrieved from the internet: <http://eigen.luxfamily.org/dox/classEigen_1_1EigenSolver.html> on Mar. 12, 2015, pp. 1-8.

"Hessian Matrix of the Image," Matlab—Hessian Matrix of the Image—Stack Overflow, last edited Mar. 13, 2014, retrieved from the internet: <http://stackoverflow.com/questions/22378360/hessian-matrix-of-the-image> on Mar. 10, 2015, 3 pages.

"How Hessian Feature Detector Works?" Signal Processing Stack Exchange, last edited Oct. 2013, retrieved from the internet: <http://dsp.stackexchange.com/questions/10579/how0hessian-feature-detector-works> on Mar. 10, 2015, 3 pages.

"SVC Module," Reference, Eigen: SVC Module, retrieved from the internet: <http://eigen.luxfamily.org/dox/group_SVD_Module.html> on Mar. 12, 2015, 1 page.

Bhutami, R., "What Are the Ways of Calculating 2x2 Hessian Matrix for 2D Image of Pixel at (x,y) Position?," Quora, last updated May 2013, retrieved from the internet: <http://www.quora.com/What-are-the-ways-of-calculating-2-x-2-hessian-matrix-for-2d-image-of-pixel-at-x-y-position> on Mar. 10, 2015, 4 pages.

Grauman, K., et al., "Chapter 3—Local Features: Detection and Description," Visual Object Recognition: Synthesis Lectures on Artiticual Intelligence and Machine Learning, Apr. 2011, retrieved from the internet: <www.morganclaypool.com/doi/abs/10.2200/S00332Ed1V01Y201103AM011> on Mar. 12, 2015, pp. 1, 23-39.

Hladuvka, J., et al., "Exploiting Eigenvalues of the Hessian Matrix for Volume Decimation," CiteSeerx, Copyright 2001, retrieved from the internet: <http://citeseerx.isf.psu.edu/viewdoc/summary?doi=10.1.1.67.565> on Mar. 12, 2015, from Vienna University of Technology, 7 pages.

Rudzki, M., "Vessel Detection Method Based on Eigenvalues of Hessian Matrix and its Applicability to Airway Tree Segmentation," XI International PhD Workshop, OWD 2009, , Silesian University of Technology, Oct. 17-20, 2009, 6 pages.

ShinodaLab, "Visuo-Tactile Projector," YouTube Video, published on May 14, 2013, retrieved from the internet: <http://www.youtube.com/watch?v=Bb0hNMxxewg> on Mar. 12, 2015, 2 pages.

Shlens, J., "A Tutorial on Principal Component Analysis," Derivation, Discussion and Singular Value Decomposition, Version 1, Mar. 25, 2013, UCSD.edu, pp. 1-16.

Wikipedia, "Affine Transmation," Wikipedia—the Free Encyclopedia, last modified Mar. 5, 2015, retrieved from the internet: <http://en.wikipedia.org/w/index.php?title=Affine_transformation&oldid=650023248> on Mar. 12, 2015, 8 pages.

Wikipedia, "Axis-angle Representation," Wikipedia—the Free Encyclopedia, last modified Dec. 30, 2014, retrieved tom the Internet: <http://en.wikipedia.org/w/index.php?title=Axis-angle_representation&oldid=640273193> on Mar. 12, 2015, 5 pages.

Wikipedia, "Euclidean Group," Wikipedia—the Free Encyclopedia, last modified Feb. 24, 2015, retrieved from the internet: <http://en.wikipedia.org/w/index.php?title=Euclidean_group&oldid=648705193> on Mar. 12, 2015, 7 pages.

Wikipedia, "Multilateration," Wikipedia—the Free Encyclopedia, Nov. 16, 2012, retrieved from the internet: <http://en.wikipedia.org/w/index.php?title=Multilateration&oldid=523281858> on Mar. 12, 2015, 10 pages.

Wikipedia, "Rotation Group SO(3)," Wikipedia—the Free Encyclopedia, last modified Feb. 20, 2015, retrieved from be internet: <http://en.wikipedia.org/w/index.php?title=Rotation_group_SO(3)&oldid=648012313> on Mar. 13, 2015, 17 pages.

Wikipedia, "Rotation Matrix," Wikipedia—the Free Encyclopedia, last modified Mar. 11, 2015, retrieved from the internet: <http://en.wikipedia.org/w/index.php?title=Rotation_matrix&oldid=650875954> on Mar. 12, 2015, 21 pages.

Wikipedia, "Transformation Matrix," Wikipedia—the Free Encyclopedia, last modified Mar. 5, 2015, retrieved from the internet: <http://en.wikipedia.org/w/index.php?title=Transformation_matrix&oldid=649936175> on Mar. 12, 2015, 8 pages.

PCT/US2015/032705—Written Opinion of the ISA, dated Sep. 15, 2015, 10 pages.

U.S. Appl. No. 14/658,064—Notice of Allowance dated Feb. 17, 2017, 29 pages.

U.S. Appl. No. 15/611,784—Office Action dated Nov. 3, 2017, 27 pages.

Kanhangad, V., et al, "Combining 2D and 3D Hand Geometry Features for Biometric Verification", IEEE 2009, 6 pages.

Choras, M., et al., "Contactless Palmprint and Knuckle Biometrics for Mobile Devices", Springerlink, Dec. 8, 2009, 13 pages.

CN 201580041594.3—First Office Action dated Feb. 3, 2019, 29 pages.

U.S. Appl. No. 15/611,784—Response to Office Action dated Nov. 3, 2017, filed Mar. 5, 2018, 14 pages.

U.S. Appl. No. 15/611,784—Office Action dated Apr. 12, 2018, 16 pages.

U.S. Appl. No. 15/611,784—Response to Office Action dated Apr. 12, 2018, filed Sep. 19, 2018, 18 pages.

U.S. Appl. No. 15/611,784—Advisory Action dated Oct. 9, 2018, 6 pages.

U.S. Appl. No. 15/611,784—Office Action dated Dec. 4, 2018, 17 pages.

U.S. Appl. No. 15/611,784—Response to Office Action dated Dec. 4, 2018, filed May 6, 2019, 13 pages.

U.S. Appl. No. 15/611,784—Final Office Action dated May 31, 2019, 18 pages.

Interactive Gaming Smart Vending Machine. Silikron Smart Vending, URL: https:///www.youtube.com/watch?v=tK17sXvzLtU, Dec. 12, 2013.

* cited by examiner

2400

2500E

SYSTEMS AND METHODS OF GESTURAL INTERACTION IN A PERVASIVE COMPUTING ENVIRONMENT

FIELD OF THE TECHNOLOGY DISCLOSED

The technology disclosed relates, in general, to motion capture and gesture recognition and interpretation in a pervasive computing environment, and in particular implementations, to facilitate gestural ambient services for home automation.

PRIORITY DATA

This application claims the benefit of U.S. Provisional Patent Application No. 62/003,298, entitled, "SYSTEMS AND METHODS OF GESTURAL INTERACTION IN A PERVASIVE COMPUTING ENVIRONMENT", filed 27 May 2014. The provisional application is hereby incorporated by reference for all purposes.

INCORPORATIONS

Materials incorporated by reference in this filing include the following:

"DETERMINING POSITIONAL INFORMATION FOR AN OBJECT IN SPACE", U.S. Prov. App. No. 61/895,965, filed 25 Oct. 2013, "DRIFT CANCELATION FOR PORTABLE OBJECT DETECTION AND TRACKING", U.S. Prov. App. No. 61/938,635, filed 11 Feb. 2014, "BIOMETRIC AWARE OBJECT DETECTION AND TRACKING", U.S. Prov. App. No. 61/952,843, filed 13 Mar. 2014, "DYNAMIC USER INTERACTIONS FOR DISPLAY CONTROL", U.S. Non-Prov. application Ser. No. 14/214,336, filed 14 Mar. 2014, "RESOURCE-RESPONSIVE MOTION CAPTURE", U.S. Non-Prov. application Ser. No. 14/214,569, filed 14 Mar. 2014, and "SAFETY FOR WEARABLE VIRTUAL REALITY DEVICES VIA OBJECT DETECTION AND TRACKING", U.S. Prov. App. No. 61/981,162, filed 17 Apr. 2014.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

There has been a growing interest in developing natural interactions with electronic devices that facilitate intuitiveness and enhance user experience. For instance, a user might want to control the music volume while cooking with a free-form gesture in the air, or change the song playing on an entertainment system in the living room while cooking, or turn up the thermostat while in bed, or switch on a lamp while sitting on a couch.

Existing home automation techniques utilize conventional motion capture approaches that rely on markers or sensors worn by the occupant while executing activities and/or on the strategic placement of numerous bulky and/or complex equipment in specialized smart home environments to capture occupant movements. Unfortunately, such systems tend to be expensive to construct. In addition, markers or sensors worn by the occupant can be cumbersome and interfere with the occupant's natural movement. Further, systems involving large numbers of cameras tend not to operate in real time, due to the volume of data that needs to be analyzed and correlated. Such considerations have limited the deployment and use of motion capture technology.

Consequently, there is a need for improved techniques to capture the motion of objects in real time without attaching sensors or markers thereto and to facilitate ambient intelligence in pervasive computing environments.

SUMMARY

The technology disclosed relates to selecting among devices room to interact with by using a smart phone equipped with a motion sensory control device that detects gestures in a three dimensional (3D) sensory space, detecting one or more heterogeneous devices that accept motion control commands, detecting a gesture in the 3D sensory space and interpreting the gesture as selecting one of the heterogeneous devices, and establishing a communication channel between the smart phone and the selected device.

The technology disclosed also relates to operating a smart phone with reduced power consumption by monitoring at least one physical or environmental parameter of a smart phone equipped with a motion sensory control device that detects gestures in a three dimensional (3D) sensory space and in response to detection of a change in the physical or environmental parameter exceeding a specified threshold, automatically switching the smart phone (via the imbedded motion sensory control device) from one operation mode to another.

The technology disclosed further relates to gesturally interacting with devices that lack gestural responsiveness by supplying a gesture-based signal to a traditional device that mimics a standard input command based at least on a gesture detected and identified from a library of analogous gestures that are analogous to or correspond to control manipulations performed using standard input commands accepted by the traditional devices.

The technology disclosed also relates to distinguishing control gestures from proximate non-control gestures in a pervasive three dimensional (3D) sensory space by detecting a set of gestures performed by different users in a pervasive 3D sensory environment and identifying control gestures in the set of gestures that control responsiveness of one of more devices in the 3D sensory space by determining a dominant user from among the users based at least on one or more spatial behaviors of the users in the 3D sensory space and triggering a response to gestures performed by the dominant user without triggering a response to gestures performed by the non-dominant users.

The technology disclosed further relates to selecting among virtual interaction modalities to interact with by using a smart phone to trigger an augmented environment based on detection of an initialization signal, wherein the augmented environment includes one or more virtual interaction modalities that are integrated into an augmented rendering of physical space and accept motion control commands, detecting a gesture in the 3D sensory space using a motion sensory control device embedded in the smart phone, interpreting the gesture as selecting one of the virtual interaction modalities, and establishing a communication channel between the smart phone and the selected virtual interaction modality.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" the predecessor signal, event or value. "Responsiveness" or "dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Figure 1A:
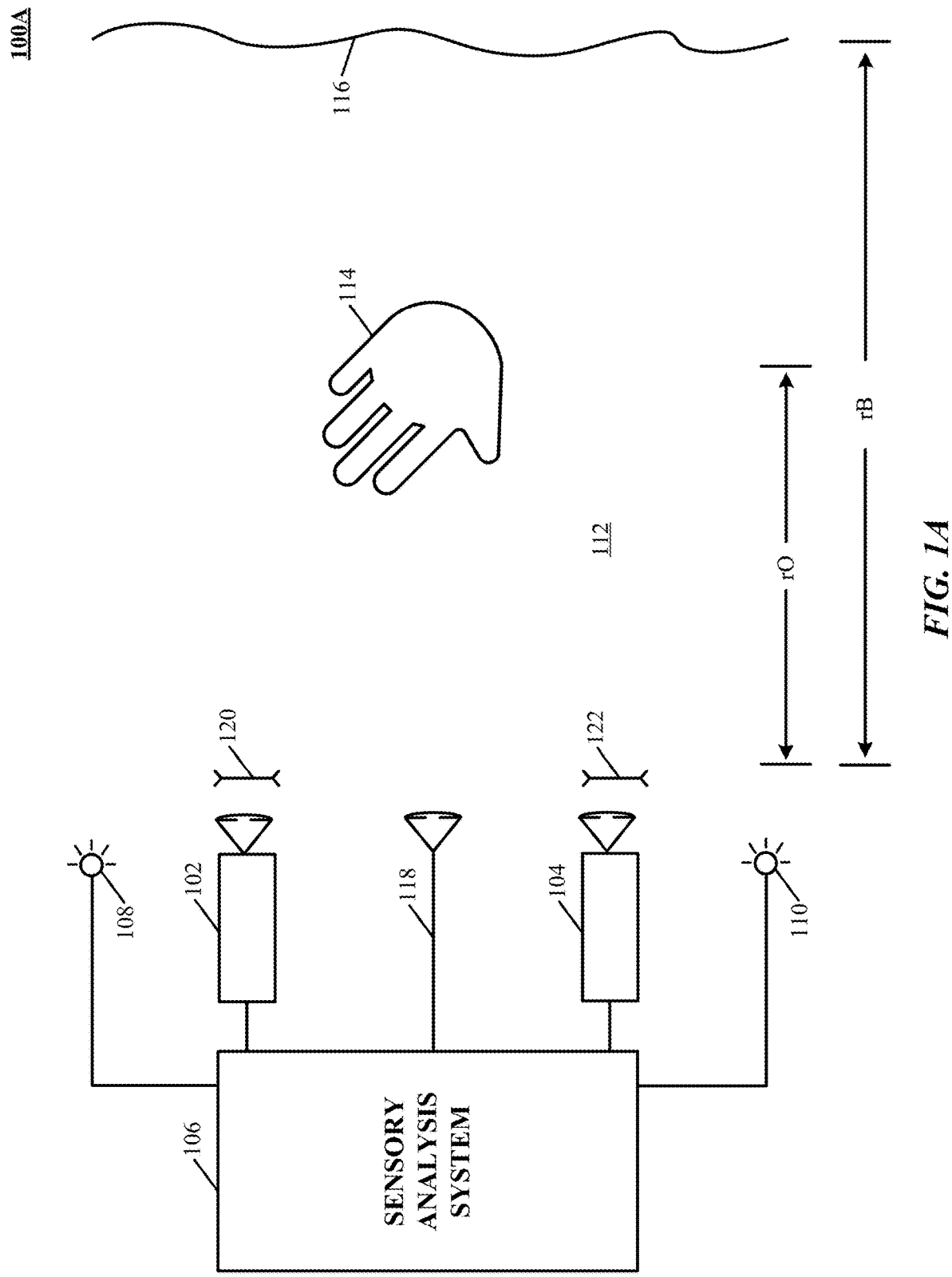
FIG. 1A illustrates a system for capturing image data according to an implementation of the technology disclosed.

Referring first to FIG. 1A, which illustrates an exemplary gesture-recognition system 100A including any number of cameras 102, 104 coupled to a sensory-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors (e.g. 118) or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side.

In some implementations, the illustrated system 100A includes one or more sources 108, 110, which can be disposed to either side of cameras 102, 104, and are controlled by sensory-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the gesture-recognition system 100A to operate under a broad range of lighting conditions and can avoid various inconveniences or distractions that may be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1A for clarity sake) used in conjunction with, or instead of, cameras 102, 104. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that is not audible to humans.

It should be stressed that the arrangement shown in FIG. 1A is representative and not limiting. For example, lasers or other light sources can be used instead of LEDs. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes a control object portion 114 (in this example, a hand) that may optionally hold a tool or other object of interest and cameras 102, 104 are oriented toward the region 112 to capture video images of the hand 114 with background 116. In some implementations, the operation of light sources 108, 110 and cameras 102, 104 is controlled by the sensory-analysis system 106, which can be, e.g., a computer system, control logic implemented in hardware and/or software or combinations thereof. Based on the captured images, sensory-analysis system 106 determines the position and/or motion of object 114.

Figure 1B:
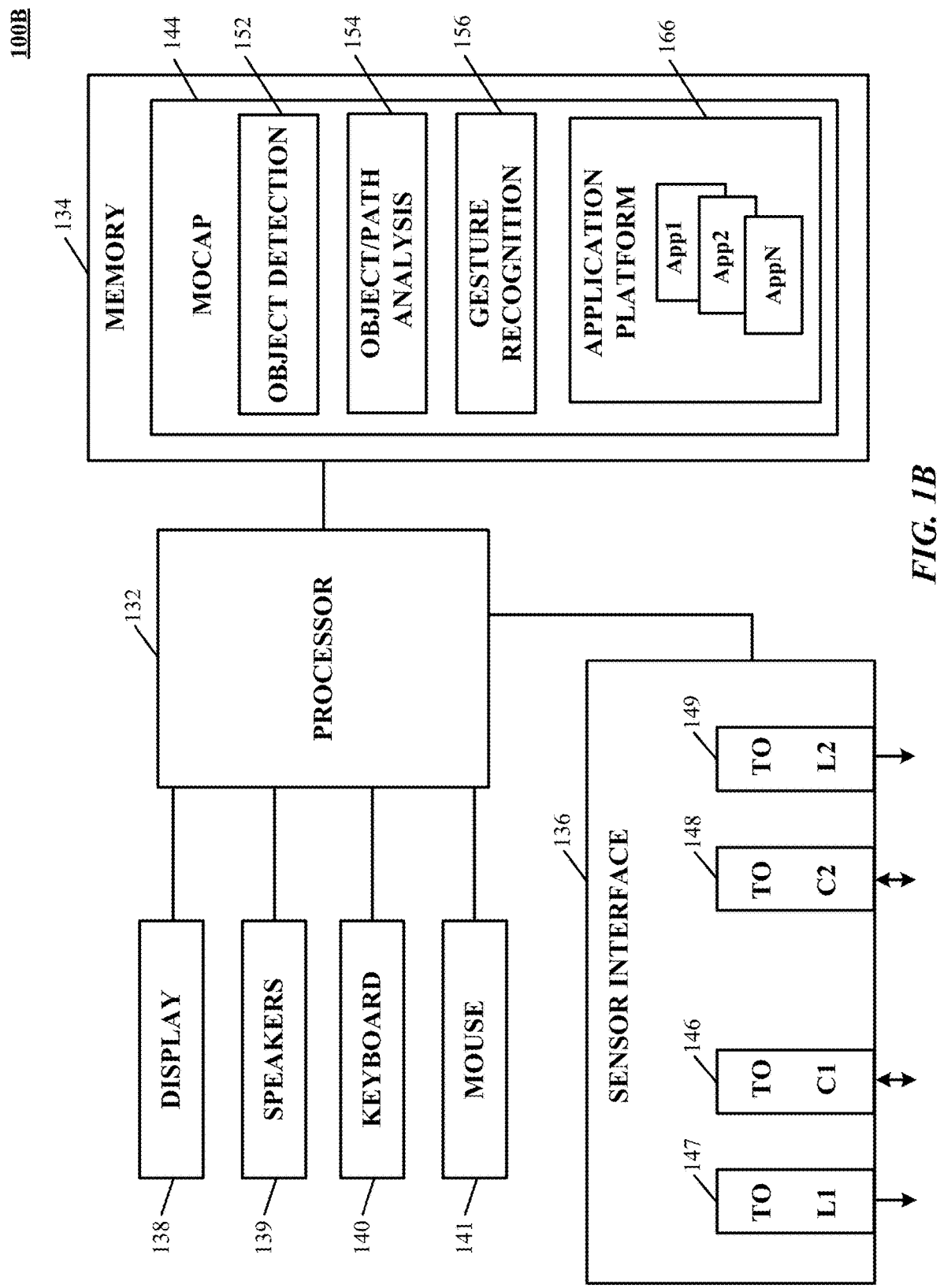
FIG. 1B is a simplified block diagram of a computer system implementing an image analysis apparatus according to an implementation of the technology disclosed.

FIG. 1B is a simplified block diagram of a computer system 100B, implementing sensory-analysis system 106 (also referred to as an image analyzer) according to an implementation of the technology disclosed. Sensory-analysis system 106 can include or consist of any device or device component that is capable of capturing and processing image data. In some implementations, computer system 100B includes a processor 132, memory 134, a sensor interface 136, a display 138 (or other presentation mechanism(s), e.g. holographic projection systems, wearable goggles or other head mounted displays (HMDs), heads up displays (HUDs), other visual presentation mechanisms or combinations thereof, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below, that control the operation of processor 132 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 136 can include hardware and/or software that enables communication between computer system 100B and cameras such as cameras 102, 104 shown in FIG. 1A, as well as associated light sources such as light sources 108, 110 of FIG. 1A. Thus, for example, sensor interface 136 can include one or more data ports 146, 148 to which cameras can be connected, as well as hardware and/or software signal processors to modify data signals received from the cameras (e.g., to reduce noise or reformat data) prior to providing the signals as inputs to a motion-capture ("mocap") program 144 executing on processor 132. In some implementations, sensor interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Sensor interface 136 can also include controllers 147, 149, to which light sources (e.g., light sources 108, 110) can be connected. In some implementations, controllers 147, 149 provide operating current to the light sources, e.g., in response to instructions from processor 132 executing mocap program 144. In other implementations, the light sources can draw operating current from an external power supply, and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to sensor interface 136. In one implementation, mocap program 144 includes various modules, such as an object detection module 152, an object/path analysis module 154, and a gesture-recognition module 156. Object detection module 152 can analyze images (e.g., images captured via sensor interface 136) to detect edges of an object therein and/or other information about the object's location. Object/path analysis module 154 can analyze the object information provided by object detection module 152 to determine the 3D position and/or motion of the object (e.g., a user's hand). Examples of operations that can be implemented in code modules of mocap program 144 are described below. Memory 134 can also include other information and/or code modules used by mocap program 144 such as an application platform 166 that allows a user to interact with the mocap program 144 using different applications like application 1 (App1), application 2 (App2), and application N (AppN).

Display 138, speakers 139, keyboard 140, and mouse 141 can be used to facilitate user interaction with computer system 100B. In some implementations, results of gesture capture using sensor interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, to use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 1A and 1B, the user performs a gesture that is captured by the cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by a gesture-recognition module 156, which can be implemented as another module of the mocap 144. Gesture-recognition module 156 provides input to an electronic device, allowing a user to remotely control the electronic device and/or manipulate virtual objects, such as prototypes/models, blocks, spheres, or other shapes, buttons, levers, or other controls, in a virtual environment displayed on display 138. The user can perform the gesture using any part of her body, such as a finger, a hand, or an arm. As part of gesture recognition or independently, the sensory-analysis system 106 can determine the shapes and positions of the user's hand in 3D space and in real time; see, e.g., U.S. Ser. Nos. 61/587,554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the sensory-analysis system 106 can not only recognize gestures for purposes of providing input to the electronic device, but can also capture the position and shape of the user's hand in consecutive video images in order to characterize the hand gesture in 3D space and reproduce it on the display screen such as display 138.

In one implementation, the gesture-recognition module 156 compares the detected gesture to a library of gestures electronically stored as records in a database, which is implemented in the sensory-analysis system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Pervasive Computing Environment

Figure 2:
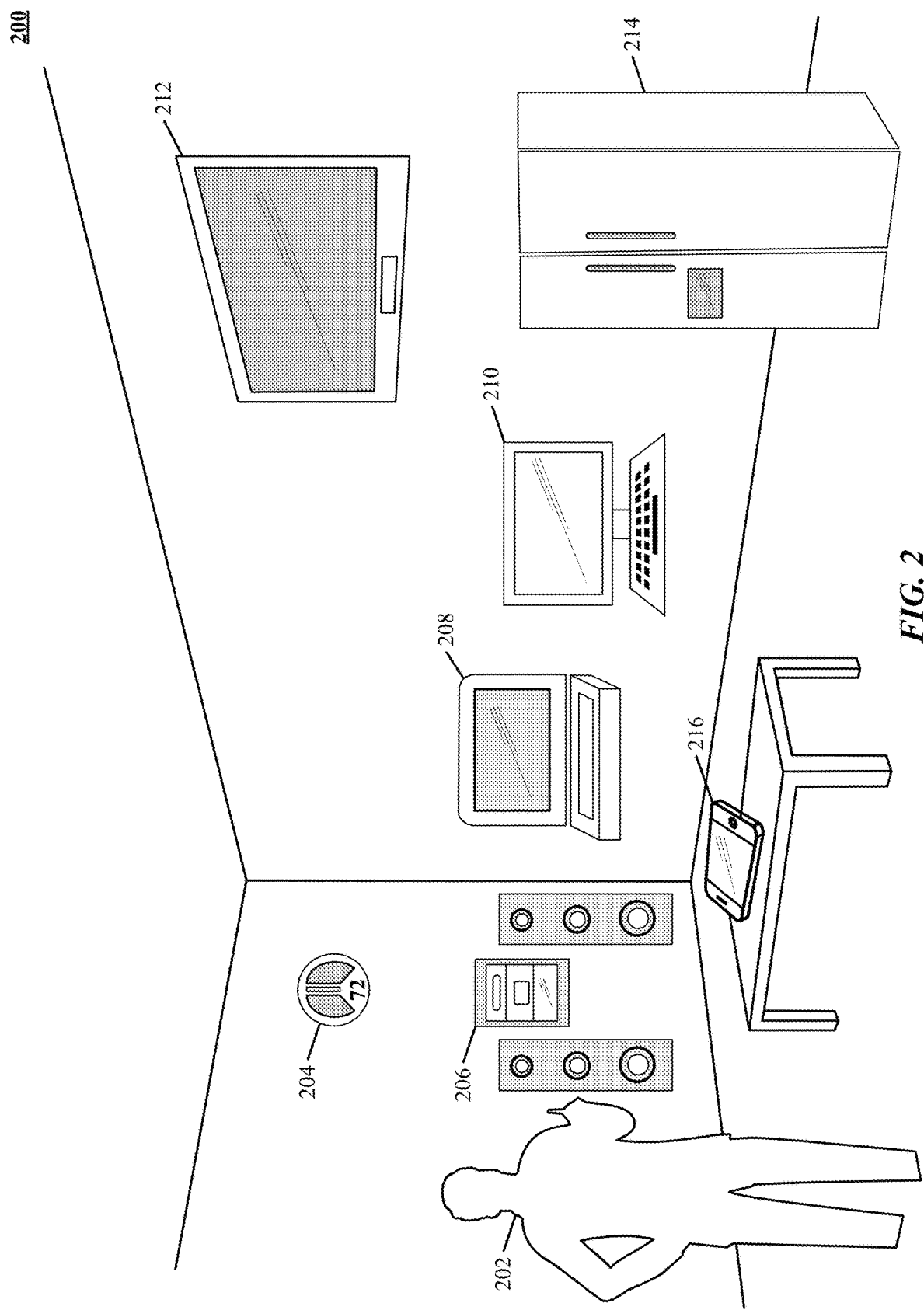
FIG. 2 shows one implementation of selecting a device in a pervasive computing environment.

FIG. 2 shows one implementation of selecting a device in a pervasive computing environment 200. In one implementation, pervasive computing environment 200 can include various home automation systems such as lighting systems, in-home monitoring systems, security systems, appliance systems, VoIP phone systems, other phone systems, other home automation systems, or any combination thereof. In a particular implementation, smart phone 216 equipped with a motion sensory control device is adapted to control each of the home automation systems, including but not limited to entertainment unit 206, thermostat and HVAC control 204, laptop computer 208, desktop computer 210, television 212, and refrigerator 214.

In other implementations, smart phone 216 can include one or more sensors to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF), WiFi, or other electromagnetic signals or fields. Thus, for example, smart phone 216 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). While FIG. 2 illustrates an implementation with motion sensory control device, many implementations can include multiple sensors. In some instances, smart phone 216 includes one or more primary sensors and one or more secondary sensors. The primary sensor(s) can sense data central to the core operation of the device (e.g., interpreting gestures performed in the environment 200). The secondary sensor(s) can sense other types of data (e.g., light, acceleration, or sound).

In other implementations, one or more user-interface components (e.g. 138) in smart phone 216 can be used to present information to a user 202 via a visual display (e.g., a thin-film-transistor display or organic light-emitting-diode display) and/or an audio speaker. In one implementation, user-interface components (e.g. 138) can receive information from the user 202 through a touchscreen, buttons, scroll component (e.g., a movable or virtual ring component), microphone, and/or camera (e.g., to detect gestures).

As shown in FIG. 2, user 202 can select a device from among the different devices in the environment 200 by performing a gesture and/or and other body movements. In one implementation, pure gestures, or gestures in combination with voice recognition, and/or a virtual or real keyboard in combination with the gestures can be used to select a device. In another implementation, a control console that recognizes gestures can be used to control an entire home.

In some implementations, user 202 can raise an arm, utter a verbal command, perform an optical command, or make different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact with a particular device in the environment 200. In other implementations, a point and grasp gesture can be used to move a cursor on a display of a device in the environment 200, verbal commands can be used to select a function, eye movements can be used to move a cursor, and blinking can indicate a selection.

In yet other implementations, the gestures can control the different devices in environment 200 using a graphical display or other feedback device, a set of menu elements, selection elements, and pan and zoom capabilities. Navigation through the devices can be consistent from high-level selection of target device down to manipulation of individual selection elements. In one example, with a particular device selected following a detection of a vertical, thumb-up, one-finger point), a pointing cursor and contextual menu elements for the current device are activated. The cursor position is driven by the movement and/or aim of the index finger. Basic selection and control over button, slider, and menu elements is accomplished by positioning the pointer within an element and moving the thumb to the down/click (aligned with index finger) position. Moving the cursor off the screen to the medial side brings up a high-level menu list, with cursor movement constrained to two dimensions (up and down). Selecting an option from the high-level menu acts to change devices (for example, from the television to the refrigerator).

In some other implementations, the gestures or body movements can also be used to switch a device on or off. After selecting a device, user 202 performs a subsequent gesture such as a downward or upward swipe of hand and/or fingers to power on or off a device. For instance, a finger flip up or down can be used to turn lights, television, or refrigerator on or off.

Other examples of ambient services performed using gestural interaction in environment 200 can involve the filling of baths, pools and spas and the maintenance of a desired temperature in those facilities, as well as the control of any pumps associated with those facilities. They can also control individual devices and appliances such as kitchen appliances, exhaust fans, humidifiers, and dehumidifiers. In some implementations, they can control motorized devices such as skylights, draperies, furniture, walls, screens, ceilings, awnings, physical security barriers, door locks, and others. In other implementations, they can also control answering machines, voice mail systems, and provide maintenance reminders and perform functions such as telephone answering, controlling fountains or in-ground sprinkler systems, controlling kitchen and other appliances, controlling motorized drapes, windows and skylights, opening of locked doors and the scheduling of these functions. In yet other implementations, these ambient services can be applied to other pervasive environments such as boats, aircraft, office suites, conference rooms, auditoriums, classrooms, theaters, hotels, hospitals, and retirement homes.

Figure 3:
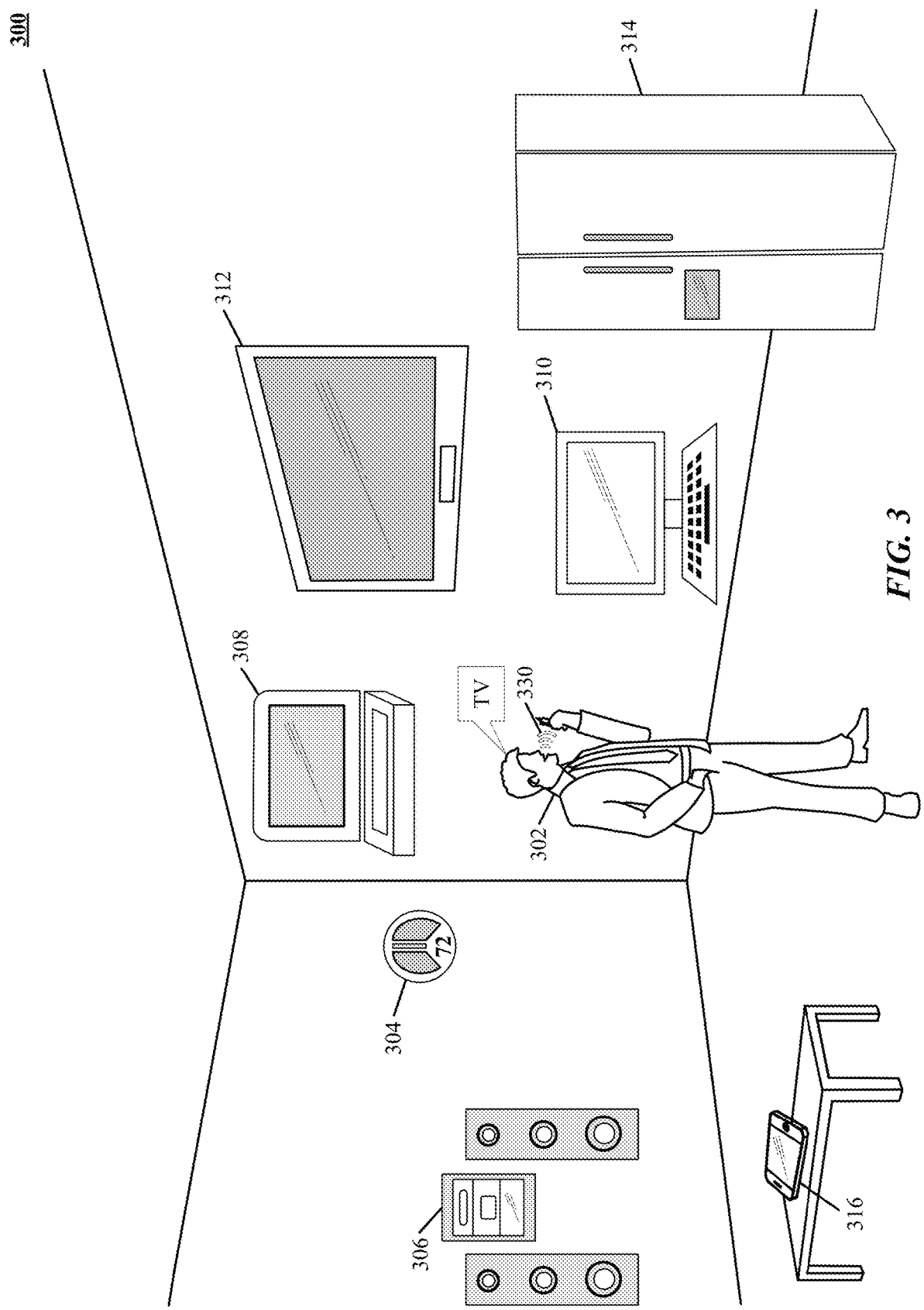
FIG. 3 illustrates one implementation of using a voice command to select a device from among heterogeneous devices in a pervasive computing environment.

FIG. 3 illustrates one implementation of using a voice command 330 to select a device from among heterogeneous devices in a pervasive computing environment 300. In one implementation, user 302 can utter a name of a device to make a device selection. For example, as shown in FIG. 3, user 302 selects television 312 by issuing a vocal command "TV." In other implementations, user 302 can utter a series of command to select a device and further control the selected device. In some other implementations, user 302 can control the vocally selected device using gestures. In a particular implementation, smart phone 316 equipped with a motion sensory control device is adapted to control each of the home automation systems, including but not limited to entertainment unit 306, thermostat and HVAC control 304, laptop computer 308, desktop computer 310, television 312, and refrigerator 314.

Figure 4:
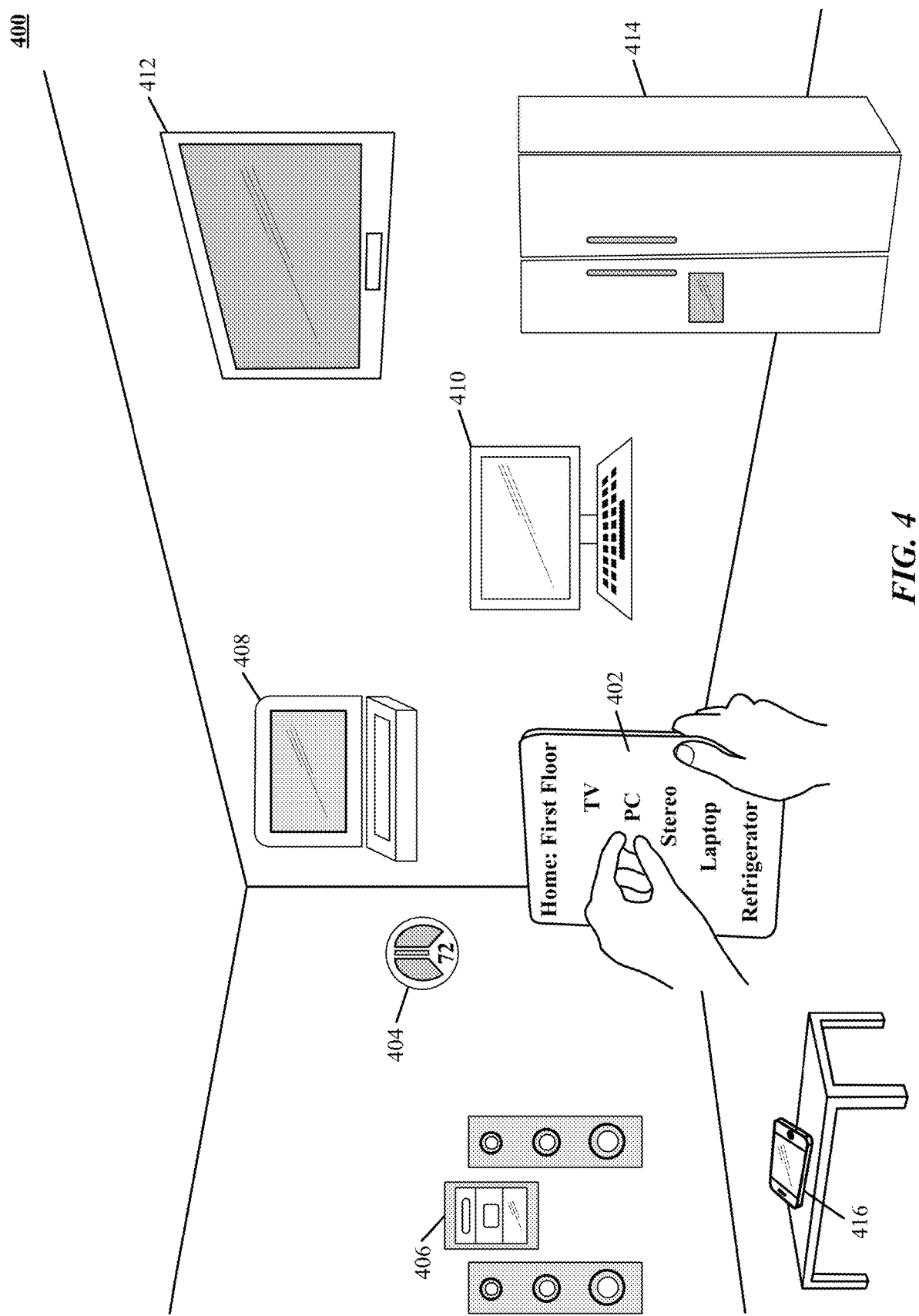
FIG. 4 is one implementation of using a touch command to select a device from among heterogeneous devices in a pervasive computing environment.

FIG. 4 is one implementation of using a touch command to select a device from among heterogeneous devices in a pervasive computing environment 400. In some implementations, data is created for display by the smart phone 416 or another device or virtual screen in the environment 400, which identifies the heterogeneous devices. In other implementations, a subsequent touch command 402 is received to that selects one of the identified heterogeneous devices, as shown in FIG. 4. In a particular implementation, smart phone 416 equipped with a motion sensory control device is adapted to control each of the home automation systems, including but not limited to entertainment unit 406, thermostat and HVAC control 404, laptop computer 408, desktop computer 410, television 412, and refrigerator 414.

Figure 17:
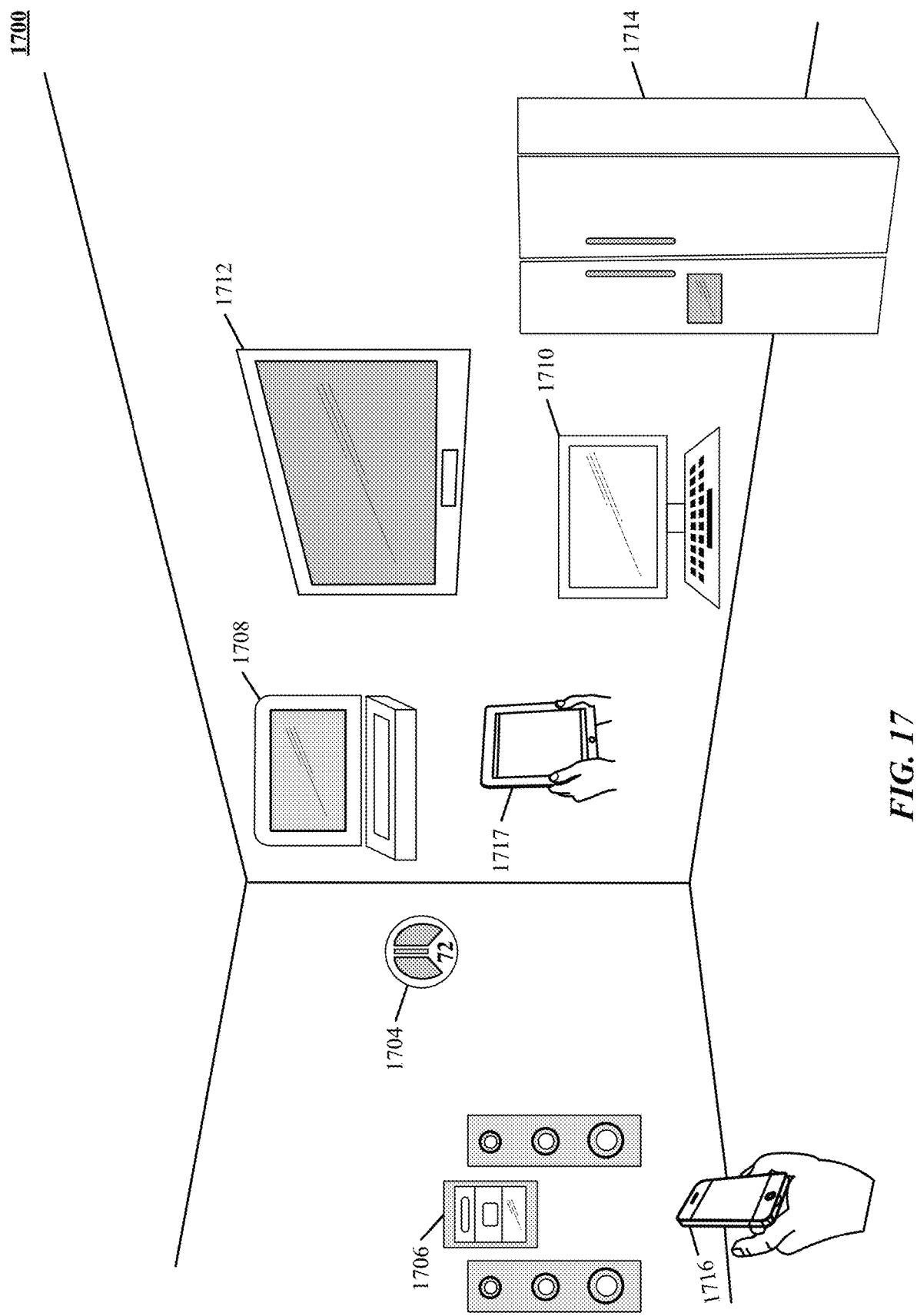
FIG. 17 illustrates one implementation of selection-by-pointing technique in a pervasive computing environment.

FIG. 17 illustrates one implementation of selection-by-pointing technique in a pervasive computing environment 1700. In one implementation, a device is automatically selected from among the heterogeneous devices (1704, 1706, 1708, 1712, 1710, 1714) by bring a device in the field of view of a camera of the smart phone 1716 or in the line of the smart of a user computing device like a tablet 1717.

Figure 5:
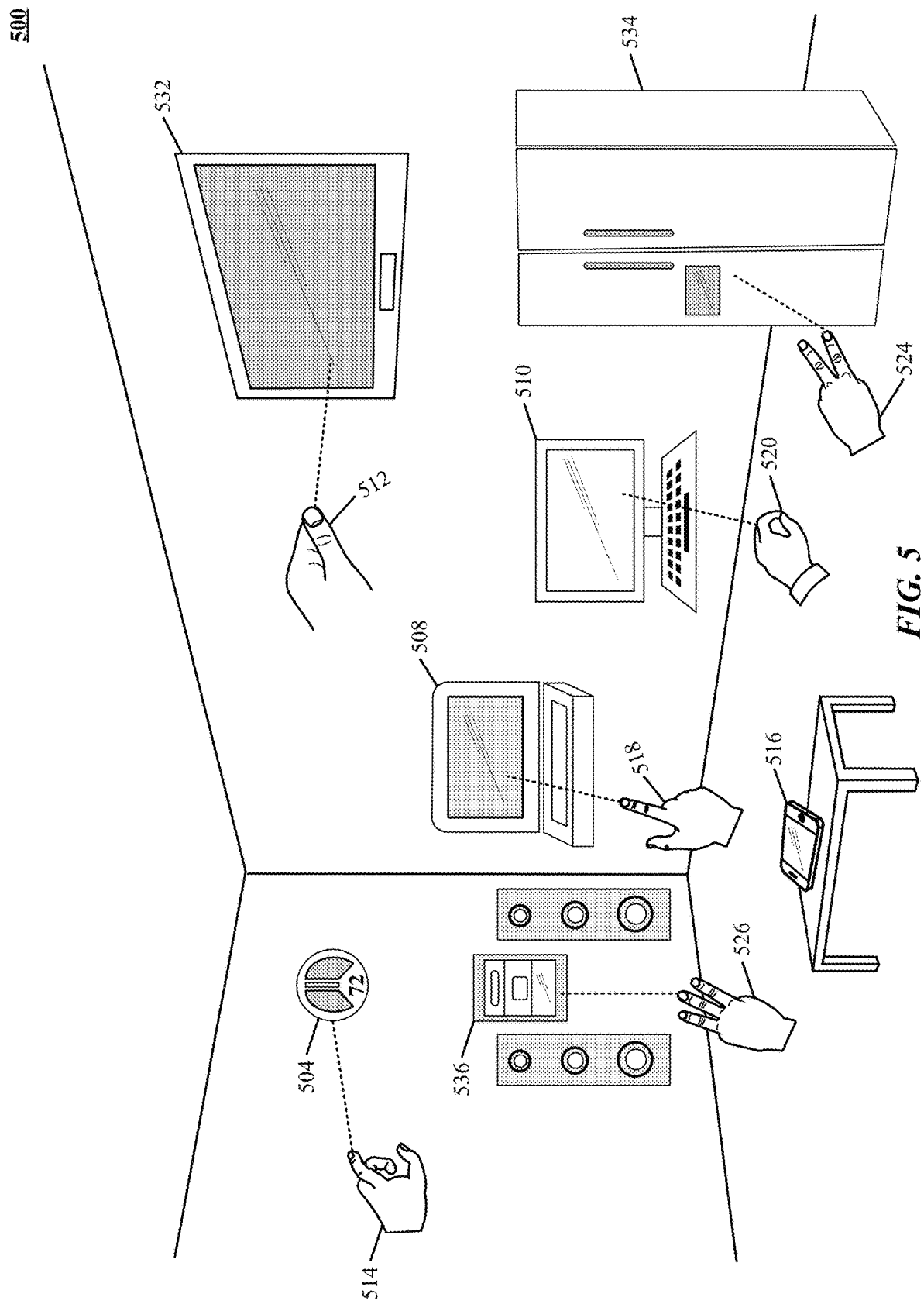
FIG. 5 illustrates one implementation of different paradigm-setting gestures that set device-specific control paradigms to control responsiveness of various devices in a pervasive computing environment.

FIG. 5 illustrates one implementation of different paradigm-setting gestures (514, 526, 518, 512, 520, 524) that set device-specific control paradigms to control responsiveness of various devices in a pervasive computing environment 500. As shown in FIG. 5, different gestures such as a grip-and-extend-again motion of two fingers of a hand, grip-and-extend-again motion of a finger of a hand, or holding a first finger down and extending a second finger can be used to determine a context for interpreting subsequent gestures and controlling a selected device. For example, a vertical finger swipe can indicate a user intent to increase volume of a television or increase brightness of the television display. However, paradigm-setting gestures (514, 526, 518, 512, 520, 524) define how various gestures cause on-screen actions on the different devices and/or control their manual responsiveness. In another example relating to a pervasive augmented environment, paradigm-setting gestures (514, 526, 518, 512, 520, 524) can define interaction modes to interact with different virtual screens or objects. For instance, when the user is interacting with a virtual newspaper active on a virtual screen, a forehand sweep can result in an increment change of an electronic page in the virtual newspaper, whereas the same gesture can result in collision of virtual cars in a virtual gaming environment generated by the same virtual screen. In a particular implementation, smart phone 516 equipped with a motion sensory control device is adapted to control each of the home automation systems, including but not limited to entertainment unit 536, thermostat and HVAC control 504, laptop computer 508, desktop computer 510, television 532, and refrigerator 534.

Figure 6:
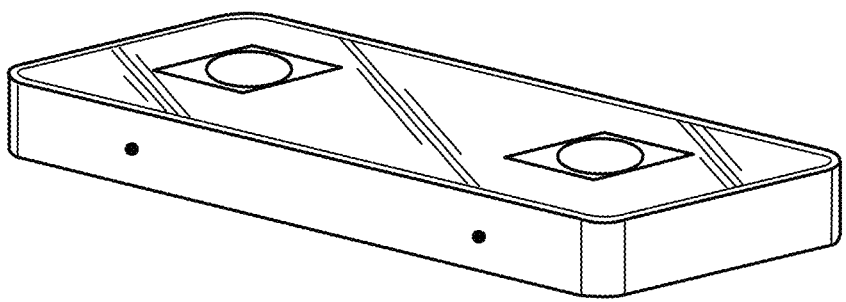
FIG. 6 is one implementation of a motion sensory control device that detects gestures in a three dimensional (3D) sensory space.
Figure 7A:
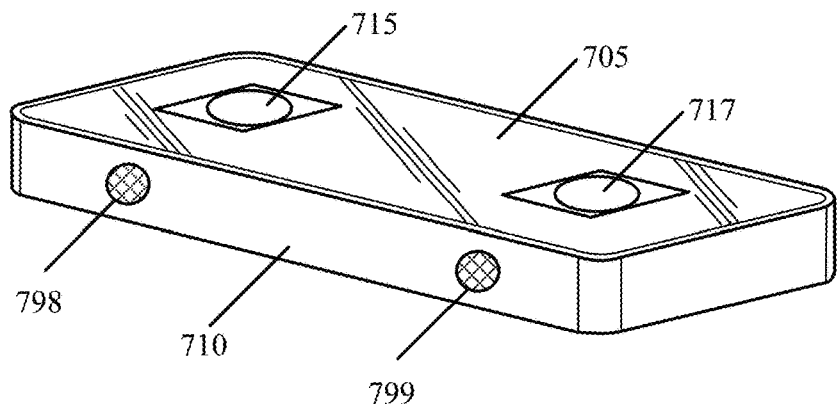
FIG. 7A is a perspective view from the top of a motion sensory control device in accordance with the technology disclosed, with motion sensors along an edge surface thereof.
Figure 7B:
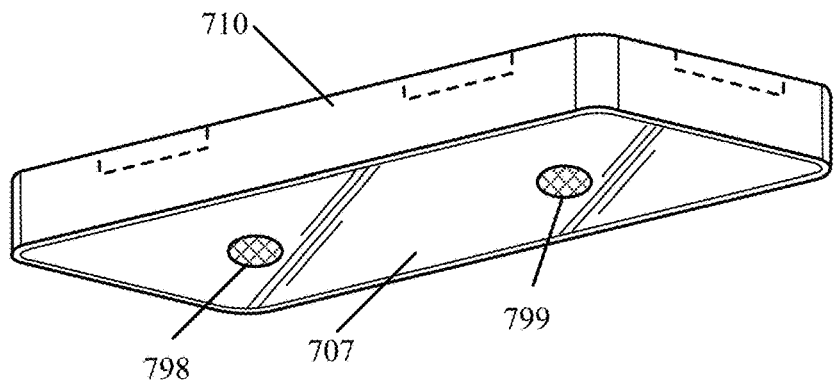
FIG. 7B is a perspective view from the bottom of a motion sensory control device in accordance with the technology disclosed, with motion sensors along the bottom surface thereof.
Figure 7C:
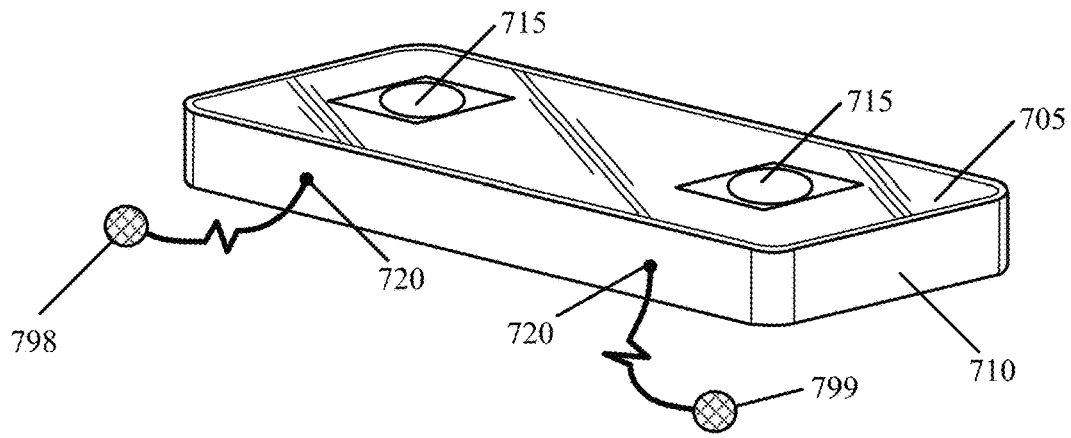
FIG. 7C is a perspective view from the top of a motion sensory control device in accordance with the technology disclosed, with detachable motion sensors configured for placement on a surface.

FIG. 6 is one implementation of a motion sensory control device 600 that detects gestures in a three dimensional (3D) sensory space. FIGS. 7A, 7B, and 7C illustrate three different configurations of a motion sensory control device 700A, 700B, 700C, with reference to example implementations packaged within a single housing as an integrated sensor. In all cases, motion sensory control device 700A, 700B, 700C includes a top surface 705, a bottom surface 707, and a side wall 710 spanning the top and bottom surfaces 705, 707. With reference also to FIG. 7A, the top surface 705 of motion sensory control device 700A contains a pair of windows 715, 717 for admitting light to the cameras 102, 104, one of which is optically aligned with each of the windows 715, 717. If the system includes light sources (not shown in FIGS. 7A-7C for clarity sake), surface 705 may contain additional windows for passing light to the object(s) being tracked. In motion sensory control device 700A, motion sensors 798, 799 are located on the side wall 710. Desirably, the motion sensors are flush with the surface of side wall 710 so that, the motion sensors are disposed to sense motions about a longitudinal axis of motion sensory control device 700A. Of course, the motion sensors can be recessed from side wall 710 internal to the device in order to accommodate sensor operation and placement within available packaging space so long as coupling with the external housing of motion sensory control device 700A remains adequate. In FIG. 7B, sensor 700B has motion sensors 798, 799 that are located proximate to the bottom surface 707, once again in a flush or recessed configuration. The top surface of the motion sensory control device 700B (not shown in the figure for clarity sake) contains camera windows 715, 717 as shown in FIG. 7A. In FIG. 7C, motion sensors 798, 799 are external contact transducers that connect to motion sensory control device 700C via jacks 720. This configuration permits the motion sensors to be located away from the motion sensory control device 700C, e.g., if the motion sensors are desirably spaced further apart than the packaging of motion sensory control device 700C allows.

Figure 8A:
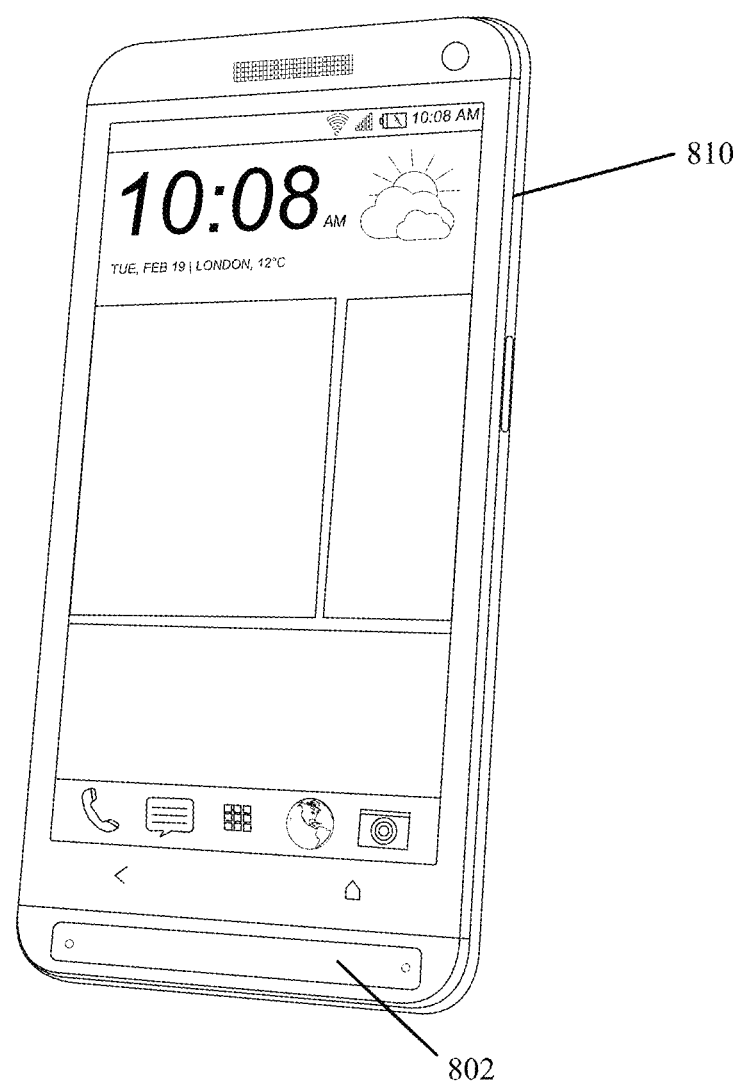
FIG. 8A illustrates one implementation of a smart phone equipped with a motion sensory control device.
Figure 8B:
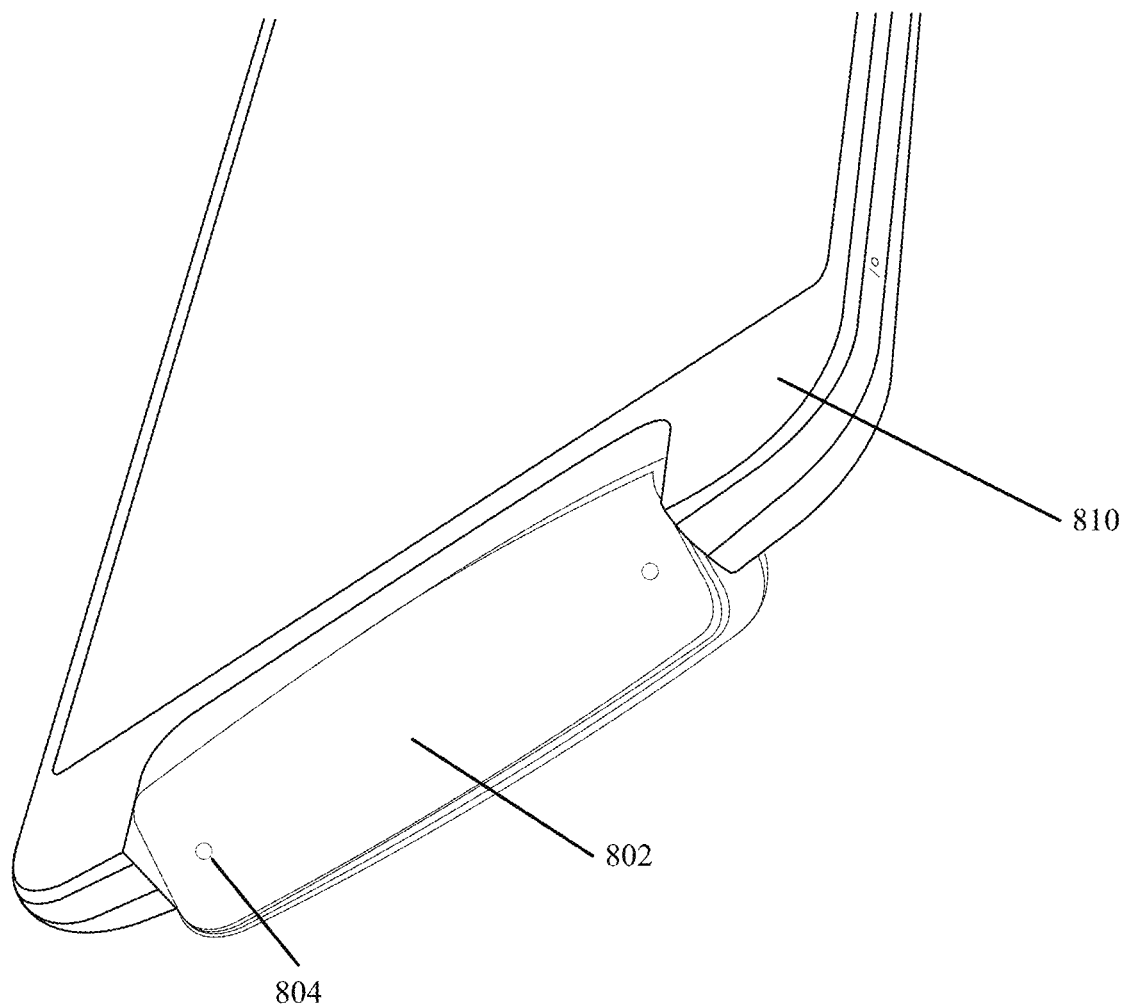
FIG. 8B illustrates one implementation of a motion sensory control device embedded in a swivel camera of a smart phone.
Figure 8C:
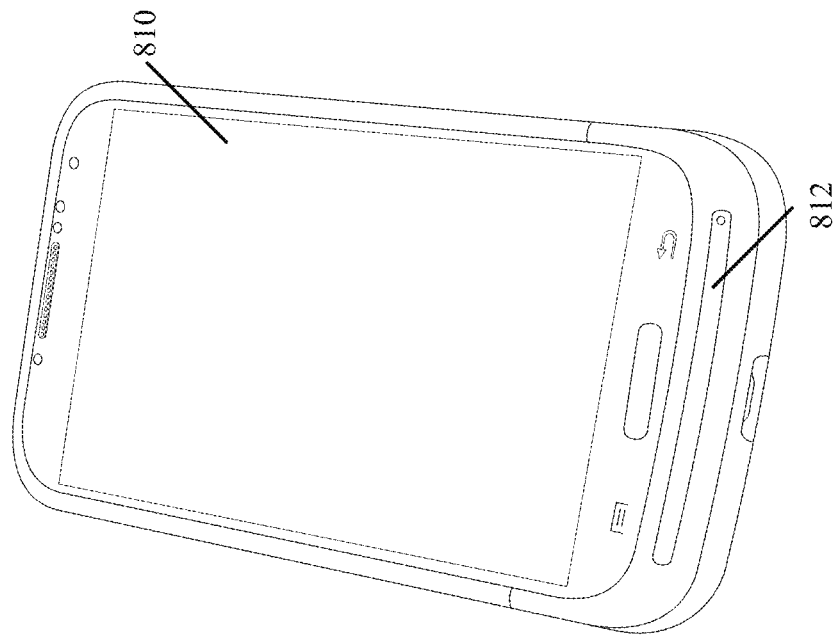
FIG. 8C illustrates one implementation of a motion sensory control device embedded in a mobile case of a smart phone.
Figure 8C:
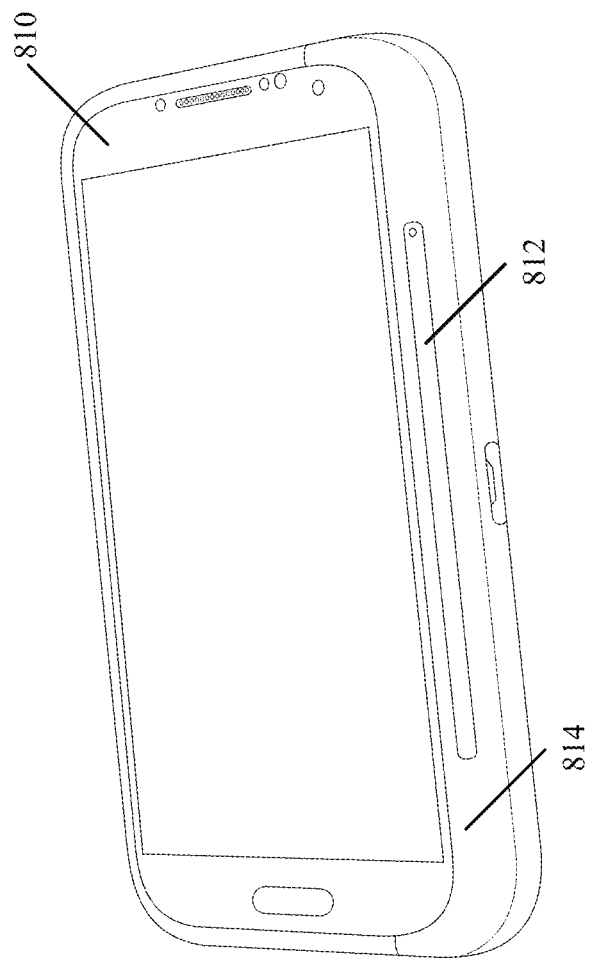
Figure 8D:
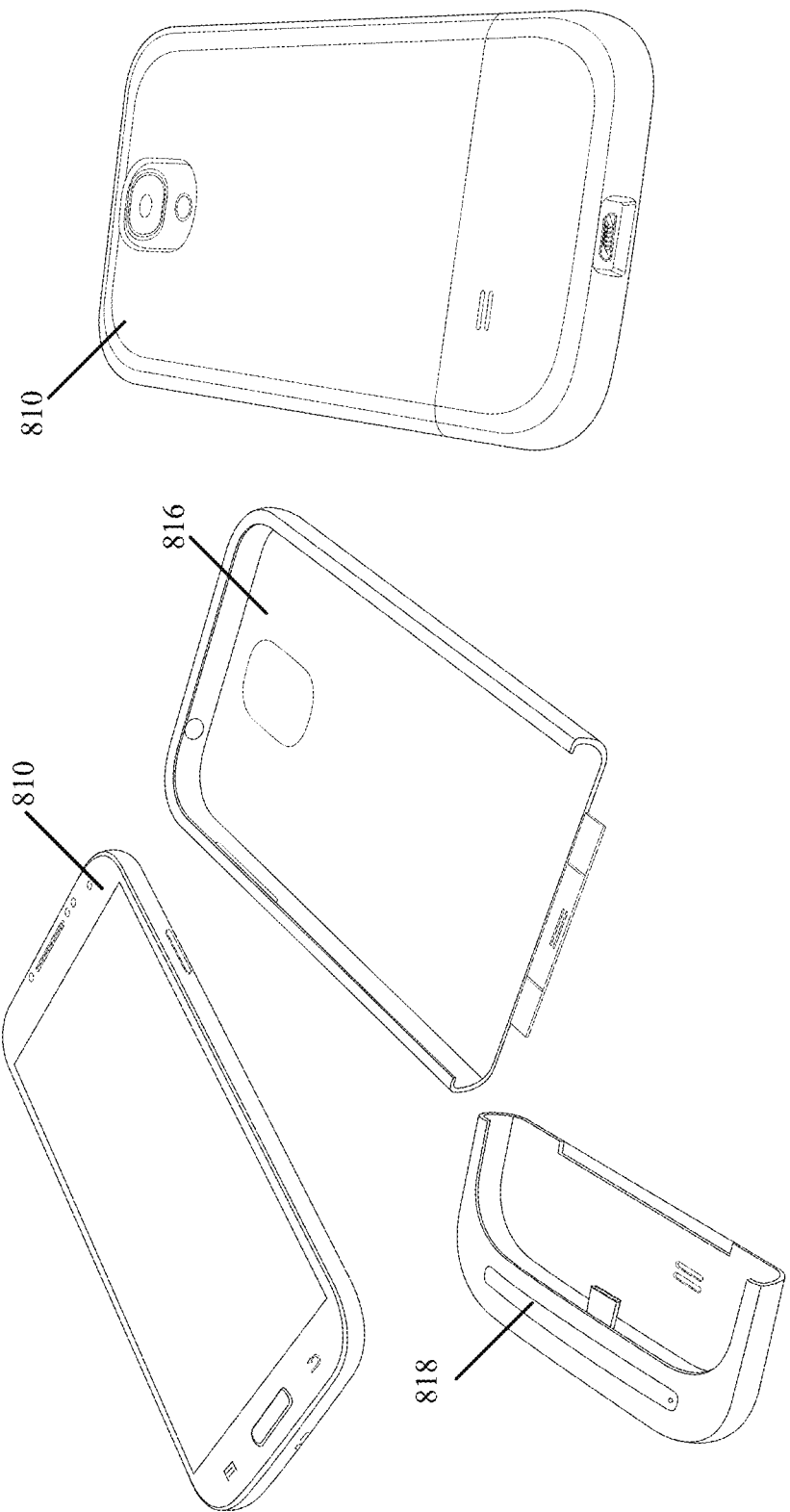
FIG. 8D illustrates one implementation of a motion sensory control device embedded in a portrait mobile case of a smart phone.
Figure 8E:
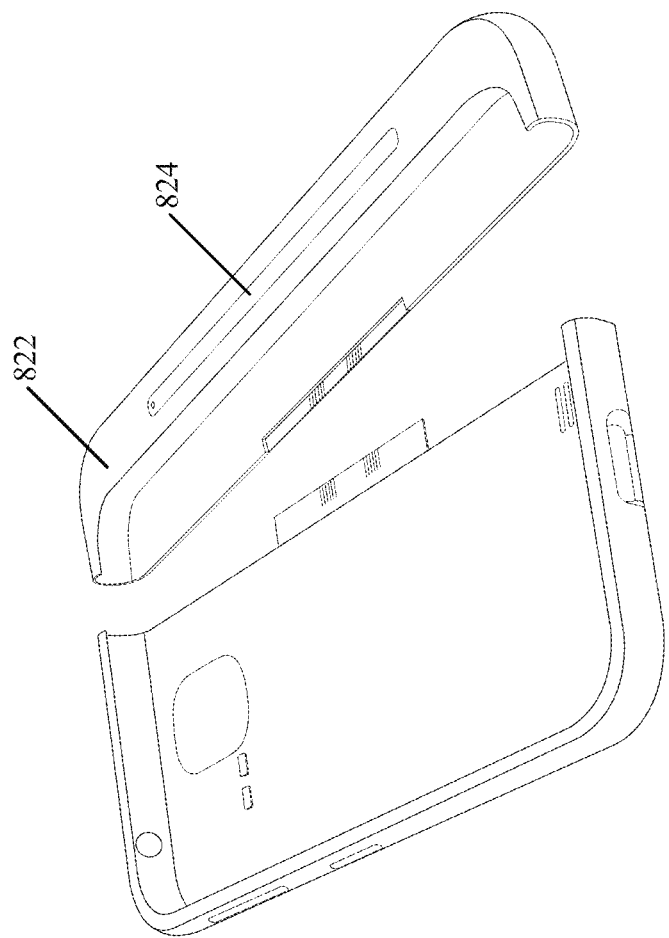
FIG. 8E illustrates one implementation of a motion sensory control device embedded in a landscape mobile case of a smart phone.
Figure 8F:
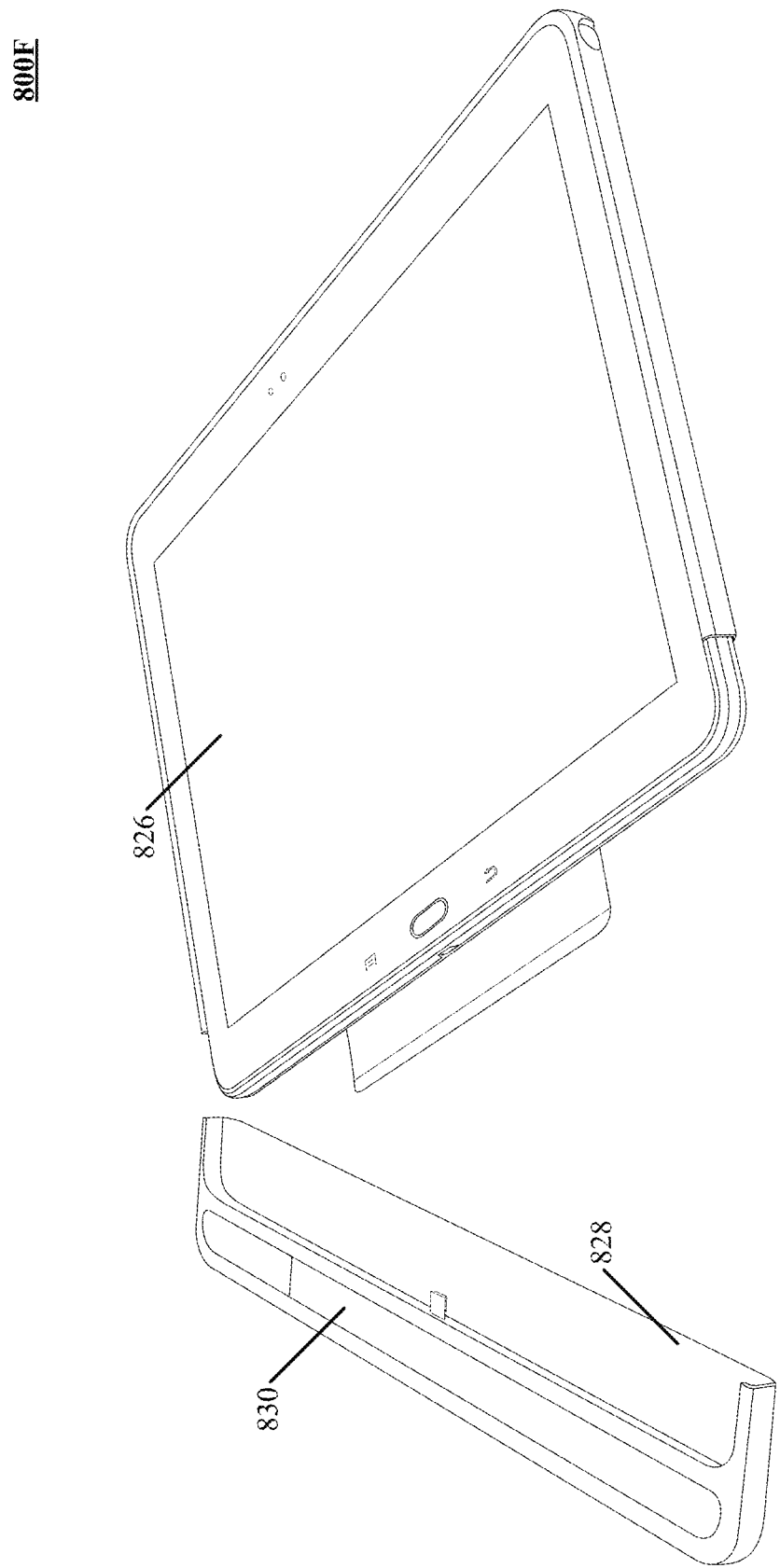
FIG. 8F illustrates one implementation of a motion sensory control device embedded in a keyboard-less tablet case of a computer tablet.
Figure 8G:
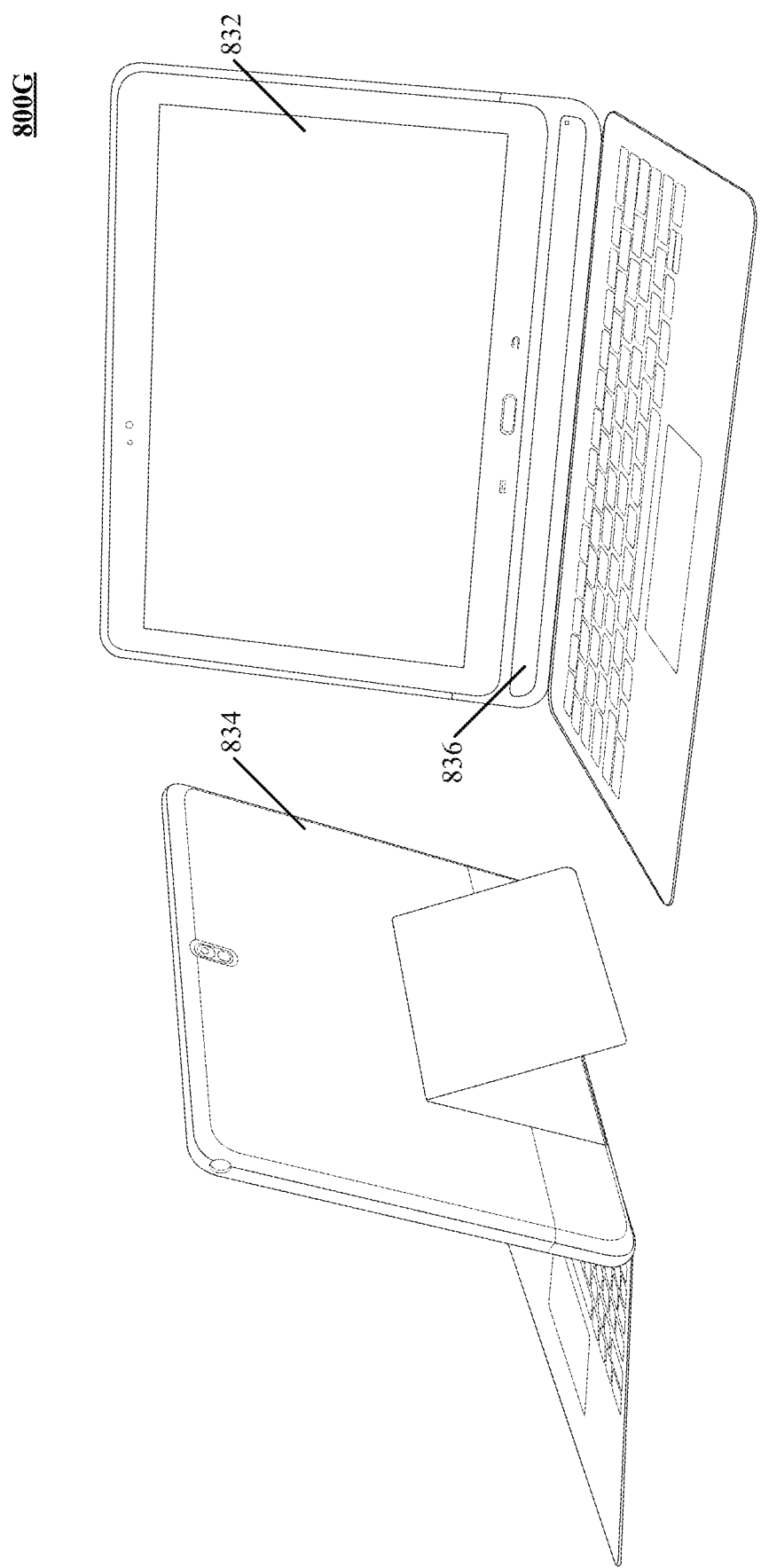
FIG. 8G illustrates one implementation of a motion sensory control device embedded in a tablet case of a computer tablet.

In other implementations, movable sensor components of FIG. 1B can be imbedded in portable (e.g., head mounted displays (HMDs), wearable goggles, watch computers, smartphones, and so forth) or movable (e.g., autonomous robots, material transports, automobiles (human or machine driven)) devices. FIG. 8A illustrates one implementation 800A of a smart phone 810 equipped with a motion sensory control device 802. FIG. 8B illustrates one implementation 800B of a motion sensory control device 802 embedded in a swivel camera 804 of a smart phone 810. FIG. 8C illustrates one implementation 800C of a motion sensory control device 812 embedded in a mobile case 814 of a smart phone 810. FIG. 8D illustrates one implementation 800D of a motion sensory control device embedded 818 in a portrait mobile case 816 of a smart phone 810. FIG. 8E illustrates one implementation 800E of a motion sensory control device 824 embedded in a landscape mobile case 822 of a smart phone 820. FIG. 8F illustrates one implementation 800F of a motion sensory control device embedded 830 in a keyboard-less tablet case 828 of a computer tablet 826. FIG. 8G illustrates one implementation 800G of a motion sensory control device 836 embedded in a tablet case 834 of a computer tablet 832.

Figure 9:
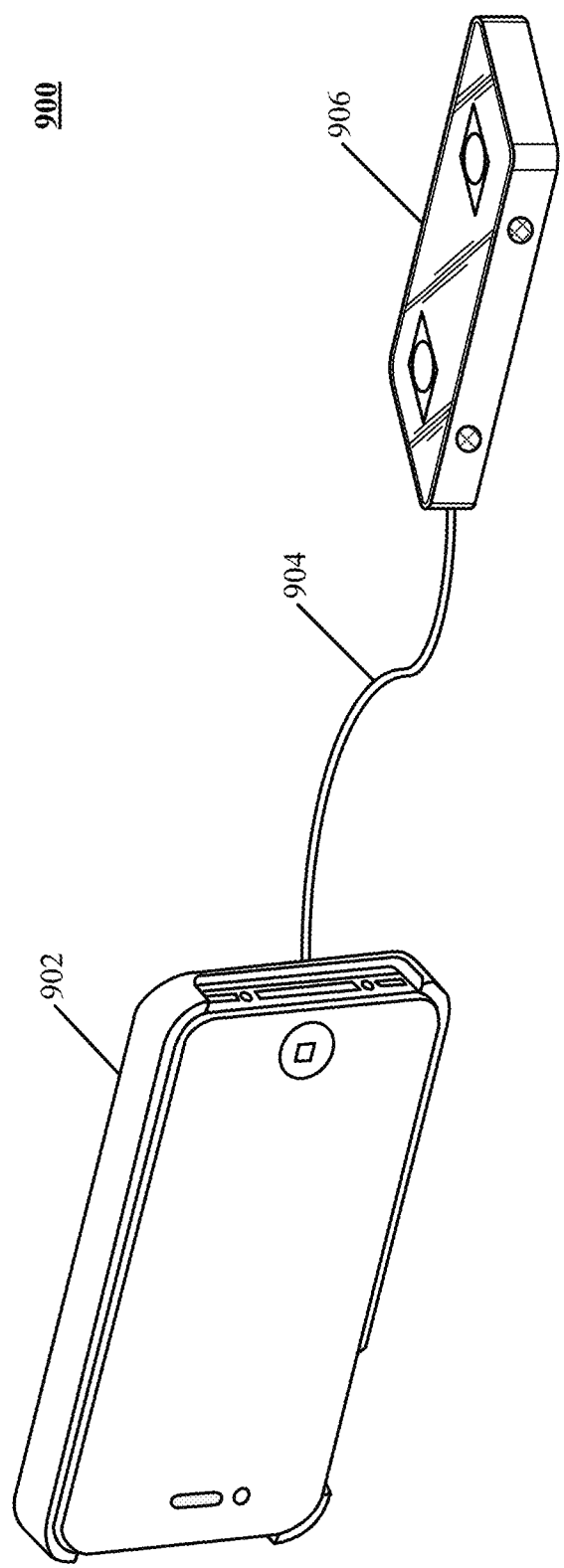
FIG. 9 illustrates one implementation of a motion sensory control device peripherally connected to a smart phone.

FIG. 9 illustrates one implementation 900 of a motion sensory control device 906 peripherally connected to a smart phone 902 through a data cable 904. In one implementation, motion and sensory information collected by the motion sensory control device 906 are transferred to the smart phone 902 thought the data cable 904. In another implementation, gestures detected by the motion sensory control device 906 are preprocessed to reduce required bandwidth and the preprocessed gestures are sent to the smart phone 902 via the communication channel.

A motion-capture system captures movement of a user, a portion of the user's body (often one or more of the user's hands) and/or object in three-dimensional ("3D") space using a computing device connected to one or more cameras. Once movement is captured, the computing device can interpret the movement as a user-input command and update a computer display accordingly. For example, the computer display can illustrate a virtual representation of the user's hands and update that representation as the user moves his hands. In another example, the computer display can illustrate a virtual object that is manipulated (e.g., rotated or resized) as the user's hands move.

Processing a sequence of captured images quickly enough to detect and characterize objects therein (e.g., in terms of their contours), and track their motions through the image sequence in real time, requires substantial computational resources, which is of special concern when the motion sensory control device is embedded in smart phones that have power limitations. In order to accurately track motion in real or near-real time, the camera(s) of motion-capture systems typically operate at a frame rate of at least 15 image frames per second. Image acquisition at such high rates entails significant power requirements; in general, there is a trade-off between the frame-rate-dependent accuracy and responsiveness of motion-capture systems on the one hand and power consumption on the other hand. Power requirements, however, can pose a practical limit to the range of applications of motion-capture systems like smart phones equipped with motion sensory control devices, as excessive power consumption can render their employment impractical or economically infeasible. It would therefore be desirable to reduce power consumption of smart phones equipped with motion sensory control devices, preferably in a manner that does not affect motion-tracking performance.

This is achieved by monitoring at least one physical and/or environmental parameter of a smart phone equipped with a motion sensory control device and in response to detection of a change in the physical and/or environment parameter exceeding a specified threshold, automatically switching the smart phone from one operation mode to another such as a high-power consumption mode to a low-power consumption mode.

Hand-Held Mode

Figure 10:
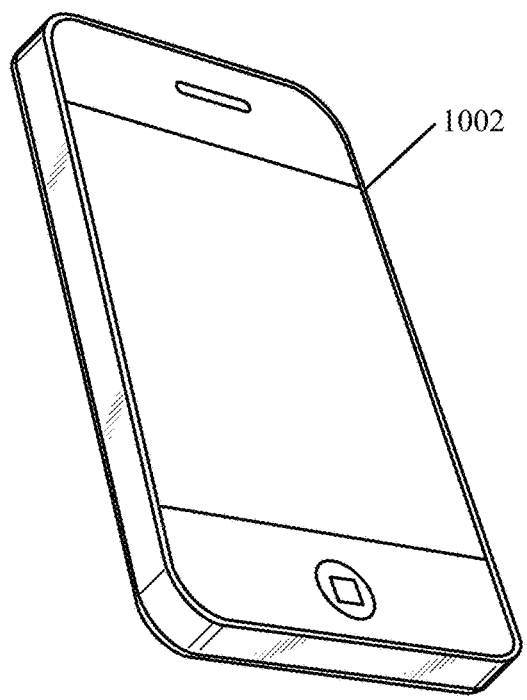
FIG. 10 is one implementation of switching a smart phone to a hand-held mode of operation when the embedded motion sensory control device is upright and moving.

FIG. 10 is one implementation of switching a smart phone 1002 to a hand-held mode of operation 1000 when the embedded motion sensory control device is upright and moving. In one implementation, the smart phone 1002 includes at least one of gyroscopes, accelerometers, tilt-sensors, and/or other such devices. These orientation and acceleration measuring devices when embed in the smart phone 1002 can generate one or more output signals like tri-axis signals for orthogonal x-, y-, and z-axes that indicate physical orientation of the smart phone 1002. In such an implementation, when a user holds the smart phone 1002 such that its face is proximate to the user's ear at the side of the head, as with a customary telephone handset, and its orientation and acceleration cross a certain threshold, the motion sensory control device embedded in the smart phone 1002 is switched to the hand-held mode of operation 1000.

Wide-Area Mode

Figure 11:
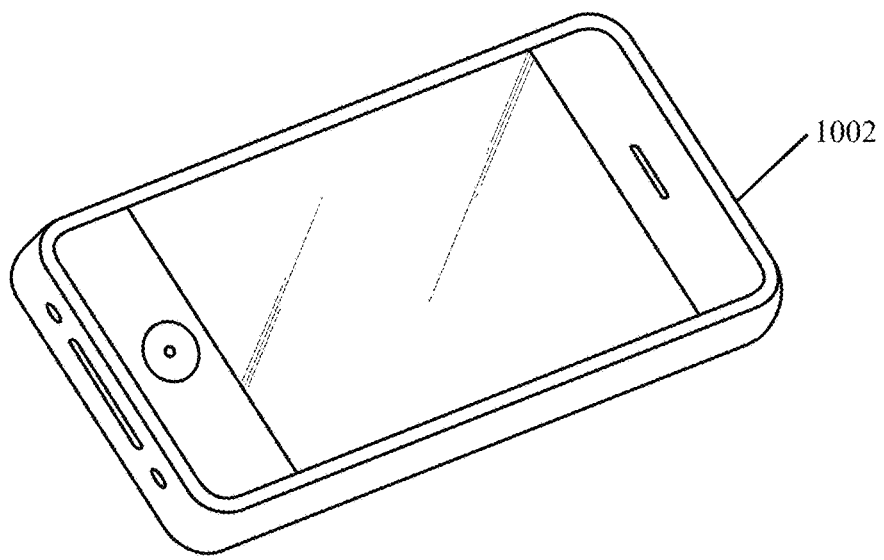
FIG. 11 shows one implementation of switching a smart phone to a wide-area mode of operation when the embedded motion sensory control device is laid flat and stationary.

FIG. 11 shows one implementation of switching a smart phone to a wide-area mode of operation 1100 when the embedded motion sensory control device is laid flat and stationary. As described above, orientation and acceleration of the smart phone 1002 can be measured using at least one of gyroscopes, accelerometers, tilt-sensors, and/or other such devices embedded in the smart phone 1002 and switch the smart phone 1002 to the wide-area mode of operation 1100.

Across-the-Room Mode

Figure 12A:
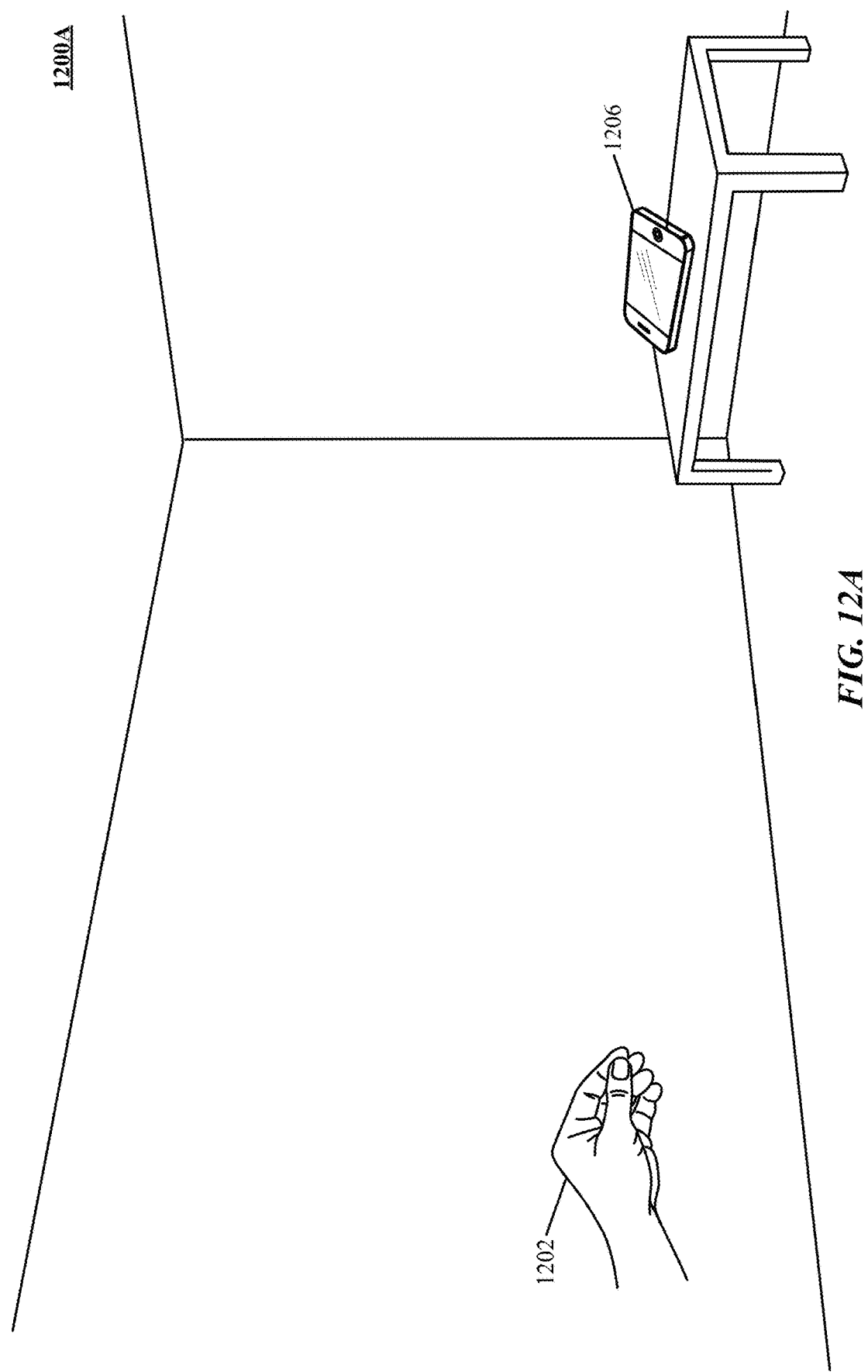
FIG. 12A depicts one implementation of switching a smart phone to an across-the-room mode of operation.

FIG. 12A depicts one implementation of switching a smart phone 1206 to an across-the-room mode 1200A of operation. In one implementation, when the smart phone 1206 is in a wide-area mode of operation 1100 and its embedded motion sensory control device detects a gesture 1202, the smart phone 1206 is switched to an across-the-room mode of operation 1200A.

Inter-Mode Operation

In one implementation, conserving power on a smart phones equipped with motion sensory control devices includes identifying a mode of operation of the smartphones. In one example, when the mode of operation is "hand-held," it is inferred that the user is in a telephonic conversation and does not intend to use the gesture recognition and interpretation capabilities of the embedded motion sensory control device. Thus, in the hand-held mode of operation, the recognition and interpretation capabilities of the embedded motion sensory control device can be lowered or de-activated to save power. In contrast, when the phone is "wide-area" or "across-the-room" mode of operations, such capabilities can be increased or activated. This is achieved by adjusting one or more image acquisition parameters and/or image-analysis parameters embedded motion sensory control device. Once adjusted, acquisition and/or analysis of image data by the motion sensory control device or other sensors of the smart phones are made compliant with the adjusted image acquisition parameters and/or image-analysis parameters. In some implementations, image acquisition parameters include frame resolution and frame capture rate and image-analysis parameters include analysis algorithm and analysis density.

In some other implementations, a "hand-held" mode of operation can initiate the gesture recognition and interpretation capabilities along with an "anti-jittering" effect or "drift-compensation" mode as described later in this application. In yet other implementations, power to illumination sources incorporated with the motion sensory device can be tailored for long distance operation, e.g., illumination sources can be "strobed" (e.g., pulsed) to provide intense bursts of illumination over a shorter period of time, effectively providing greater illumination at reduced power consumption.

In various implementations, operation of an embedded motion sensory control device is tailored and ideally tuned to one or more modes of operation of a smart phone. In general, images are captured by one or more cameras of the smart phone and stored in "frame buffers" i.e., partitions or dedicated segments of computer memory that store digital images as ordered arrays of image points or "pixels." A motion sensory control device can include a set of image-analysis algorithms that locate, in an image, groups or regions of pixels that correspond to an object in the recorded scene—e.g., a user's moving hand. A digital image has a size (in pixels) and a resolution, and the image-analysis algorithm takes image input and processes it into an output defining objects in the image and their movements from image to image. Once a mode of operations of the smart phone is determined, a suitable (and ideally well suited) combination of parameters is selected, specifying, for example, characteristics of the images, their rate of acquisition and how the image-analysis algorithm processes them so that adequate overall performance is provided.

Figure 12B:
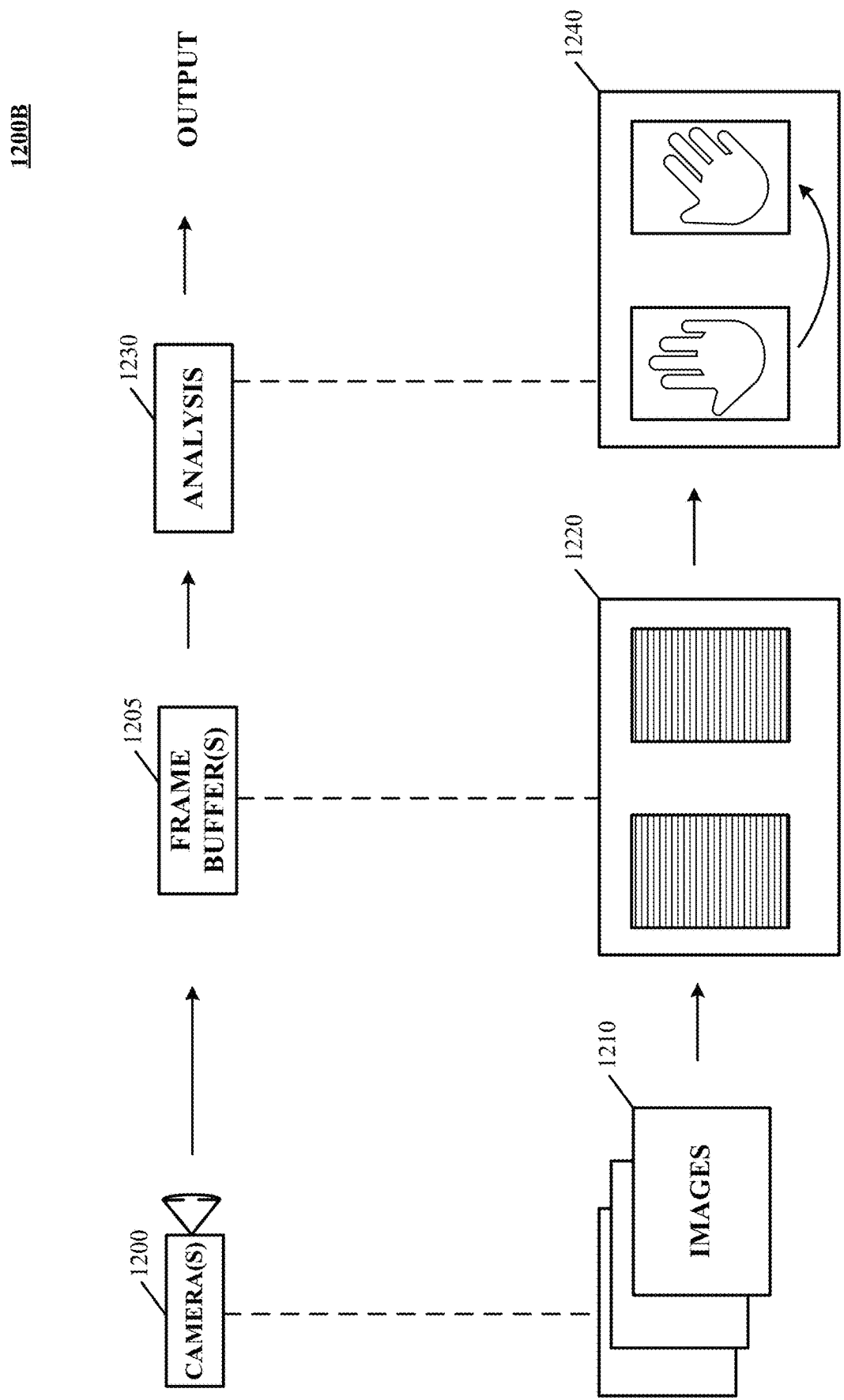
FIG. 12B depicts the basic operations and functional units involved in motion capture and image analysis in accordance with implementations of the technology disclosed.

FIG. 12B depicts the basic operations and functional units 1200B involved in motion capture and image analysis in accordance with implementations of the technology disclosed. As shown in FIG. 12, the camera(s) 1200 record digital images 1210 of a scene. Each digital image is captured as an array of pixel values by the associated camera's image sensor, and the digital images are transferred—either in "raw" format or following conventional preprocessing—to one or more frame buffers 1205. A frame buffer is a partition or dedicated segment of volatile memory that stores a "bitmapped" image frame 1220 corresponding to the pixel values of an image as output by the camera 1200 that recorded it. The bitmap is generally organized conceptually as a grid, with each pixel mapped one-to-one or otherwise to output elements of a display. It should be stressed, however, that the topology of how memory cells are physically organized within the frame buffers 1205 does not matter and need not conform directly to the conceptual organization.

The number of frame buffers included in a system generally reflects the number of images simultaneously analyzed by the analysis system or module 1230, which is described in greater detail below. Briefly, analysis module 1230 analyzes the pixel data in each of a sequence of image frames 1220 to locate objects therein and track their movement over time (as indicated at 1240). This analysis can take various forms, and the algorithm performing the analysis dictates how pixels in the image frames 1220 are handled. For example, the algorithm implemented by analysis module 1230 can process the pixels of each frame buffer on a line-by-line basis—i.e., each row of the pixel grid is successively analyzed. Other algorithms can analyze pixels in columns, tiled areas, or other organizational formats.

These operations are necessarily computationally intensive; the approach of the technology disclosed is to determine the capacity of the overall smart phone in terms of the responsible components, and to tailor the image analysis to accommodate phone limitations while respecting minimum performance requirements. This approach is best understood with reference to representative implementations of a smart phone (which establishes the computational capacity) and an image-analysis algorithm (execution of which can be altered in response to system capacity limitations).

In various implementations, the motion captured in a series of camera images is used to compute a corresponding series of output images for display on the display 138. For example, camera images of a moving hand can be translated into a wire-frame or other graphic depiction of the hand by the processor 132. Alternatively, hand gestures can be interpreted as input used to control a separate visual output; by way of illustration, a user can be able to use upward or downward swiping gestures to "scroll" a webpage or other document currently displayed, or open and close her hand to zoom in and out of the page. In any case, the output images are generally stored in the form of pixel data in a frame buffer, e.g., one of the frame buffers 1205. A video display controller reads out the frame buffer to generate a data stream and associated control signals to output the images to the display 138. The video display controller can be provided along with the processor 132 and memory 134 on-board the motherboard of the computer 100B, and can be integrated with the processor 132 or implemented as a co-processor that manipulates a separate video memory. As noted, the computer 100B can be equipped with a separate graphics or video card that aids with generating the feed of output images for the display 138. The video card generally includes a graphics processing unit (GPU) and video memory, and is useful, in particular, for complex and computationally expensive image processing and rendering. The graphics card can include the frame buffer and the functionality of the video display controller (and the on-board video display controller can be disabled). In general, the image-processing and motion-capture functionality of the system can be distributed between the GPU and the main processor 132 in various ways.

Suitable algorithms for motion-capture program 144 are described below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules can be programmed in any suitable programming language, including, without limitation high-level languages such as C, C++, C #, OpenGL, Ada, Basic, Cobra, FORTRAN, Java, Lisp, Perl, Python, Ruby, or Object Pascal, or low-level assembly languages.

In one implementation, cameras 102, 104 are operated to collect a sequence of images of the object 114. The images are time correlated such that an image from camera 102 can be paired with an image from camera 104 that was captured at the same time (or within a few milliseconds). These images are then analyzed by an image-analysis module 1230; in particular, an object detection routine detects the presence of one or more objects in the image, and the object/path analysis routine analyzes detected objects to determine their positions and shape in 3D space 1240. In some implementations, the analysis routine considers a stack of 2D cross-sections through the 3D spatial field of view of the cameras. These cross-sections are referred to herein as "slices." A slice can be any plane at least part of which is in the field of view of cameras 102, 104. For purposes of motion-capture analysis, slices can be selected at regular intervals in the field of view. For example, if the received images include a fixed number of rows of pixels (e.g., 1080 rows), each row can be a slice, or a subset of the rows can be used for faster processing. Where a subset of the rows is used, image data from adjacent rows can be averaged together, e.g., in groups of two or three.

Figure 12C:
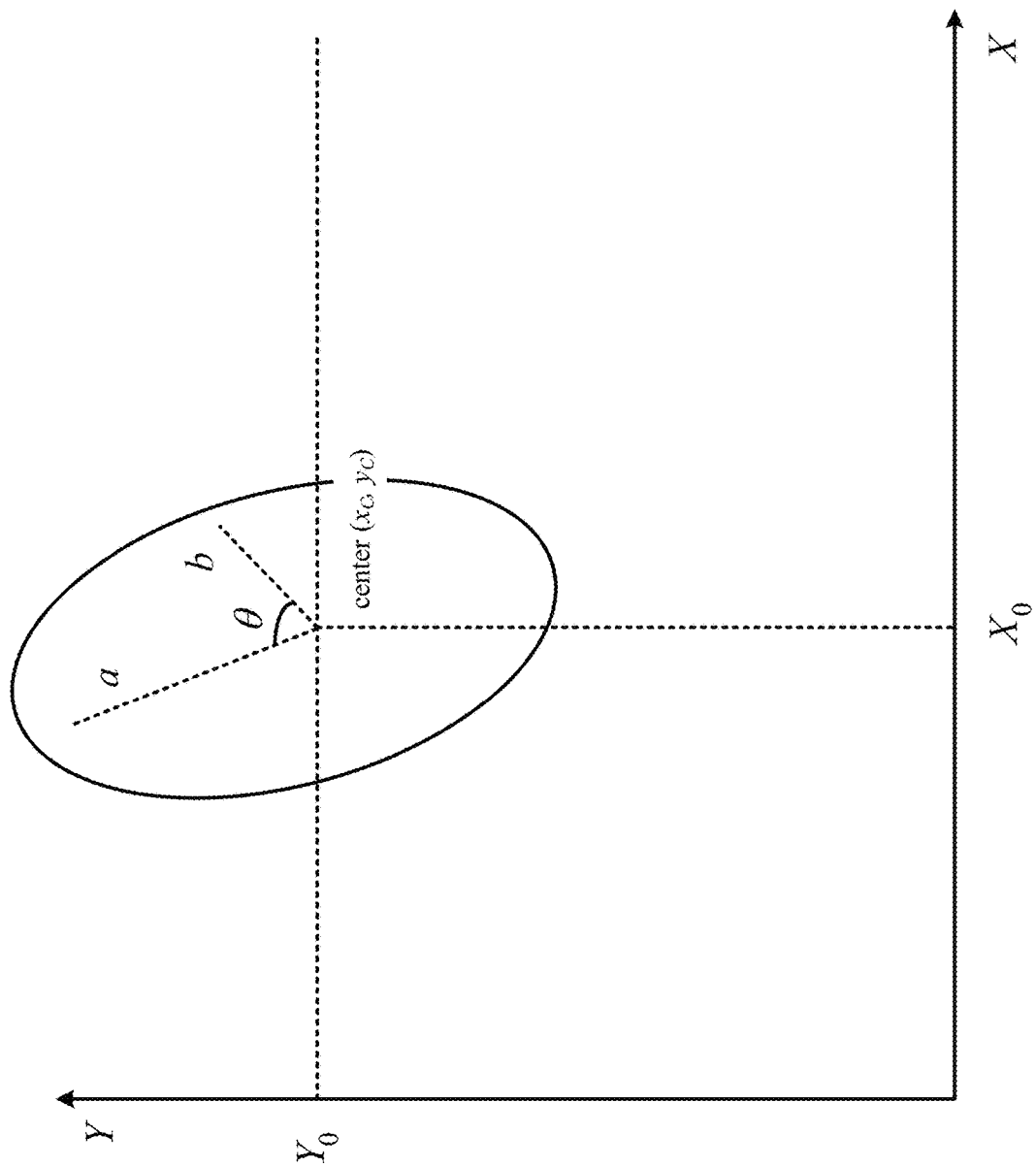
FIG. 12C is a characterization of an ellipse into different parameters across the xy plane.

In general, as shown in FIG. 12C, an ellipse in the xy plane can be characterized by five parameters: the x and y coordinates of the center ($x_C$, $y_C$), the semi-major axis (a), the semi-minor axis (b), and a rotation angle ($\theta$) (e.g., the angle of the semi-major axis relative to the x axis). With only four tangents, the ellipse is underdetermined. However, an efficient process 1200C for estimating the ellipse in spite of this has been developed. In various implementations as described below, this involves making an initial working assumption (or "guess") as to one of the parameters and revisiting the assumption as additional information is gathered during the analysis. This additional information can include, for example, physical constraints based on properties of the cameras and/or the object.

In some implementations, more than four tangents to an object can be available for some or all of the slices, e.g., because more than two vantage points are available. An elliptical cross-section can still be determined, and the process in some instances is somewhat simplified as there is no need to assume a parameter value. In some instances, the additional tangents can create additional complexity. In some implementations, fewer than four tangents to an object can be available for some or all of the slices, e.g., because an edge of the object is out of range of the field of view of one camera or because an edge was not detected. A slice with three tangents can be analyzed. For example, using two parameters from an ellipse fit to an adjacent slice (e.g., a slice that had at least four tangents), the system of equations for the ellipse and three tangents is sufficiently determined that it can be solved. As another option, a circle can be fit to the three tangents; defining a circle in a plane requires only three parameters (the center coordinates and the radius), so three tangents suffice to fit a circle. Slices with fewer than three tangents can be discarded or combined with adjacent slices.

In some implementations, each of a number of slices is analyzed separately to determine the size and location of an elliptical cross-section of the object in that slice. This provides an initial 3D model (specifically, a stack of elliptical cross-sections), which can be refined by correlating the cross-sections across different slices. For example, it is expected that an object's surface will have continuity, and discontinuous ellipses can accordingly be discounted. Further refinement can be obtained by correlating the 3D model with itself across time, e.g., based on expectations related to continuity in motion and deformation.

The modes of operation of the smart phone equipped with a motion sensory control device can determine the coarseness of the data provided to the image-analysis module 1230, the coarseness of its analysis, or both in accordance with entries in a performance database. For example, during a wide-area mode of operation 1100, the image-analysis module 1230 can operate on every image frame and on all data within a frame, capacity limitations can dictate analysis of a reduced amount of image data per frame (i.e., resolution) or discarding of some frames altogether. If the data in each of the frame buffers 1205 are organized as a sequence of data lines. The manner in which data is dropped from the analysis can depend on the image-analysis algorithm or the uses to which the motion-capture output is put. In some implementations, data is dropped in a symmetric or uniform fashion—e.g., every other line, every third line, etc. is discarded up to a tolerance limit of the image-analysis algorithm or an application utilizing its output. In other implementations, the frequency of line dropping can increase toward the edges of the frame. Still other image-acquisition parameters that can be varied include the frame size, the frame resolution, and the number of frames acquired per second. In particular, the frame size can be reduced by, e.g., discarding edge pixels or by resampling to a lower resolution (and utilizing only a portion of the frame buffer capacity). Parameters relevant to acquisition of image data (e.g., size and frame rate and characteristics) are collectively referred to as "acquisition parameters," while parameters relevant to operation of the image-analysis module 1230 (e.g., in defining the contour of an object) are collectively referred to as "image-analysis parameters." The foregoing examples of acquisition parameters and image-analysis parameters are representative only, and not limiting.

Acquisition parameters can be applied to the camera 1200 and/or to the frame buffers 1205. The camera 1200, for example, can be responsive to acquisition parameters in operating the cameras 102, 104 to acquire images at a commanded rate, or can instead limit the number of acquired frames passed (per unit time) to the frame buffers 1205. Image-analysis parameters can be applied to the image-analysis module 1230 as numerical quantities that affect the operation of the contour-defining algorithm.

The desirable values for acquisition parameters and image-analysis parameters appropriate to a given level of available resources can depend, for example, on the characteristics of the image-analysis module 1230, the nature of the application utilizing the mocap output, and design preferences. Whereas some image-processing algorithms can be able to trade off a resolution of contour approximation against input frame resolution over a wide range, other algorithms may not exhibit much tolerance at all—requiring, for example, a minimal image resolution below which the algorithm fails altogether.

Pairing Mode

Figure 13:
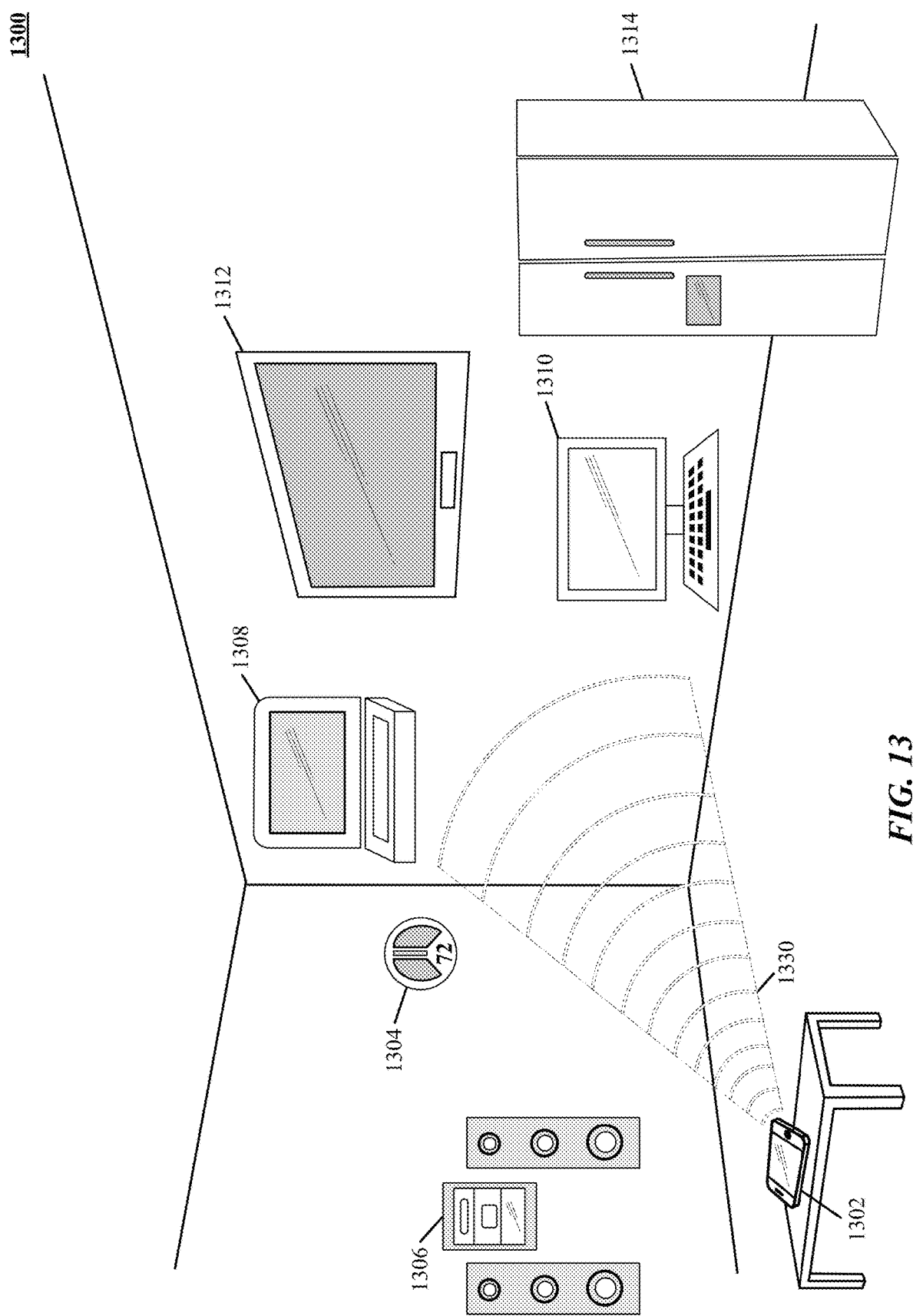
FIG. 13 illustrates one implementation of switching a smart phone to a pairing mode of operation.

FIG. 13 illustrates one implementation of switching a smart phone 1302 to a pairing mode of operation 1300. In such an implementation, devices (1304, 1306, 1308, 1310, 1312, 1314) and smart phone 1302 can use Bluetooth technology to establish a communication channel between the smart phone 1302 and selected one of the discovered devices, when the smart phone 1302 is laid flat and stationary. This is achieved by exchanging device identity tokens that include data payloads in their respective discovery beacons like the one shown in FIG. 13 as 1330. In some implementations, the Bluetooth technology can include an identification phase and a pairing phase. During the identification phase, the smart phone 1302 can set a frequency-hopping pattern, to which the devices (1304, 1306, 1308, 1310, 1312, 1314) can synchronize their signals. In the pairing phase, devices (1304, 1306, 1308, 1310, 1312, 1314) and smart phone 1302 can transmit low power short-range RF signals and broadcast device identity tokens. Alternatively, device identity tokens can be received and processed without pairing in a connectionless mode.

Drift-Compensation Mode

Implementations of the technology disclosed can be applied to determine the path of an object traveling in relation to a movable or moving frame of reference associated with one or more optical, acoustic or vibrational sensors. Advantageously, some implementations can enable gesture recognition for use in smart phones. This capability allows the user to execute intuitive gestures with virtualized or real-world contact with a real-world or virtual object using a smart phone while compensating for jittery motion of the smart phone by distinguishing motion of objects from motions of the smart phone itself in order to facilitate proper gesture recognition.

Figure 14A:
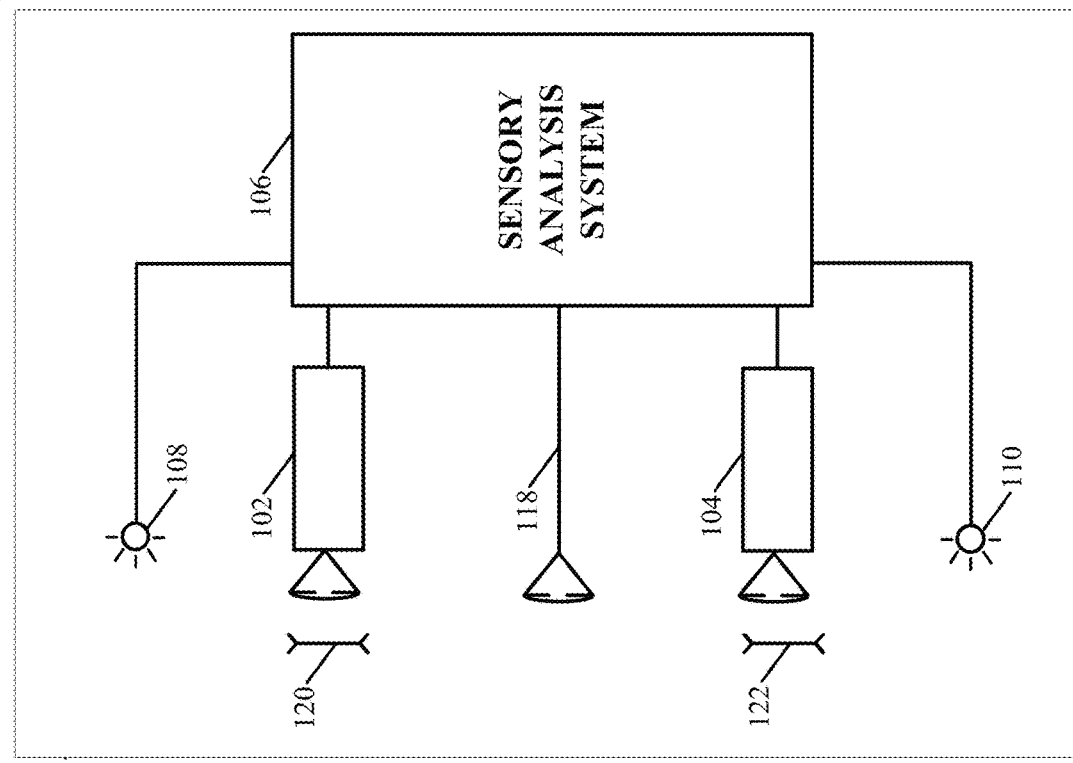
FIG. 14A illustrates one implementation of switching a smart phone to a drift-compensation mode of operation.
Figure 14A:
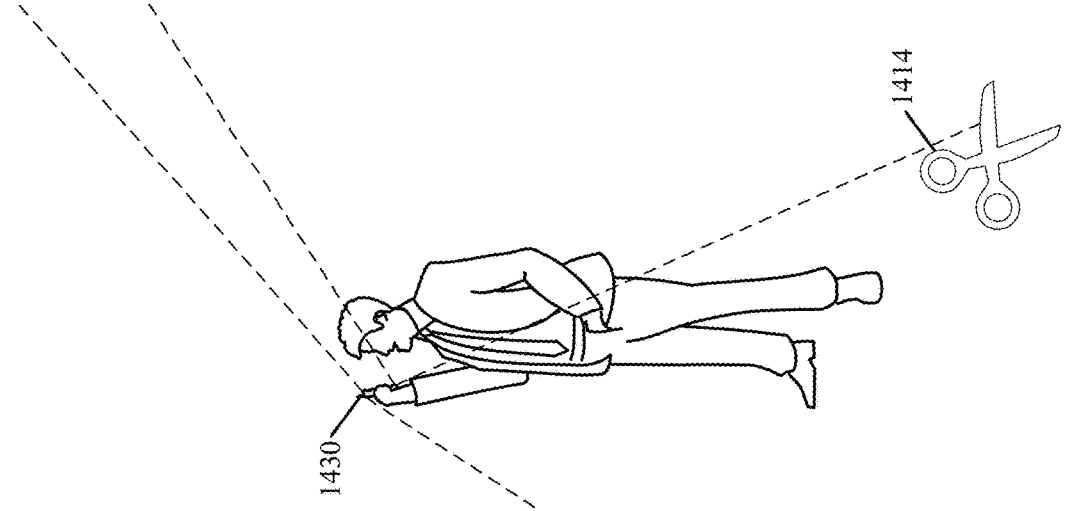
Figure 14A:
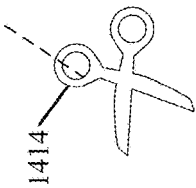

FIG. 14A illustrates one implementation of switching a smart phone to a drift-compensation mode of operation 1400A. In particular, FIG. 14A illustrates a system for capturing image data according to one implementation of the technology disclosed. In one implementation, gesture-recognition system 100A is preferably incorporated into a smart phone 1430, or other type of portable device.

Figure 14B:
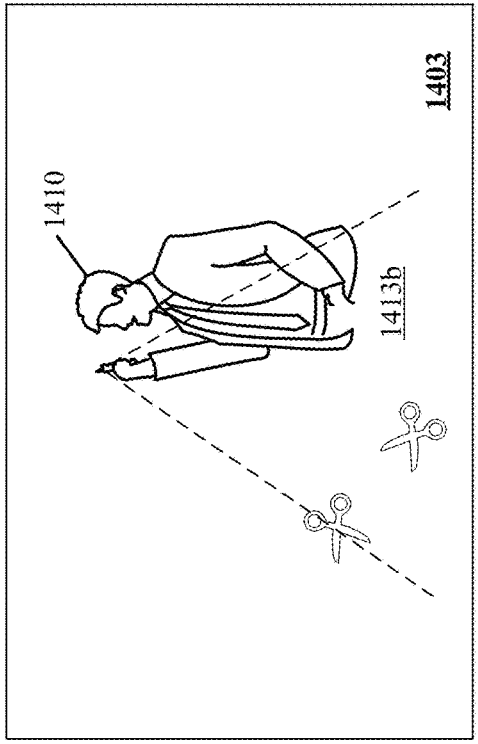
FIG. 14B illustrates apparent movement of objects from the perspective of the user of a virtual environment enabled apparatus in accordance with the technology disclosed.
Figure 14B:
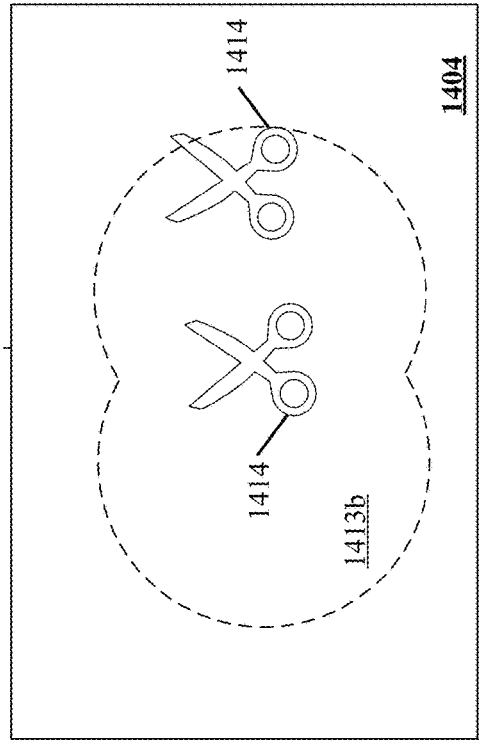
Figure 14B:
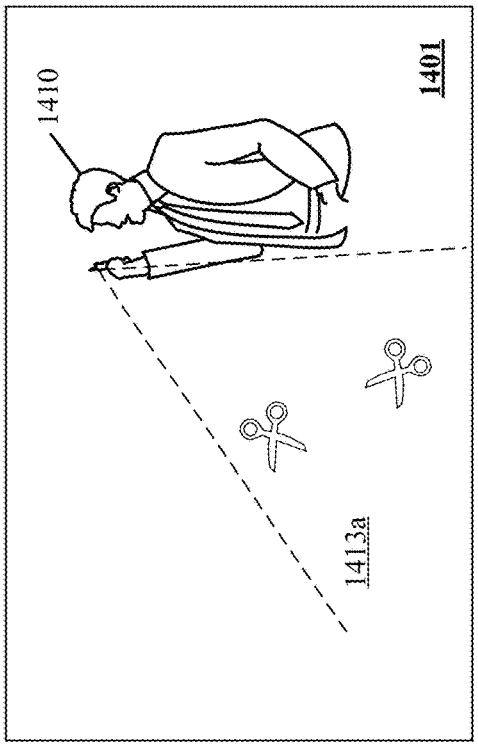
Figure 14B:
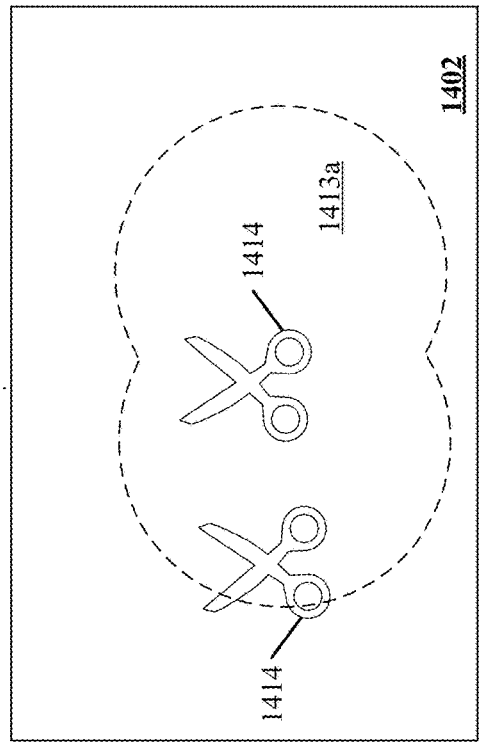

FIG. 14B illustrates apparent movement of objects from the perspective of the user of a virtual environment 1400B enabled apparatus in accordance with the technology disclosed. FIG. 14B shows two views of a user of a device 1410 viewing a field of view 1413 at two different times. As shown in block 1401, at an initial time $t_0$, user is viewing field of view 1413a using device 1401 in a particular initial position to view an area 1413a. As shown in block 1402, device 1410 presents to user a display of the device field of view 1413a that includes objects 1414 (scissors) in a particular pose. As shown in block 1403, subsequently at time $t_1$, the user has repositioned device 1410. Accordingly, the apparent position of objects 1414 in the field of view 1413b shown in block 1404 has changed from the apparent position of the objects 1414 in field of view 1413a. Even in the case where the scissors 1414 did not move in space, the user sees an apparent movement of the scissors 1414 due to the change in position of the device.

Figure 15:
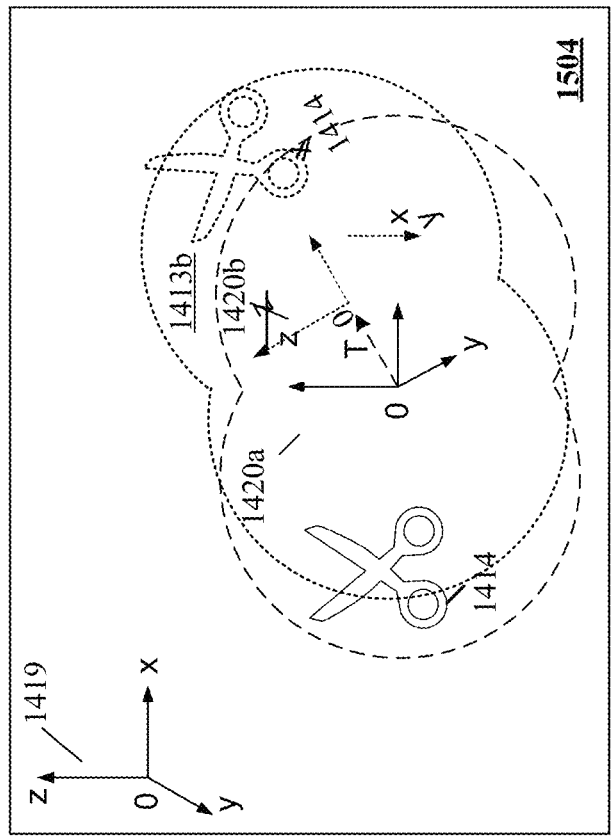
FIG. 15 illustrates apparent movement of objects from the perspective of the user of a virtual environment enabled apparatus in accordance with the technology disclosed.
Figure 15:
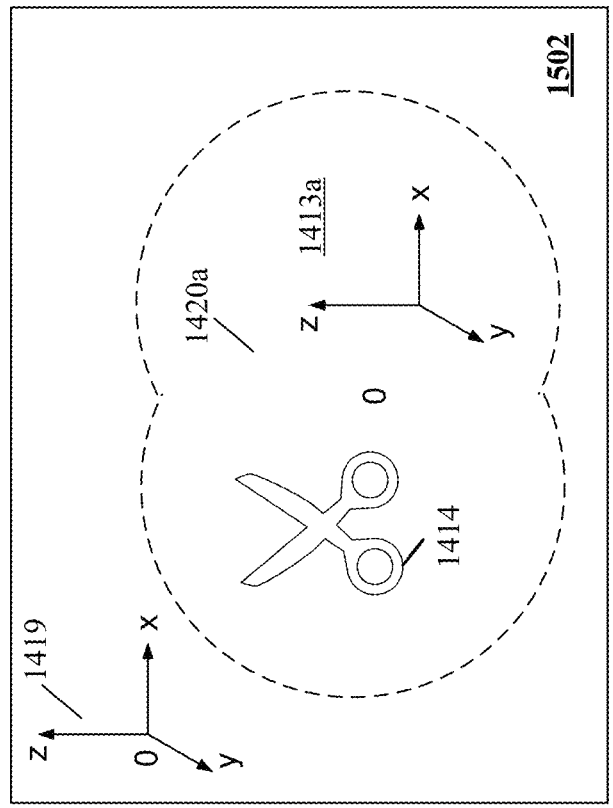

FIG. 15 illustrates apparent movement of objects from the perspective of the user of a virtual environment 1500 enabled apparatus in accordance with the technology disclosed. As shown by block 1502, field of view 1413a presented by device 1410 at time $t_0$ includes an object 1414. At time $t_0$, the position and orientation of tracked object 1414 is known with respect to device reference frame 1420a, again at time $t_0$. As shown by block 1504, at time $t_1$, the position and orientation of both device reference frame 1420b and tracked object 1414 have changed. As shown by block 1504, field of view 1413b presented by device 1410 at time $t_1$ includes object 1414 in a new apparent position. Because the device 1410 has moved, the device reference frame 1420 has moved from an original or starting device reference frame 1420a to a current or final reference frame 1420b as indicated by transformation T. It is noteworthy that the device 1410 can rotate as well as translate. Implementations can provide sensing the position and rotation of reference frame 1420b with respect to reference frame 1420a and sensing the position and rotation of tracked object 1414 with respect to 1420b, at time $t_1$. Implementations can determine the position and rotation of tracked object 1414 with respect to 1420a from the sensed position and rotation of reference frame 1420b with respect to reference frame 1420a and the sensed position and rotation of tracked object 1414 with respect to 1420b.

In an implementation, a transformation $R^T$ is determined that moves dashed-line reference frame 1420a to dotted-line reference frame 1420b. Applying the reverse transformation—$R^T$ makes the dotted-line reference frame 1420b lie on top of dashed-line reference frame 1420a. Then the tracked object 1414 will be in the right place from the point of view of dashed-line reference frame 1420a. In determining the motion of object 1414, system 100A can determine its location and direction by computationally analyzing images captured by cameras 102, 104 and motion information captured by motion sensory control device 600. For example, an apparent position of any point on the object (in 3D space) at time $$t = t_0: \begin{bmatrix} x \\ y \\ z \\ 1 \end{bmatrix},$$

can be converted to a real position of the point on the object at time $$t = t_1: \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}.$$

We refer to the combination of a rotation and translation, which are not generally commutative, as the affine transformation. The correct location at time $t=t_1$ of a point on the tracked object with respect to device reference frame 1420a is given by equation (1):

$$\begin{bmatrix} R_{ref}^T & (-R_{ref}^T) * T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (1)$$

Where:
$R_{ref}^T$—Represents the rotation matrix portion of an affine transform describing the transformation from the device reference frame 1420a to the device reference frame 1420b.

$T_{ref}$—Represents translation of the device reference frame 1420a to the device reference frame 1420b.

One conventional approach to obtaining the Affine transform R (from axis unit vector $u=(u_x, u_y, u_z)$, rotation angle θ) method. Wikipedia, at http://en.wikipedia.org/wiki/Rotation_matrix, Rotation matrix from axis and angle, on Jan. 30, 2014, 20:12 UTC, upon which the computations equation (2) are at least in part inspired:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix} \quad (2)$$

$$R^T = \begin{bmatrix} \cos\theta + u_x^2(1-\cos\theta) & u_y u_x(1-\cos\theta) + u_z\sin\theta & u_z u_x(1-\cos\theta) - u_y\sin\theta \\ u_x u_y(1-\cos\theta) - u_z\sin\theta & \cos\theta + u_y^2(1-\cos\theta) & u_z u_y(1-\cos\theta) + u_x\sin\theta \\ u_x u_z(1-\cos\theta) + u_y\sin\theta & u_y u_z(1-\cos\theta) - u_x\sin\theta & \cos\theta + u_z^2(1-\cos\theta) \end{bmatrix}$$

-continued $$-R^T = \begin{bmatrix} -\cos\theta - u_x^2(1-\cos\theta) & -u_yu_x(1-\cos\theta) - u_z\sin\theta & -u_zu_x(1-\cos\theta) + u_y\sin\theta \\ -u_xu_y(1-\cos\theta) + u_z\sin\theta & -\cos\theta - u_y^2(1-\cos\theta) & -u_zu_y(1-\cos\theta) - u_x\sin\theta \\ -u_xu_z(1-\cos\theta) - u_y\sin\theta & -u_yu_z(1-\cos\theta) + u_x\sin\theta & -\cos\theta - u_z^2(1-\cos\theta) \end{bmatrix}$$

$$T = \begin{bmatrix} a \\ b \\ c \end{bmatrix}$$

is a vector representing a translation of the object with respect to origin of the coordinate system of the translated frame $$-R^T * T = \begin{bmatrix} (-\cos\theta - u_x^2(1-\cos\theta))(a) + (-\cos\theta - u_y^2(1-\cos\theta))(b) + (-u_zu_x(1-\cos\theta) + u_y\sin\theta)(c) \\ (-u_xu_y(1-\cos\theta) + u_z\sin\theta)(a) + (-\cos\theta - u_y^2(1-\cos\theta))(b) + (-u_zu_y(1-\cos\theta) - u_x\sin\theta)(c) \\ (-u_xu_z(1-\cos\theta) - u_y\sin\theta)(a) + (-u_yu_z(1-\cos\theta) + u_x\sin\theta)(b) + (-\cos\theta - u_z^2(1-\cos\theta))(c) \end{bmatrix}$$

In another example, an apparent orientation and position of the object at time $t=t_0$: affine transform $$\begin{bmatrix} R_{obj} & T_{obj} \\ 0 & 1 \end{bmatrix},$$

can be converted to a real orientation and position of the object at time $$t = t_1: \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

The correct orientation and position of the tracked object with respect to device reference frame at time $t=t_0$ (1420a) is given by an inverse affine transformation, e.g., $$\begin{bmatrix} R_{ref}^T & (-R_{ref}^T)*T_{ref} \\ 0 & 1 \end{bmatrix}$$

as provided in equation (3):

$$\begin{bmatrix} R_{ref}^T & (-R_{ref}^T)*T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (3)$$

Where:
$R_{ref}^T$—Represents the rotation matrix part of an affine transform describing the rotation transformation from the device reference frame 1420a to the device reference frame 1420b.

$R_{obj}$—Represents a matrix describing the rotation at $t_0$ of the object with respect to the device reference frame 1420b.

$R'_{obj}$—Represents a matrix describing the rotation at $t_1$ of the object with respect to the device reference frame 1420a.

$T_{ref}$—Represents a vector translation of the device reference frame 1420a to the device reference frame 1420b.

$T_{obj}$—Represents a vector describing the position at $t_0$ of the object with respect to the device reference frame 1420b.

$T'_{obj}$—Represents a vector describing the position at $t_1$ of the object with respect to the device reference frame 1420a.

In a yet further example, an apparent orientation and position of the object at time $t=t_0$: affine transform $$\begin{bmatrix} R_{obj} & T_{obj} \\ 0 & 1 \end{bmatrix},$$

can be converted to a real orientation and position of the object at time $$t = t_1: \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

Furthermore, the position and orientation of the initial reference frame with respect to a (typically) fixed reference point in space can be determined using an affine transform $$\begin{bmatrix} R_{init} & T_{init} \\ 0 & 1 \end{bmatrix}.$$

The correct orientation and position of the tracked object with respect to device reference frame at time $t=t_0$ (1420a) is given by equation (4):

$$\begin{bmatrix} R_{init}^T & (-R_{init}^T)*T_{init} \\ 0 & 1 \end{bmatrix} \begin{bmatrix} R_{ref}^T & (-R_{ref}^T)*T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (4)$$

Where:

$R_{init}^T$—Represents a rotation matrix part of an affine transform describing the rotation transformation at $t_0$ from the world reference frame 1419 to the device reference frame 1420a.

$R_{ref}^T$—Represents a rotation matrix part of an affine transform describing the rotation transformation from the device reference frame 1420a to the device reference frame 1420b.

$R_{obj}$—Represents a matrix describing the rotation of the object at $t_0$ with respect to the device reference frame 1420b.

$R'_{obj}$—Represents a matrix describing the rotation of the object at $t_1$ with respect to the device reference frame 1420a.

$T_{init}$—Represents a vector translation at $t_0$ of the world reference frame 1419 to the device reference frame 1420a.

$T_{ref}$ Represents a vector translation at $t_1$ of the device reference frame 1420a to the device reference frame 1420b.

$T_{obj}$—Represents a vector describing the position at $t_0$ of the object with respect to the device reference frame 1420b.

$T'_{obj}$—Represents a vector describing the position at $t_1$ of the object with respect to the device reference frame 1420a.

Near-Field Communication

Figure 16:
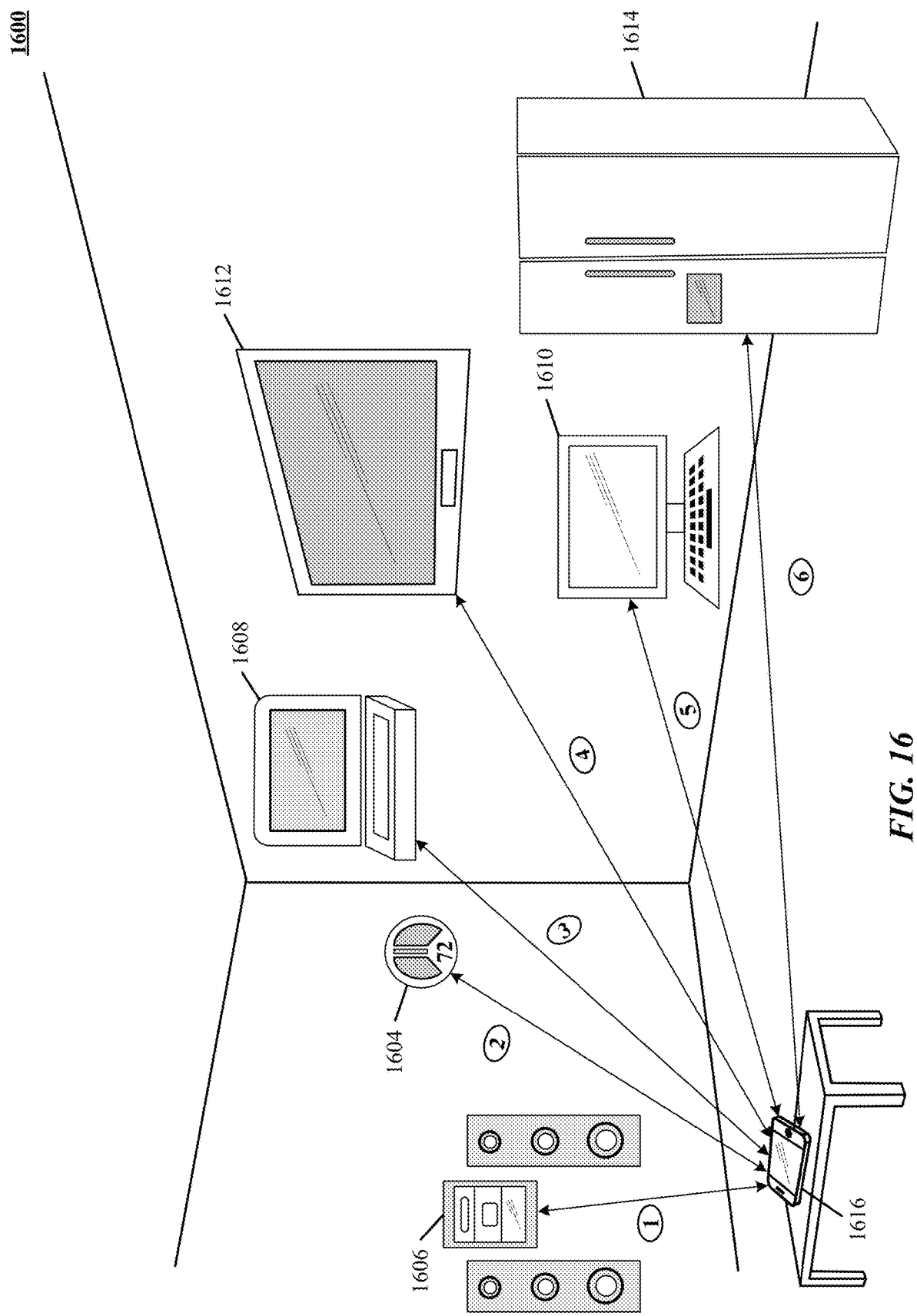
FIG. 16 shows one implementation of broadcasting device identity tokens from the heterogeneous appliances over an ultra-short-range communication channel in a pervasive computing environment.

FIG. 16 shows one implementation 1600 of broadcasting device identity tokens from the heterogeneous appliances over an ultra-short-range communication channel in a pervasive computing environment. In some implementations, the devices (1604, 1606, 1608, 1610, 1612, 1614) and smart phone 1616 can use near field communication (NFC) for ultra-short-range communication and replace the identification phase of the Bluetooth technology with a simple tap between the devices (1604, 1606, 1608, 1610, 1612, 1614) and smart phone 1616. In case of NFC, the devices (1604, 1606, 1608, 1610, 1612, 1614) and smart phone 1616 can include antennas that function as windings of a transformer to generate high power ultra-short-range RF signals for broadcasting device identity tokens (1, 2, 3, 4, 5, 6). In other implementations, a radio frequency identifier (RFID) or NFC identifier can be included in the device identity tokens (1, 2, 3, 4, 5, 6), which are transmitted by the devices (1604, 1606, 1608, 1610, 1612, 1614) to the smart phone 1616. The RFID or NFC identifier can be received or read by an RFID or NFC reader integrated in the smart phone 1616.

In some implementations, the devices (1604, 1606, 1608, 1610, 1612, 1614) and smart phone 1616 can participate in wireless local area network (WLAN) through Wi-Fi, via an access point (AP) that broadcasts a Wi-Fi signal usable over a medium-range area. In response to a media access control (MAC) address based address resolution protocol (ARP) scan initiated by devices (1604, 1606, 1608, 1610, 1612, 1614) and smart phone 1616, the AP can generate a list of devices connected to it along with their MAC address, names, format, Internet Protocol (IP), etc.

In some implementations, device identify tokens can be generated in the form of a barcode such as quick response (QR) code. The QR code can be stored in the smart phone 1616 in an electronic form and/or further printed/labeled/affixed. The QR code then can be scanned on a RFID reader or scanner appended to the devices (1604, 1606, 1608, 1610, 1612, 1614). In other implementations, the QR code can be a scan-able URL directing to a website or webpage address including information about the user-customized beverage formulation.

Short-range communication systems such as Bluetooth, Near Field Communication (NFC), RFID, Z-Wave, ZigBee, etc. can establish peer-to-peer (P2P) connection between the devices (1604, 1606, 1608, 1610, 1612, 1614) and the smart phone 1616 when they are in close physical proximity to each other. During a P2P connection, devices (1604, 1606, 1608, 1610, 1612, 1614) and smart phone 1616, when within transmission range of each other, broadcast device identity tokens. In P2P passive or connectionless mode, one of the devices can initiate the broadcast, and other can behave as a receiver without pairing. In P2P active mode, in which the devices are paired or have built a connection, both devices (1604, 1606, 1608, 1610, 1612, 1614) and smart phone 1616 can transmit and receive identity device identity tokens (1, 2, 3, 4, 5, 6).

WLAN, such as Wi-Fi, can connect the devices (1604, 1606, 1608, 1610, 1612, 1614) and smart phone 1616 to AP using medium range signals. During WLAN connection, devices (1604, 1606, 1608, 1610, 1612, 1614) and smart phone 1616 can operate in broadcast (connectionless) or connected modes. In a broadcast mode, broadcasting devices (1604, 1606, 1608, 1610, 1612, 1614) and smart phone 1616 connected to a shared AP can be presumed to be in close proximity. Tokens can, for instance, be broadcast to MAC address or to another MAC or IP address of a defined network segment scope. Broadcasting to a MAC address is supported by IPv4 and IEEE 802.11. In IPv6, multicasting takes the place of broadcasting. Tokens can be embedded in recognized broadcast message types. One example of a broadcast protocol is Internet Control Message Protocol, which is implemented in both IPv4 and IPv6. ICMP messages of various types could be used or a new type chosen from the reserved range of type codes. Another example of a broadcast protocol supported by IPv4 is the address resolution protocol (ARP). Query messages can be used to scan a WLAN segment. From responses to a query, a list of unique media access control (MAC) addresses of connected devices can be compiled. In IPv6, the neighborhood discovery protocol (NDP) specifies a variety of multicast message types that could be adapted for transmitting identity token information. When the devices (1604, 1606, 1608, 1610, 1612, 1614) and smart phone 1616 can broadcast ARP messages or device identity tokens (1, 2, 3, 4, 5, 6), the AP can forward the broadcasts to other connected devices. In some implementations, multiple APs covering a single location, such as a large meeting room, can be relay broadcasts as a group or can be treated as a single AP.

Proximity-Based Selection

Figure 18:
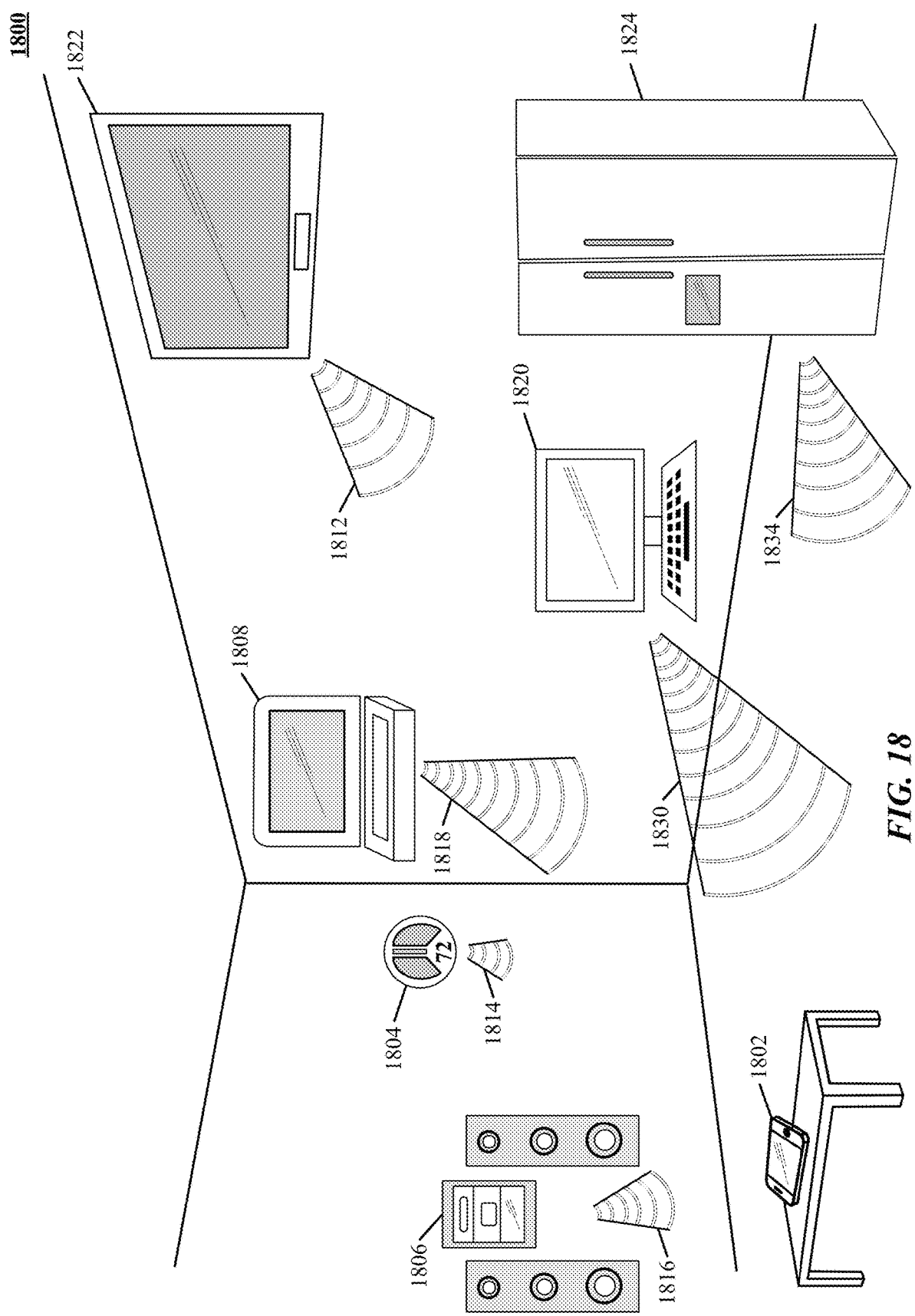
FIG. 18 shows one implementation of selecting a device in a pervasive computing environment based on level of proximity of the devices.

FIG. 18 is one implementation shows one implementation of selecting a device in a pervasive computing environment 1800 based on level of proximity of the devices. In some implementations, a threshold or timeout limit can be set to help smart phone 1802 aggregate connection events resulting from successive reception of the same device identity token. In aggregated connection events resulting from reception of multiple device identity tokens, device identity tokens with higher counts, lengthier timestamps readings, or greater received signal strengths indications (RSSI) can indicate sustained and close proximity of two devices.

RSSI

In one implementation, the level of proximity is calculated based RSSI (1814, 1816, 1818, 1830, 1812, 1834) of the devices (1804, 1806, 1808, 1820, 1822, 1824). In some implementations, RSSI is measured based on the duration of transmission between the smart phone 1802 and devices (1804, 1806, 1808, 1820, 1822, 1824). In aggregated connection events resulting from reception of multiple device identity tokens, device identity tokens with higher counts or lengthier timestamps readings can indicate sustained and close proximity of two devices.

Aggregation can be performed on the smart phone 1802 and devices (1804, 1806, 1808, 1820, 1822, 1824), or both. For instance, the smart phone 1802 and devices (1804, 1806, 1808, 1820, 1822, 1824) can aggregate received device identity tokens to determine timestamp duration. In some implementations, failure to receive a device identity token from a broadcasting device within a pre-set time window can cause the receiving device to close and summarize a connection event. After a timeout duration without receiving further device identity tokens, the smart phone 1802 and devices (1804, 1806, 1808, 1820, 1822, 1824) can store in memory the batch of collected device identity tokens and associated metadata including timestamp durations and RSSI value. The smart phone 1802 and devices (1804, 1806, 1808, 1820, 1822, 1824) can indicate the quality of a transmission as "strong" or "average" based on the number of collected device identity tokens and the associated metadata values. The quality of a broadcast can indicate close proximity of the broadcasting device and be used to calculate a level of proximity.

Positional Information

Figure 19:
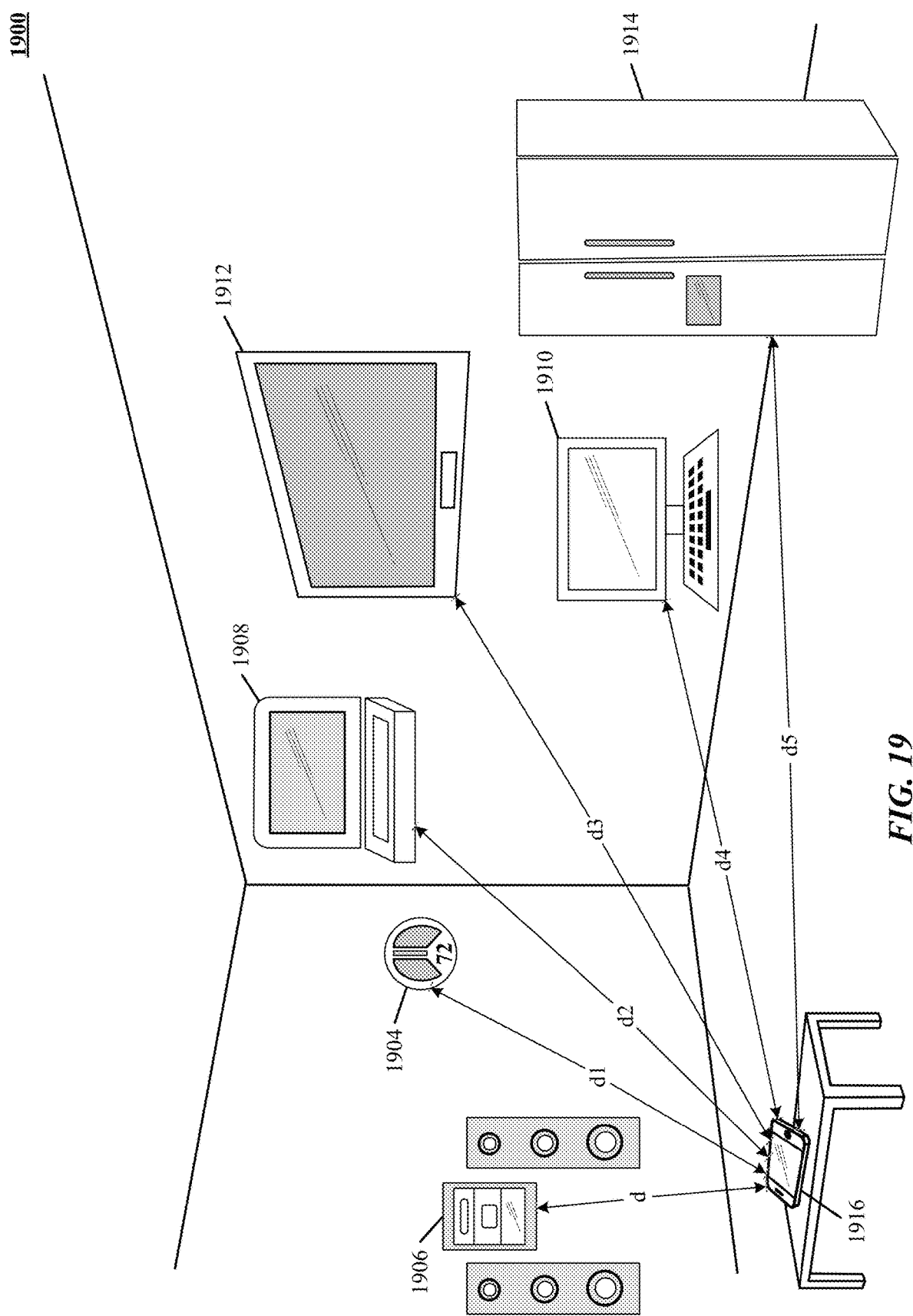
FIG. 19 depicts one implementation of selecting a device in a pervasive computing environment based on positional information of the devices.

FIG. 19 depicts one implementation of selecting a device in a pervasive computing environment 1900 based on positional information of the devices. The location information of smart phone 1916 and devices (1904, 1906, 1908, 1912, 1910, 1914) can be used to determine a level of proximity between them, according to some implementations. In some implementations, a location data transceiver and a network adapter, coupled to a respective processors running on the smart phone 1916 and devices (1904, 1906, 1908, 1912, 1910, 1914), can generate the corresponding location data (d, d1, d2, d3, d4, d5). In some implementations, this location data can be calculated using real-time GPS or GNSS reporting.

In some implementations, when the smart phone 1916 is within the transmission range of the devices (1904, 1906, 1908, 1912, 1910, 1914), a physical proximity event can be automatically created and stored in the memory unit of smart phone 1916. The creation of the physical proximity event can trigger when the location of smart phone 1916 matches the location of the devices (1904, 1906, 1908, 1912, 1910, 1914). In other implementations, it can be created upon initiation of peer-to-peer communication between the smart phone 1916 and devices (1904, 1906, 1908, 1912, 1910, 1914).

In one implementation, positional information of the devices (1904, 1906, 1908, 1912, 1910, 1914) is determined by conducting scanning of the pervasive computing environment 1900 with an emission from a transmission area according to an ordered scan pattern. Scans may be continuous or discontiguous. The emission can be received to form a signal based upon at least one salient property (e.g., intensity, amplitude, frequency, polarization, phase, or other detectable feature) of the emission varying with time at the devices (1904, 1906, 1908, 1912, 1910, 1914). Synchronization information (e.g., a particular angle of a sum emission at a known point in space at a known time as seen from the emitter) about the ordered scan pattern can be derived from a source (e.g., the emission itself, a component of the emission (i.e., sub-channel, etc.), a second signal broadcast separately, social media share, others, or and/or combinations thereof). A correspondence between at least one characteristic of the signal and the synchronization information can be established. Positional information can be determined based at least in part upon the correspondence.

In one implementation, the correspondence is established by determining that some signal characteristic (e.g., a double peak in an Intensity vs. time signal) corresponds to a synch "chirp" (i.e., a nearest synch max to nearest synch chirp gives some number between 0-360 degrees)).

In another implementation, positional information is derived by translating the correspondence (e.g., some degrees from 0-360) into an angular position about the emitter.

In some implementations, one or more emitters in the pervasive computing environment 1900 can be selectively powered on (e.g. one-at-a-time, in groups, sequentially or according to some pattern), pulsed, cross-faded, or any combination thereof to advantageously "scan" the pervasive computing environment 1900. A scan may comprise a digital pulsing, a continuous variation of amplitude or intensity, or any combination thereof. A scan can include an ordering such that different areas in the field of interest receive characteristic emission from the transmission area corresponding to the ordering of the scan pattern. In one implementation, an ordering of emissions in an ordered scan pattern reflects "timing", which may comprise but is not necessarily limited to the time in which certain emissions take place. Receivers in proximity to the object of interest capture the emission (e.g. radio antennas, microphones, photodiodes, CCD array and/or CMOS array and/or other types of devices capable of converting a salient feature of the received emission over time into current or voltage and/or combinations thereof) as a signal over time. A synchronization method can be used to obtain information about the timing of the ordered scan pattern. A mechanism in hardware or software can be used to compare the timing information to the signal over time and extract positional information.

Converting Gesturally Unresponsive Devices to be Gesturally Responsive

Traditionally, users have interacted with electronic devices (such as a computer or a television) or computing applications (such as computer games, multimedia applications, or office applications) via indirect input devices, including, for example, keyboards, joysticks, or remote controllers. The user manipulates the input devices to perform a particular operation, such as selecting a specific entry from a menu of operations. Modern input devices, however, include multiple buttons, often in a complex configuration, to facilitate communication of user commands to the electronic devices or computing applications; correct operation of these input devices is often challenging to the user. Additionally, actions performed on an input device generally do not correspond in any intuitive sense to the resulting changes on, for example, a screen display controlled by the device. Input devices can also be lost, and the frequent experience of searching for misplaced devices has become a frustrating staple of modern life.

Touch screens implemented directly on user-controlled devices have obviated the need for separate input devices. A touch screen detects the presence and location of a "touch" performed by a user's finger or other object on the display screen, enabling the user to enter a desired input by simply touching the proper area of a screen. While suitable for small display devices such as tablets and wireless phones, touch screens are impractical for large entertainment devices that the user views from a distance. Particularly for games implemented on such devices, electronics manufacturers have developed systems that detect a user's movements or gestures and cause the display to respond in a contextually relevant manner. The user's gestures can be detected using an optical imaging system, and are characterized and interpreted by suitable computational resources. For example, a user near a TV can perform a sliding hand gesture, which is detected by the gesture-recognition system; in response to the detected gesture, the TV can activate and display a control panel on the screen, allowing the user to make selections thereon using subsequent gestures; for example, the user can move her hand in an "up" or "down" direction, which, again, is detected and interpreted to facilitate channel selection.

While these gesture-recognition systems have generated substantial consumer excitement, the user accustomed to traditional input devices must forgo familiar patterns of interactivity in favor of a new mode with its own "vocabulary" of command and response. Indeed, gesture vocabularies can vary from system to system. Particularly for traditional applications—such as web browsers and word processors, whose operation depends heavily on familiar controllers—consumer resistance to adopting gesture-based control can be substantial.

Consequently, there is a need for a gesture-recognition system that responds in ways similar to the behavior of conventional control devices, and ideally which is responsive to user perceptions of what constitutes similarity.

The technology disclosed relates to gesturally interacting with devices that lack gestural responsiveness using a smart phone equipped with a motion sensory control device. It also relates to controlling a display using gestures. In particular, it relates to detecting a standard input device that causes on-screen actions on a display in response to control manipulations performed using the standard input device. Further, a library of analogous gestures is identified, which includes gestures that are analogous to the control manipulations and also cause the on-screen actions responsive to the control manipulations. Thus, when a gesture from the library of analogous gestures is detected, a signal is generated that mimics a standard signal from the standard input device and causes at least one on-screen action.

Implementations of the technology disclosed also relate to methods and systems that recognize gestures and cause on-screen behaviors that mimic, at an intuitive level, the behavior of a traditional input device. Recognizing that different individuals can equate different gestures to traditional input-device manipulations, implementations of the technology disclosed ideally (although not necessarily) permit the user to define these gestures and the associated actions taken. Implementations in accordance herewith can detect the presence of a conventional input device either visually, through object recognition, or by querying the operating system to determine what devices are connected. This determination drives the gestural control paradigm i.e., the actions taken or rule(s) responsively followed based on observed motion within a monitored space, and which generally relates gestures to manipulation of displayed screen contents. The gestural control paradigm can also be based on the currently active application. For example, if the user is playing a game developed specifically for gestural interactivity, the presence of a mouse will be ignored; but if the user is browsing the web, a mouse-like control paradigm can be followed.

Thus, implementations of the technology disclosed can, in effect, "get between" a device driver and the display. A user working with a word-processing program, for example, would expect to see a cursor and a control arrow on the screen. Implementations of the technology disclosed, sensing the presence of a mouse and use of the word processor, can load a gesture control paradigm that retains the on-screen presence of the cursor and the control arrow and relates user gestures to mouse operations. In some implementations, the user can define the gesture vocabulary—selecting, for example, the gesture that will correspond to a mouse left-click, right-click, etc. The system can also permit the user to turn off gesture recognition and release control back to the mouse driver. Similarly, the system can respond to an intentional gesture to override an input-device driver with gesture recognition.

In some implementations, a replica or other representation of (or based on) the user's hand can be inserted into the display, either as a substitute for conventional control graphics or to augment them. For example, a replica of the user's hand can substitute for the traditional hand icon used in ADOBE and other applications, and behave (in terms of on-screen actions caused by grabbing, moving, etc.) in a similar way. Alternatively, the hand replica can "stick" to a traditional icon, such as an arrow or cursor, which is moved on the screen to follow the user's hand movements in space—in effect, the user's spatial hand movements replace corresponding movements of a conventional mouse.

Rigged Hand

Figure 24:
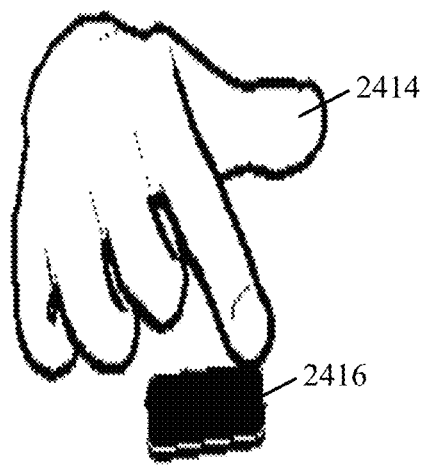
FIG. 24 is one implementation of a "rigged hand" method to modify representation of a user's hand.
Figure 25A:
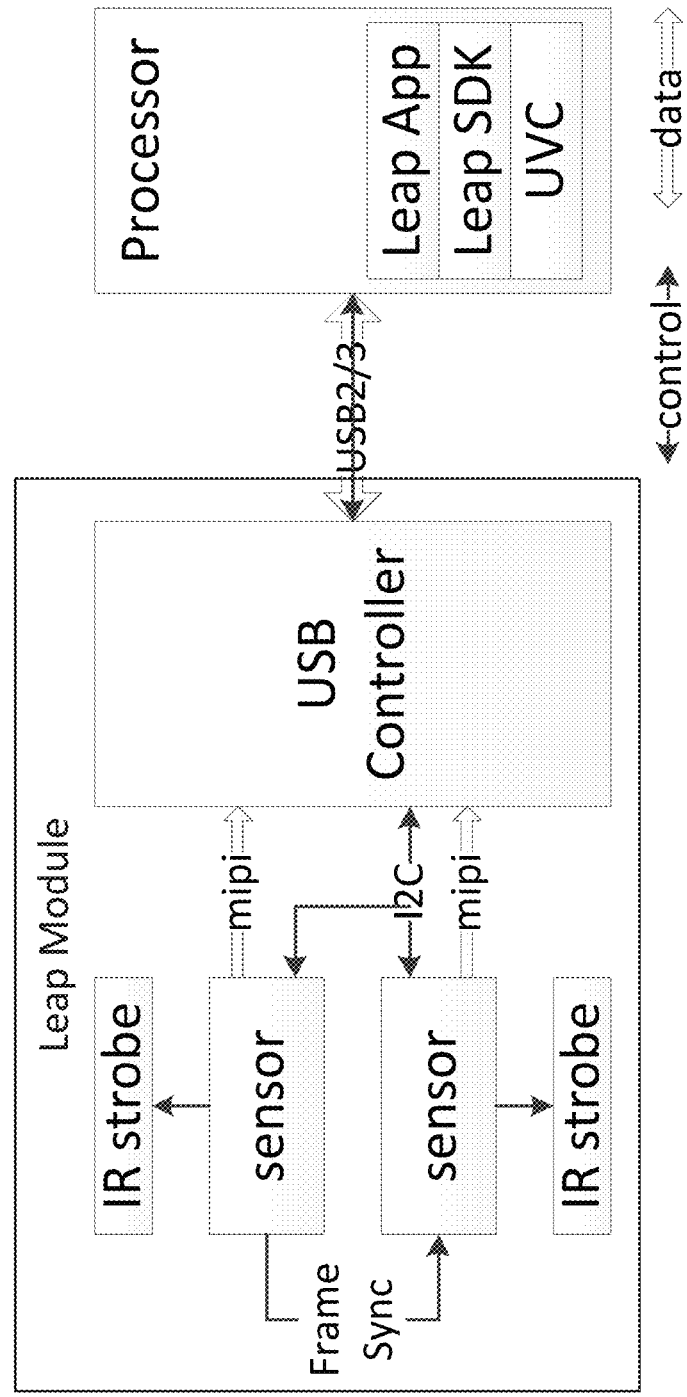
FIGS. 25A, 25B, 25C, 25D, 25E, 25F, 25G, 25H, and 25I illustrate different implementations of embedding a motion sensory control device in various devices.
Figure 25B:
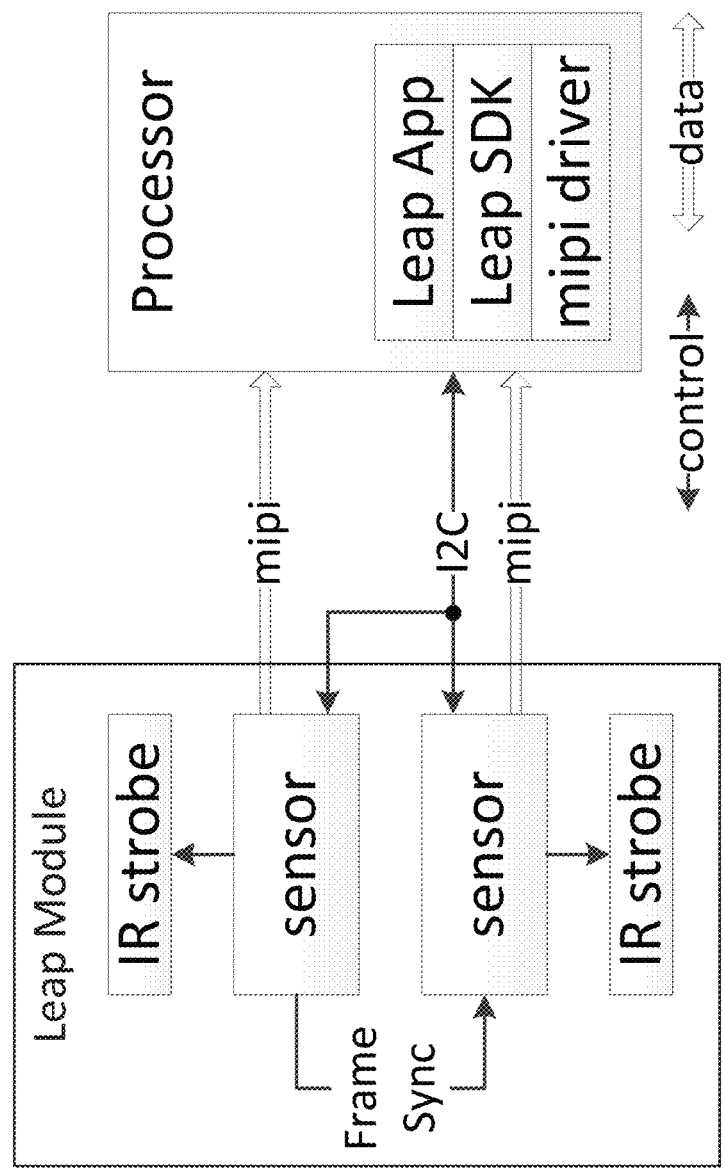
Figure 25C:
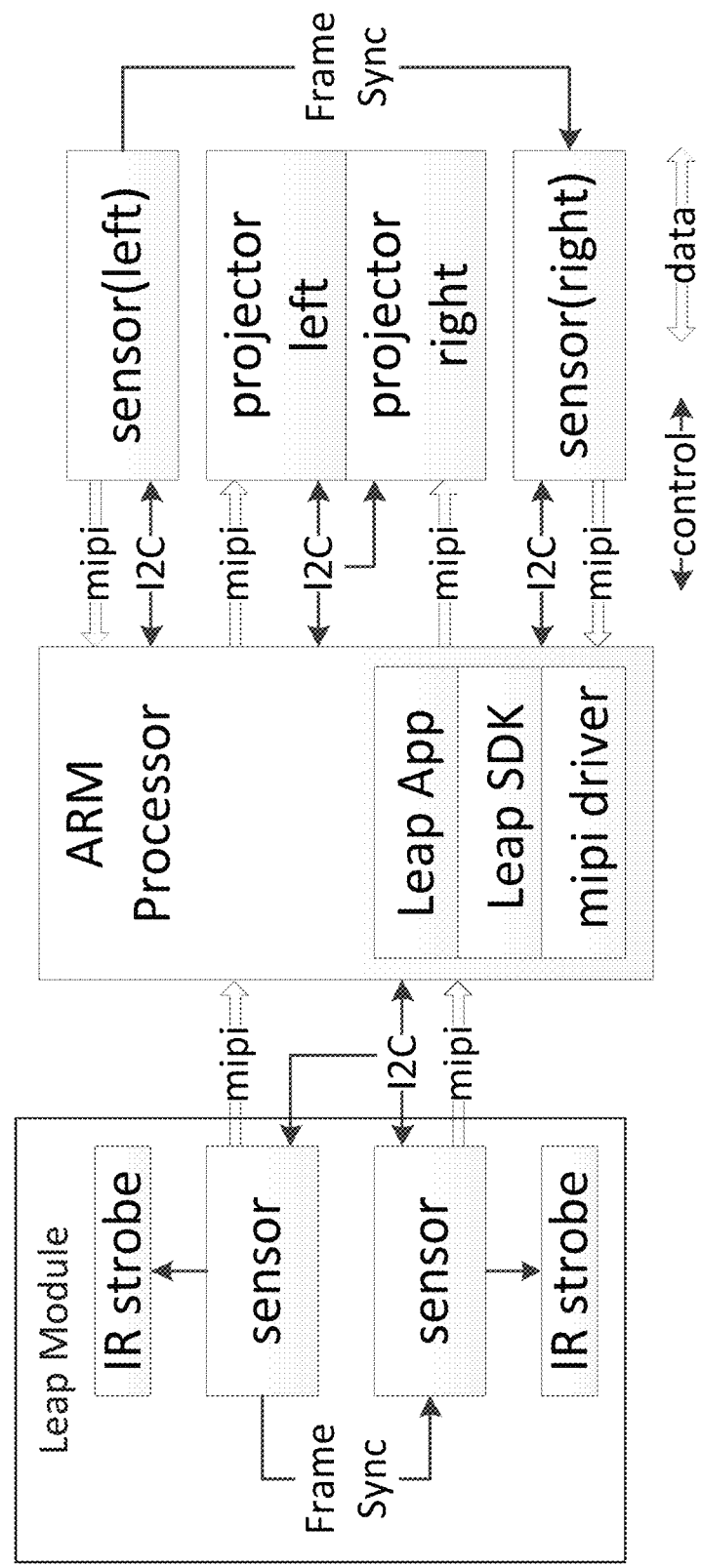
Figure 25D:
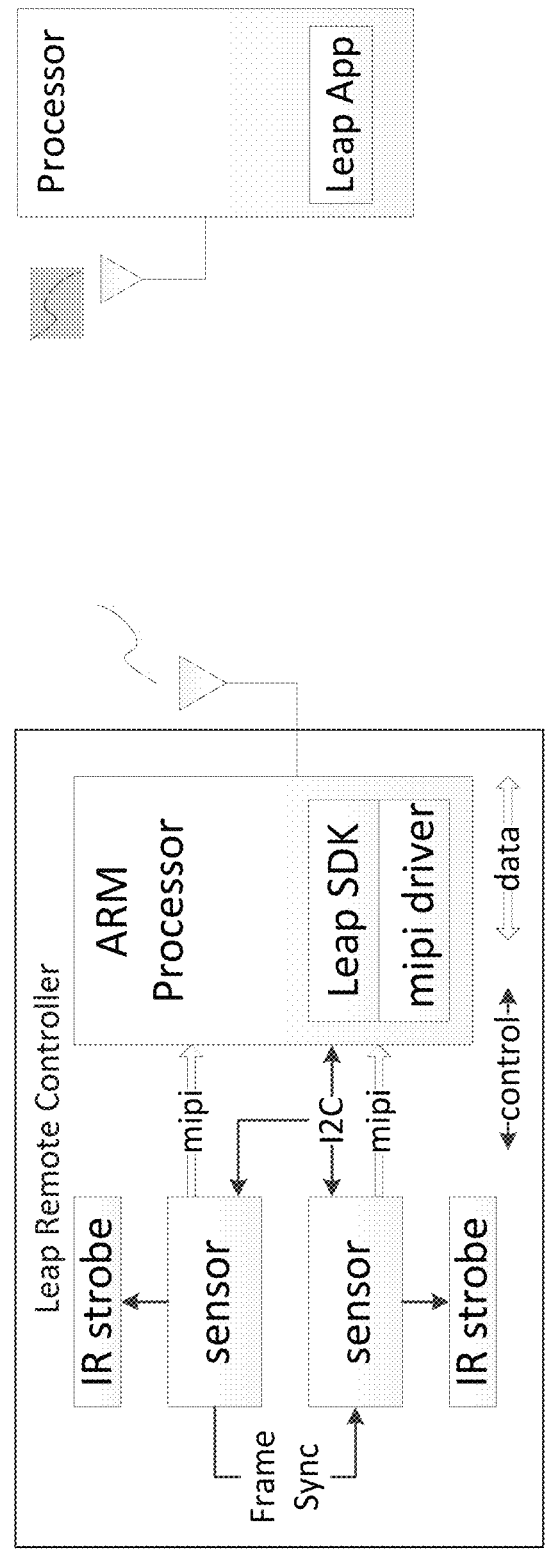
Figure 25E:
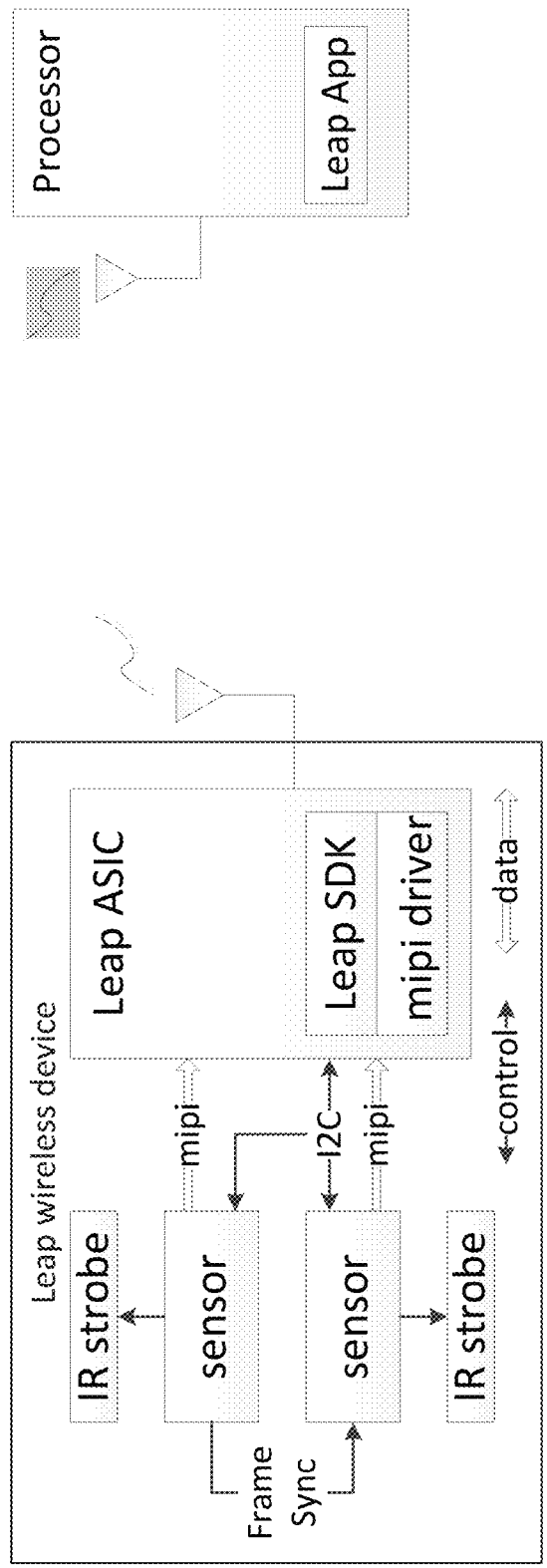
Figure 25F:
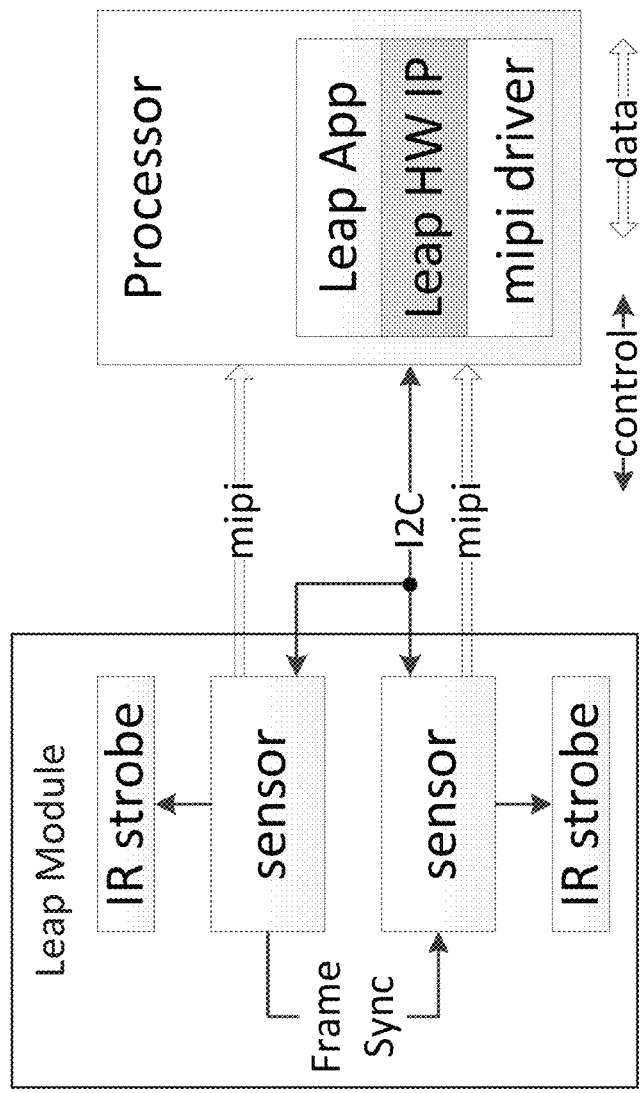
Figure 25G:
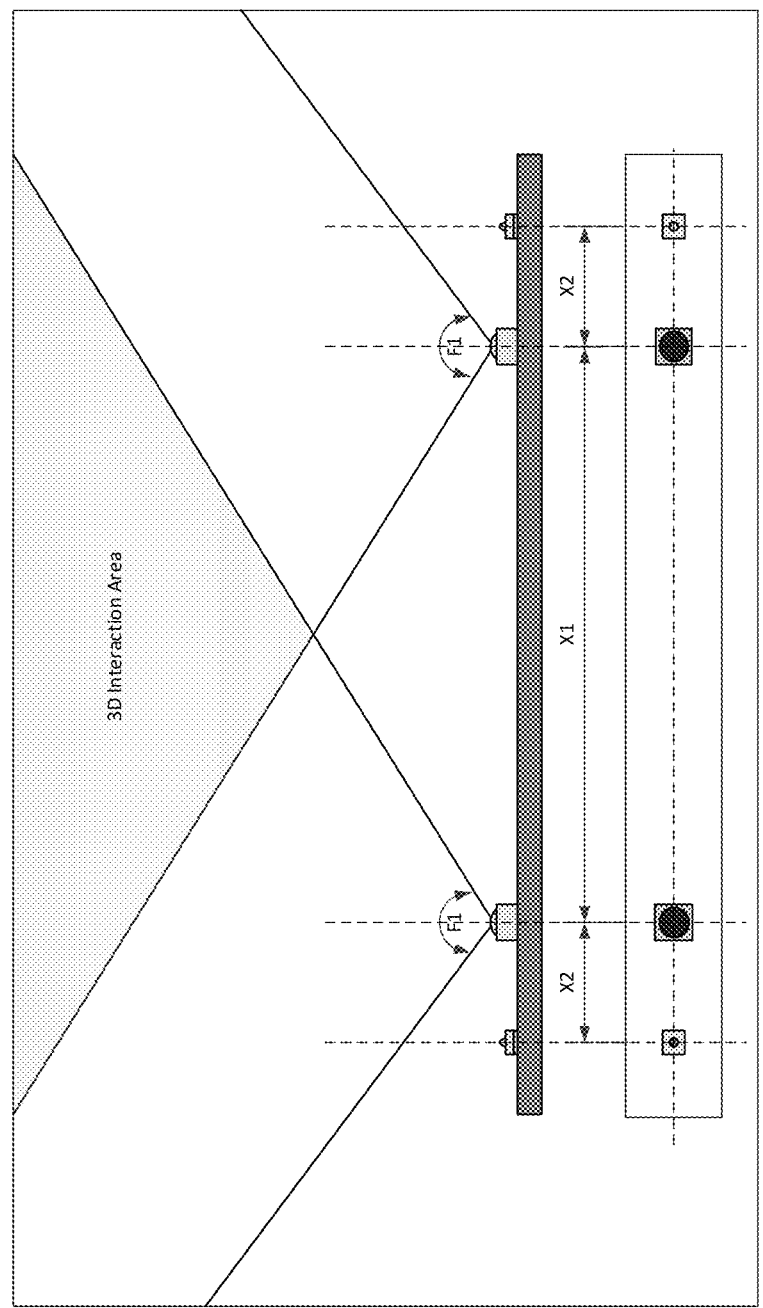
Figure 25H:
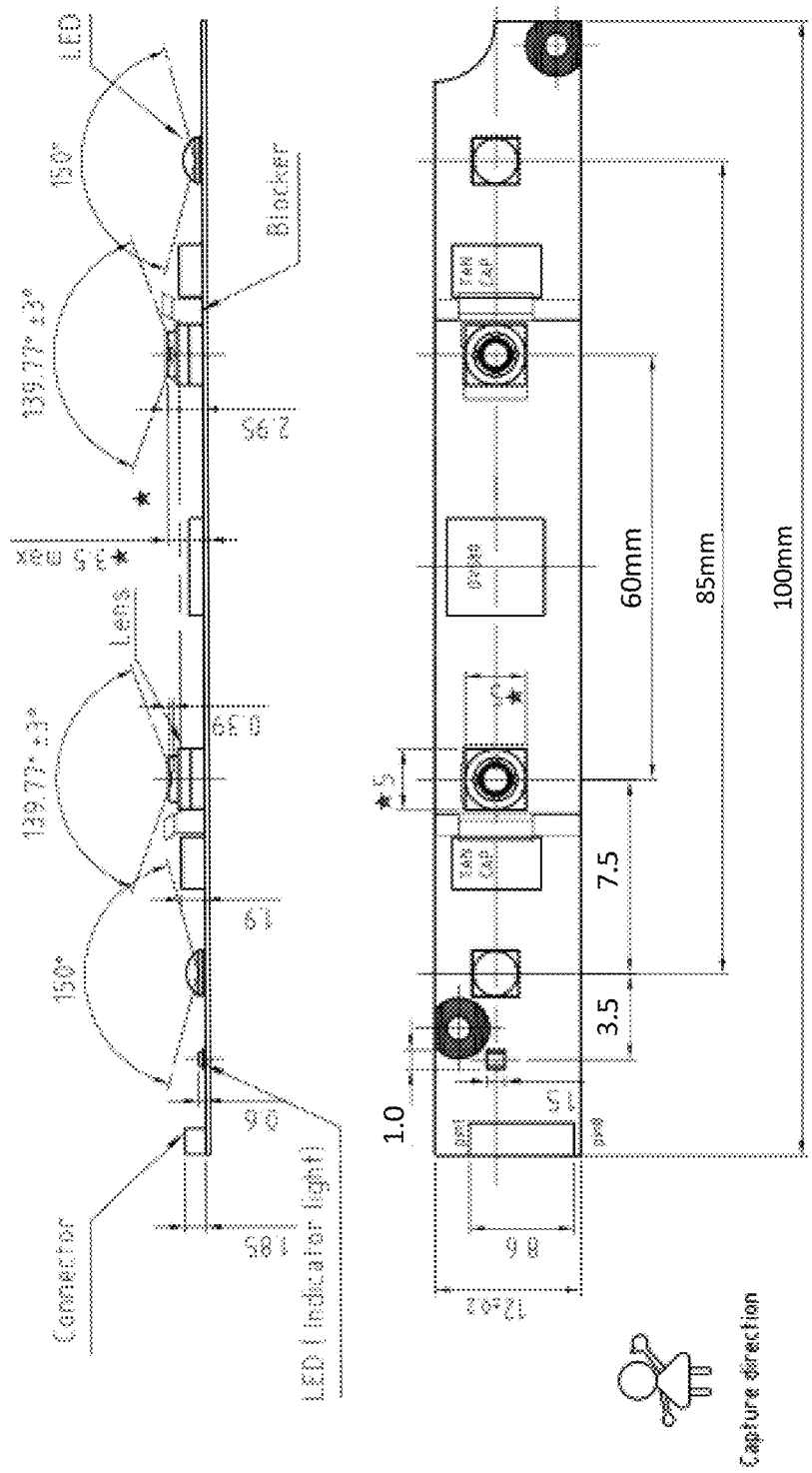
Figure 25I:
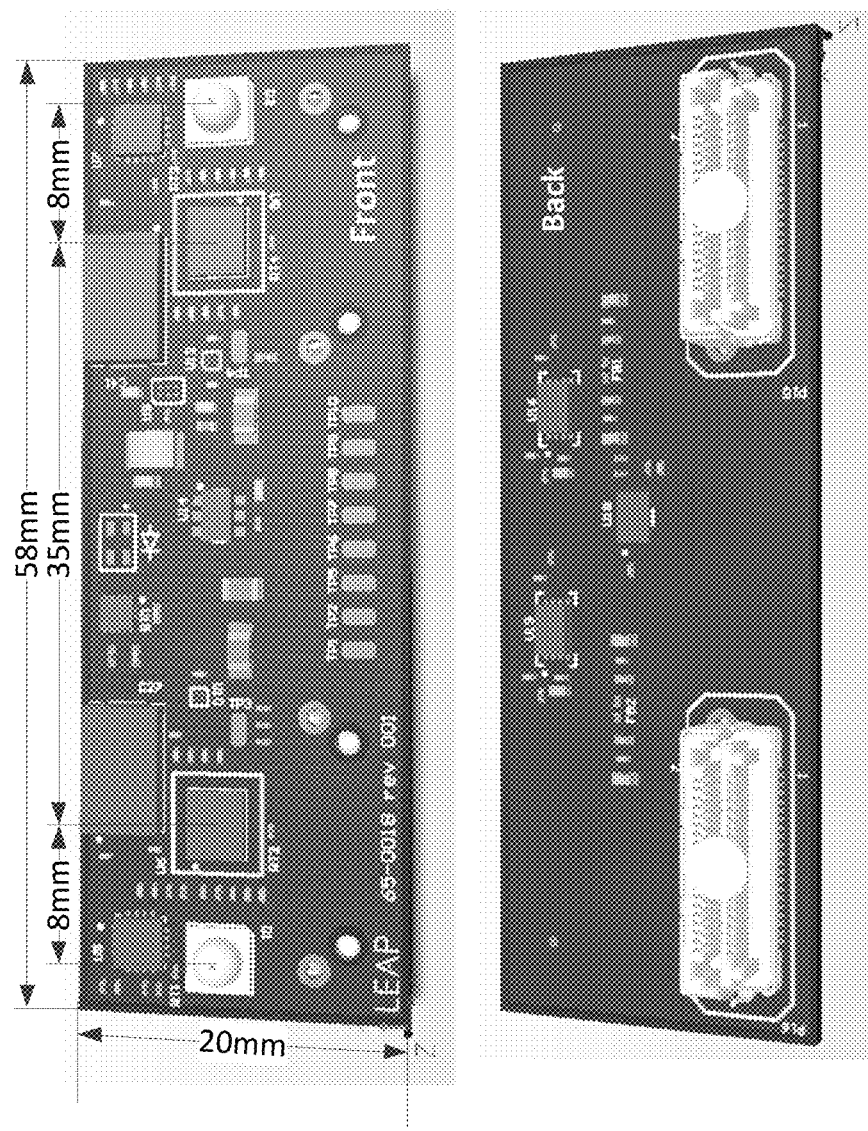

In other implementations, users can modify the replicas or other representations of their hands using a "rigged hand" 2414 method 2400 show in FIG. 24. In one implementation, users can define the "skins," "surface appearance," and/or "skeletons or structures" of their hand replicas so as to create extra-human limbs such as a cat's paws, zombie's hands, or pirate's hook. In one implementation, acquired data of a detected hand can be manipulated. For instance, a "direction" array in the acquired hand data describes direction unit vector which points from the palm position towards the fingers. Also, a "palm position" array serves as the center of the in the x, y, z format. A "pointables" array serves as the list of the pointable objects such as fingers and tools (pen, arcade gun). Further, the "direction" array of the "pointable" objects describes the direction unit vector in which the finger or tool is pointing. The user can manipulate one or more of such arrays to create a rigged replica or representation of the user hand that interacts with other real or virtual objects (e.g. 2416).

In another example, in a pervasive computing environment that includes traditional devices that lack gestural responsiveness like a presentation television in a conference room, a smart phone equipped with a motion sensory control device can be used to receive gestural commands from a user and forward the motion and sensory data from the smart phone to the presentation television, as described below.

Figure 20:
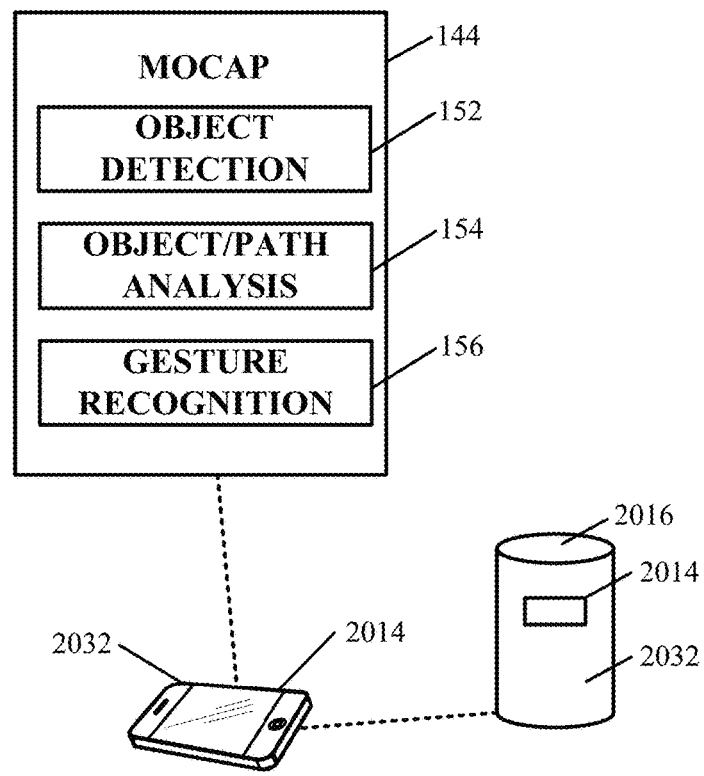
FIG. 20 illustrates one implementation of gesturally interacting with devices that lack gestural responsiveness.
Figure 20:
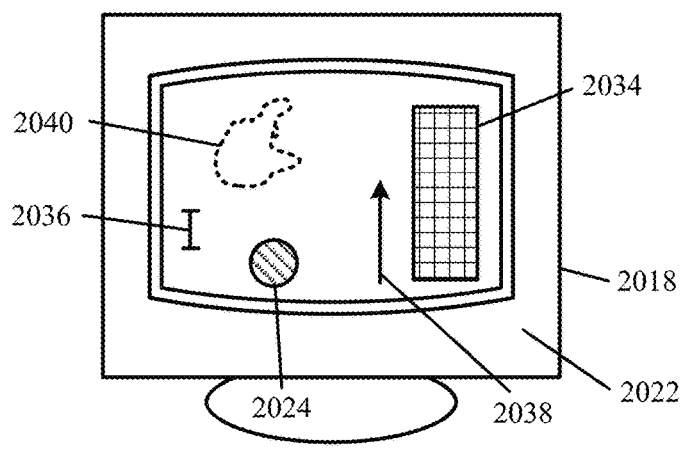
Figure 20:
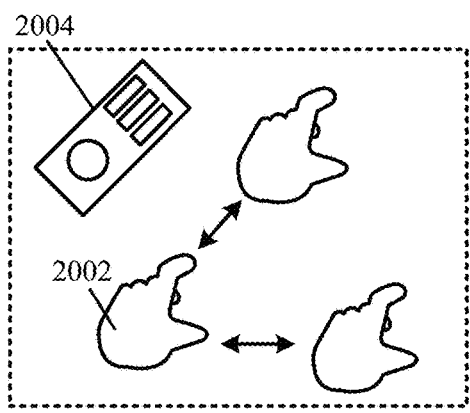

FIG. 20 illustrates one implementation 2000 of gesturally interacting with devices that lack gestural responsiveness. Referring to FIG. 20, in operation, the image analysis system 106 operates cameras 102, 104 to capture at least one image in the field of view 112. The image can contain the object 114, which can be a user's body part 2002 and/or an input device 2004 (such as a remote controller, a keyboard, or a PC mouse). In some implementations, the object detection module 152 analyzes the captured image to detect edges of an object therein and/or other information about the object's location; subsequently, the object/path analysis module 154 analyzes the object information provided by the object detection module 152 to determine the 3D shape, size and/or position of the object. The gesture-recognition module 156 can compare the detected object 114 to reference images or object templates electronically stored in an object database 2014 using conventional comparison algorithms (such as database lookup). (As used herein, the term "electronically stored" includes storage in volatile or non-volatile storage, the latter including disks, Flash memory, etc., and extends to any computationally addressable storage media (including, for example, optical storage).) The object database 2014 can be implemented, for example, in the memory 134, a mass-storage device of the system 100B or on an external storage system 2016.

In one implementation, upon matching the detected object 114 to an object template in the database 2014, the gesture-recognition module 156 reports the match to display logic 162. An initial task performed by a display logic is obtaining an inventory of input devices associated with the system to be controlled—either system 100B or, if system 100B is itself used to provide input to a separate device 2018, such as a game console, a "smart" television or a computer, then to that device; hereafter the device that will respond to user gestures is generically referred to as the "controlled device." Display logic obtains this inventory this by querying operating system to determine what input devices are currently connected to the controlled system; by determining whether any of the objects identified and reported by gesture-recognition module 156 is an input device; or both. For example, if an input device connected to the controlled system is outside the field of view 112, display logic can ignore it.

Gesture-recognition module 156 can be responsive to object detection module 152 and evaluate movements only of objects whose movements are likely to be intended as gestures—e.g., the dominant object within the field of view 112, the first detected object to move, an object recognized as a user's hand 2002, finger, etc. Once a gesture-producing object is identified, it can be followed by gesture-recognition module 156 through a series of temporally sequential images captured by the cameras 102, 104 in order to recognize gestures. As discussed in greater detail below, detected gestures are used to control an application running on the controlled system. The gesture-recognition module 156 can be utilized in conjunction with algorithms based on 3D models (i.e., volumetric or skeletal models), simplified skeletal models that use a simplified representation of the human body or gesture-relevant body parts, or image-based models based on, for example, deformable templates of gesture-relevant body parts. For additional background information regarding visual hand gesture recognition, reference can be made to, e.g., Wu et al., "Vision-Based Gesture Recognition: A Review," in Gesture-Based Communication in Human-Computer Interaction (Springer 1999); Pavlovic et al., "Visual Interpretation of Hand Gestures for Human-Computer Interaction: A Review," IEEE Trans. Pattern Analysis and Machine Intelligence (19(7):677-695, July 1997). Image analysis, including object detection, object analysis, and object recognition in 3D space and in real time can be performed using a conventional approach or an approach specialized to the application (see, e.g., U.S. Ser. No. 13/742,953, filed on Jan. 16, 2013, the entire disclosure of which is hereby incorporated by reference).

Thus, gesture-recognition module 156 identifies the user's gesture by comparing the detected gesture to a library of gestures in database 2032, which, again, can be implemented in the image analysis system 106, the electronic device 2018, or on an external storage system 2016. For example, gestures can be stored as vectors, i.e., mathematically specified spatial trajectories, and the gesture record can have a field specifying the relevant part of the user's body making the gesture; thus, similar trajectories executed by a user's hand and head can be stored in the database 2032 as different gestures, so that an application can interpret them differently. Typically, the trajectory of a sensed gesture is mathematically compared against the stored trajectories to find a best match, and the gesture is recognized as corresponding to the located database entry only if the degree of match exceeds a threshold. The vector can be scaled so that, for example, large and small arcs traced by a user's hand will be recognized as the same gesture (i.e., corresponding to the same database record) but the gesture-recognition module will return both the identity and a value, reflecting the scaling, for the gesture. The scale can correspond to an actual gesture distance traversed in performance of the gesture, or can be normalized to some canonical distance.

Although gestures can be used for many control and rendering purposes, the present discussion is concerned primarily with their use in controlling actions taken on the screen 2022 of, e.g., a controlled device 2018. In particular, gesture-recognition module 156 contains records relating template gestures to actions performed by all active input devices identified by display logic (or at least the display devices within the field of view 112). For example, suppose that an identified object 2004 is a conventional PC mouse connected to the controlled device 2018. The driver associated with the mouse 2004 supports right-click, right-double-click, and left-click commands, among others. Accordingly, gesture-recognition module 156 ensures that database 2032 contains stored records corresponding to these commands—i.e., for each command, a record containing (i) a gesture template corresponding to the command and (ii) bits encoding an output signal (e.g., a pulse sequence) duplicating the command signal that the mouse 2004 would produce. If such records are found, display logic can determine whether these gestures will override the mouse driver, as discussed below. If no corresponding records are found, then the user will be prompted to perform gestures and relate them to mouse functions. In particular, gesture-recognition module 156 can cause a control panel 2034 to be rendered on the screen 2022. The control panel 2034 shows a table listing the commands associated with the mouse driver. The user sequentially selects one of the entries and assigns a gesture to it. In one implementation, the user makes the selection by gesture—e.g., moving her hand vertically in the monitored space 112 until the desired entry in the (vertical) list is highlighted, and then gesturing as if pressing a button. Gesture-recognition module 156 correlates the height of the user's hand to one of the displayed entries, which it highlights on screen 2022 and further recognizes the selection gesture. Alternatively, the user can make the selection using mouse 2004 or a keyboard.

Once an entry is selected, the user signals the system 130 that she is about to perform the gesture she wishes to associate with the selected command. This signal can be, for example, a voice command ("Start") or a keystroke. Alternatively, gesture-recognition module 156 can cause the screen 2022 to display a countdown graphic ("3 . . . 2 . . . 1 . . . GO!"). Following the user's signal or at the end of the countdown, the user's gesture is recorded by the cameras 102, 104 and the image frames corresponding thereto are stored frame buffers (in sensor interface 136 or in memory 134). The user can signal completion of the gesture by voice command ("Done") or simply by momentarily freezing her action, which is sensed by gesture-recognition module 156, or by any other suitable action. The frame buffers captured during the time period of gesture performance are analyzed by gesture-recognition module 156 and converted to a gesture template for storage in the gesture database 2032. In some implementations, the gesture is vectorized as discussed above and stored as a vector in (or linked to) the associated record in database 2032.

It should be stressed that, although the process of defining gestures and associating them with commands has been discussed with respect to input-device commands, the approach is applicable to any type of gesture used for any purpose. For example, if the gesture-recognition module 156 is implemented as part of a specific application (such as a game or controller logic for a television), the database gesture record can inherit attributes (such as a scaling value or mapping parameters) specific to that application. Otherwise, when an application invokes the gesture-recognition module 156, it interprets the identified gesture in accordance with its own programming, and can permit the user to modify the default library of gestures as outlined above.

In some implementations, the conventional control icons (e.g., a cursor 2036, an arrow 2038, and/or a circle 2024) are retained on the screen in the usual fashion. In other implementations, image generation module 164 generates an image 2040 (e.g., of the user's hand) that will either supplement or replace the conventional icons as described below. Image generation module 2040 can be a conventional rendering program that utilizes the gesturing object directly or indirectly as the basis for the image 2040. For example, image generation module 2040 can utilize the hand 2002 detected by object detection module 152 and simply extract the corresponding pixels from the associated image frames, resampling the pixels so the hand image is appropriately sized for display—e.g., so that the size of the rendered image 2040 is comparable to the size of the conventional icon. Indeed, the rendered hand can exactly match in size the conventional on-screen hand icon, so that the squeezing and dragging commands already associated with the hand icon (and typically affected with a mouse) can be gestured by the user.

Alternatively, an image generation module can utilize more complex mappings in rendering an image based on the user's gestures. A detected object or body part can be mapped to virtually any image in accordance with conventional graphics techniques, e.g., affine mapping. A user's hand, in other words, can be rendered as an animal's paw, a cartoon character or other image whose on-screen appearance varies in response to the changing orientation and configuration of the user's hand in accordance with the mapping.

Biometrics

In one implementation, a method of authenticating a user of a sensory machine control system includes capturing sensory information for a human body portion within a field of interest. A tracking model and biometric model are determined from the sensory information.

A command is determined from recognizing a gesture indicated by variation in the tracking model over time and the biometric model is compared to known users' biometric information. When the biometric model corresponds to biometric information of a known user, an authorized command is communicated to a system under control. Authorized commands enable users to login to machines and/or systems, to effect transactions, invoke features/functionality, and/or exchange information.

A biometric model can be determined by analyzing image(s) to determine an image characteristic (e.g., intensity, brightness, color, other characteristics, combinations thereof) and determining a property (e.g., rate of change, maximal, minimal, average or other statistical properties, combinations thereof, and so forth) for the image characteristic. The property can be analyzed to determine changes in the property indicating biometric features corresponding to points of interest in the image. For example, a Hessian can be computed for points in the image, the Hessian indicating how the brightness (or other characteristic) is changing. The biometric features can be transformed based at least in part upon orientation/rotation/translation information to form normalized biometric features. A biometric profile set can be built from one or more identified biometric features; and a biometric model built for an individual from one or more biometric profile set(s).

Additional commands, if any, can be verified by recognizing a second gesture indicated by variation in the tracking model and comparing biometric information of the hand captured during the second gesture with biometric information of the hand captured previously to verify continuity; e.g., determine that the user has not changed. In the event that the biometric information of the hand captured during the second gesture does not correspond to biometric information of the hand captured previously, command information associated with the second gesture can be discarded.

Commands authorization can include determining from profile information stored for the known users, whether an authenticated user having the biometric profile is in a role (e.g., system administrator, developer, manager, and so forth) authorized to issue the command determined from tracking the user's hand (or other body) activity. If the user is determined to be authorized to issue the command based at least in part upon the role, the authorized command is communicated to a system being controlled.

Advantageously, some implementations can enable authorized commands to be issued responsive to gesture recognition for use in smart phones or other devices based upon authorized use. This capability allows the user to "self-authenticate" while executing intuitive gestures to command a device. Implementations can enable gesture detection, user identification, user authorization, and other machine control and/or machine communications applications in smart phones.

User Disambiguation

Figure 21A:
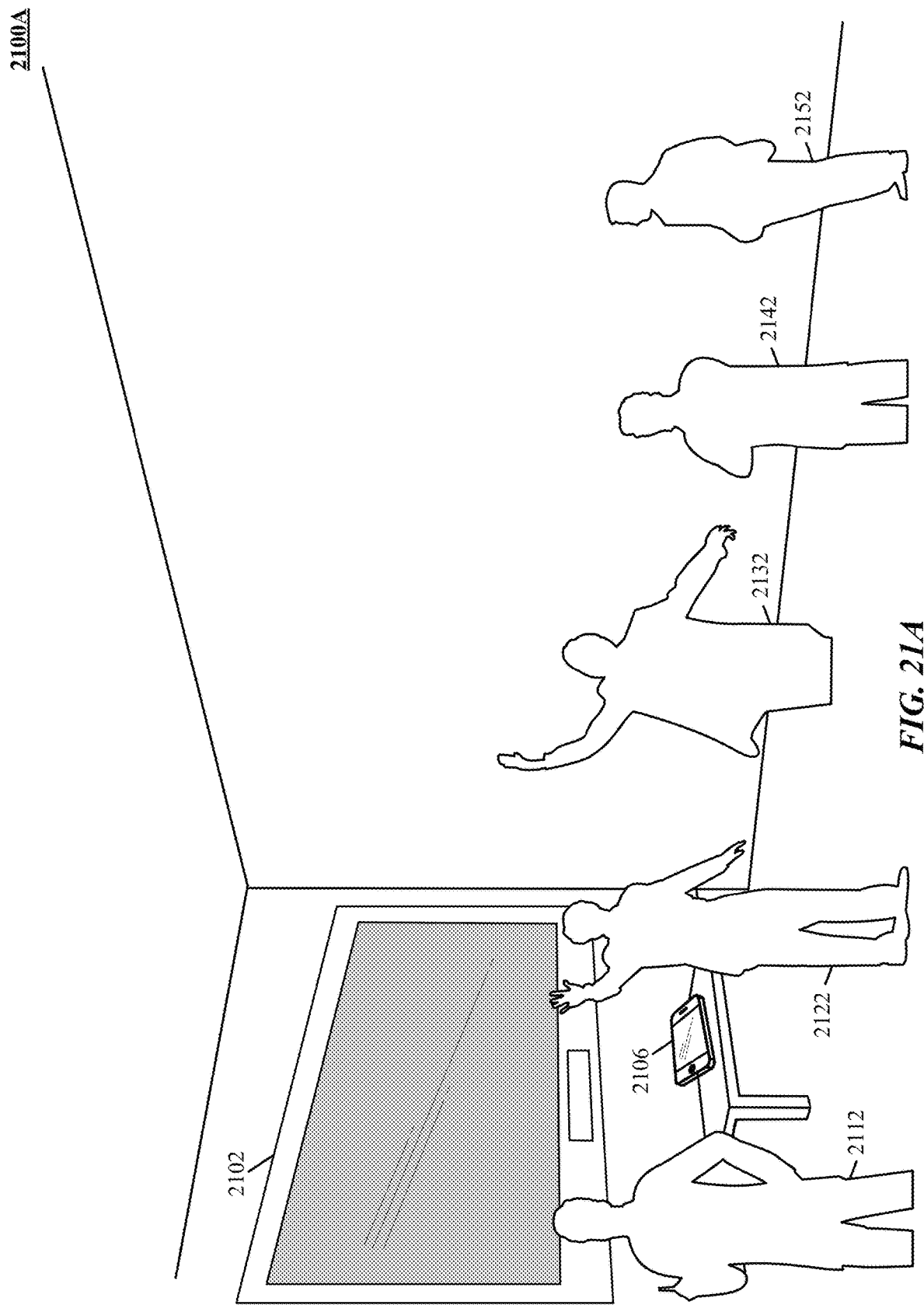
FIGS. 21A, 21B, and 21C show one implementation distinguishing between users issuing gestural commands in a pervasive three dimensional (3D) sensory environment.
Figure 21B:
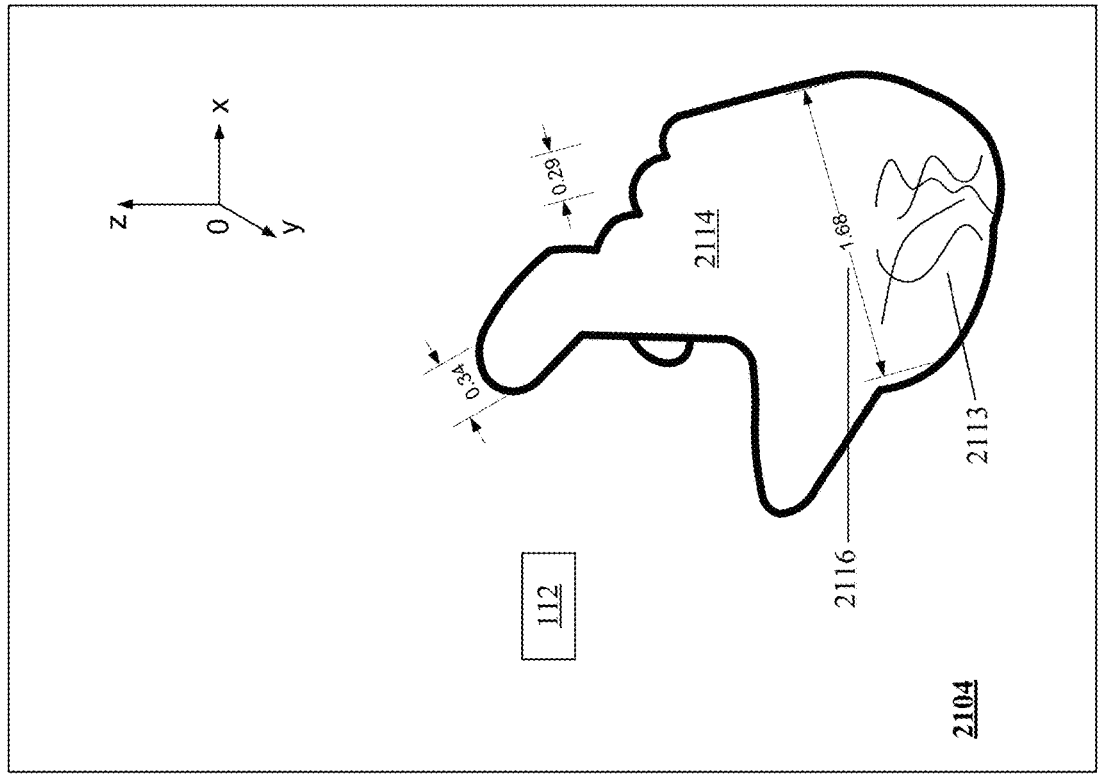
Figure 21B:
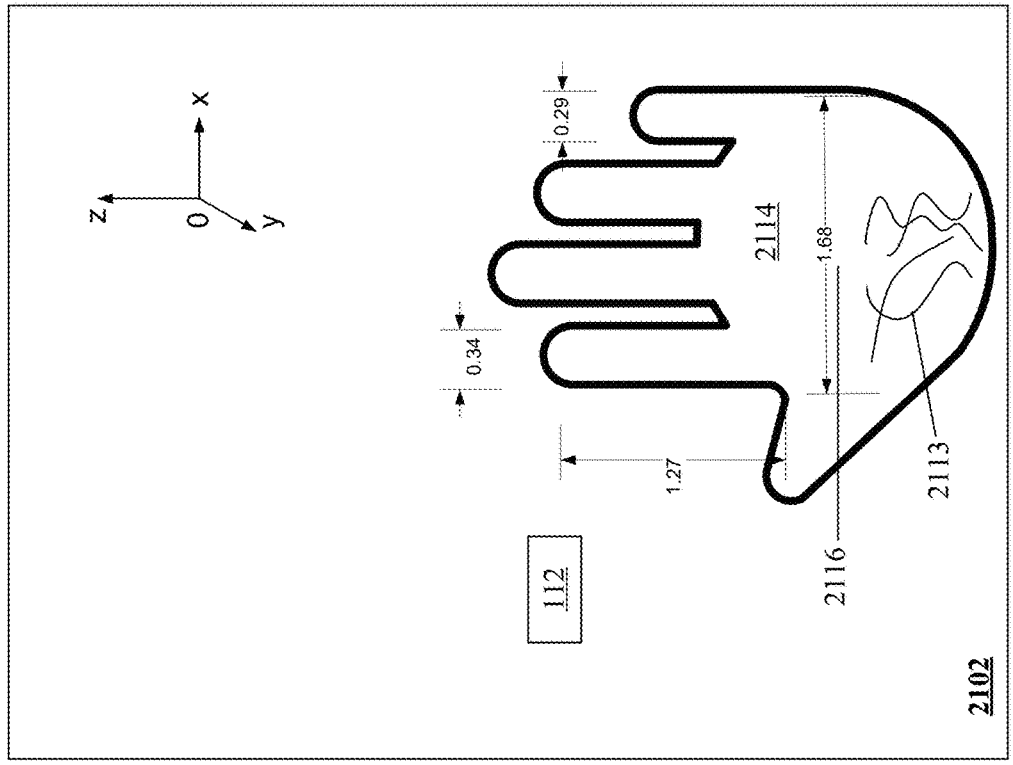
Figure 21C:
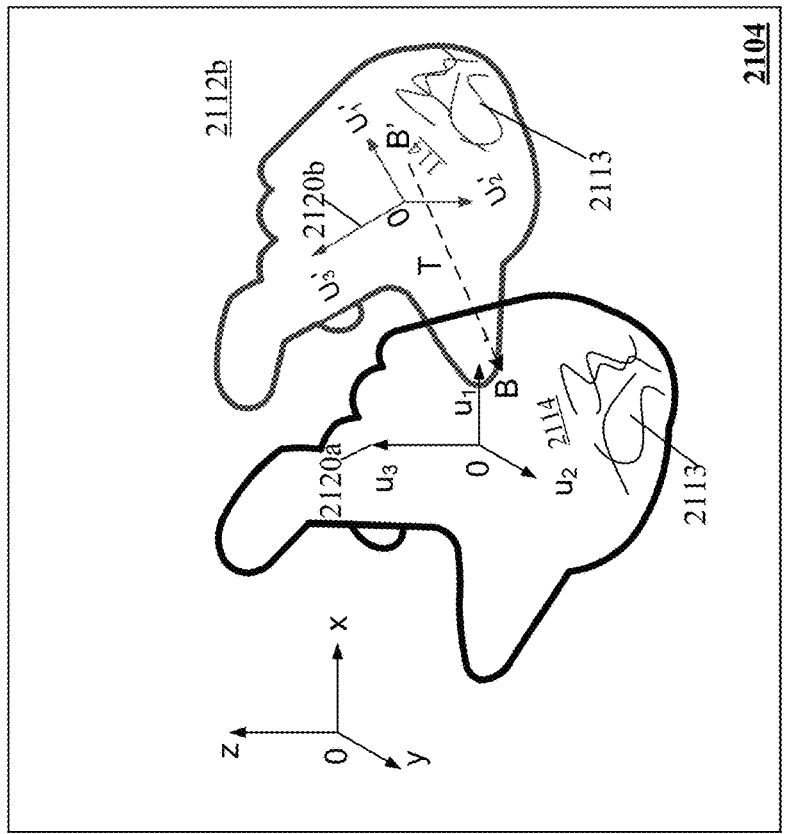
Figure 21C:
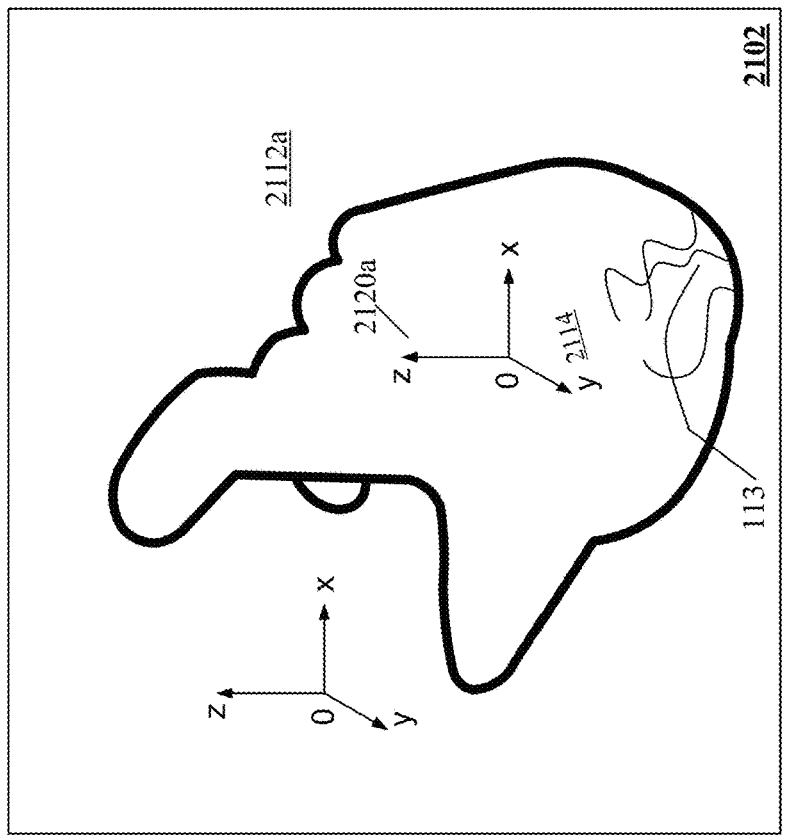

FIGS. 21A-C show one implementation distinguishing between users issuing gestural commands in a pervasive three dimensional (3D) sensory environment 2100A. In one implementation, a dominant user can be identified in the pervasive three dimensional (3D) sensory environment 2100A that includes multiple users (2112, 2122, 2132, 2142, 2152) such that gestures performed by the dominant user are interpreted by the smart phone 2106 equipped with motion sensory control device and used to control responsiveness of a shared workspace like a presentation television 2102 in a conference room. In some implementations, the dominant user can be identified based on spatial behaviors of the users exhibited in the pervasive three dimensional (3D) sensory environment 2100A. In one example, certain postures of the users (pointed fingers, raised hands, high pitched voices) can be indicative of dominant users like speakers or presenter, while others (folded arms, intermittent voice registries) can be indicative of non-dominant users like listeners or audience members.

FIG. 21B illustrates training 2100B a smart phone equipped with a motion sensory control device 600 to recognize a user by biometric features identified from a portion of the user's body and recognizing the user by comparing a biometric profile set built from the user's biometric features with previously recognized biometric features of the user in accordance with the technology disclosed. FIG. 21B shows two views 2102, 2104 of hand 2114 within region of interest 112 of device 600 at two different times, training time $t_0$ (2102), and authentication time $t_1$ (2104), which can be moments or months apart. Further, views 2102, 2104 can be at different device 600 instances, which can be coupled to share data by a network or the like. In other words, a user might train a first device 600 instance to recognize the user's hand 2114 in block 2102, and subsequently authenticate at a second device 700A instance in block 2104. As shown in block 2102, at an initial training time $t_0$, hand 2114 is in a particular position and configuration in region of interest 112. Block 2102 illustrates a representative pose of a particular user's hand 2114 during a learning phase in which biometric features of the hand 2114 visible to cameras 102, 104 are identified by system 100 and used to build a biometric model based upon one or more biometric feature(s) of the user hand 2114. During training, a user's hand can adopt a variety of poses, e.g., palm facing camera(s), palm facing away from camera(s), and so forth, however only one training pose is shown in block 2102 for clarity sake. The user can be prompted to assume various hand poses and at various locations and distances relative to device 600. Device 600 captures one or more images of objects 2114 (hands) in a particular pose(s) present within region of interest 112. From images of the hand 2114, one or more biometric features (e.g., vein patterns 2113, measurements 2116 across the palm or at other specific locations, palm prints or patterns, complexion, body temperature indicated by visual cues, other individual specific features and any combination thereof) visible to cameras 102, 104 are identified based upon one or more image characteristics. One or more identified biometric features useful to identify hand 2114 comprise a biometric profile set. A biometric model specific to an individual can be built from one or more biometric profile sets, e.g., a first profile set of biometric features for a palm view of the individual's hand, a second profile set of features for a backhand view of the individual's hand, and so forth. Additionally, biometric models can comprise non-visible biometric features determined for an individual using other sources 108, 110 alone, or in conjunction with cameras 102, 104.

Now again with reference to FIG. 21B, in block 2104, the user's hand 2114 is captured during authentication at authentication time $t_1$. Certain biometric features 2113, 2116 (vein patterns, palm prints, fingerprints, other features, combinations thereof) can provide useful biometric features for authentication. During authentication, device 700A captures one or more images of hand 2114 being authenticated. Characteristics of the image are analyzed with respect to one or more properties to determine biometric features. The biometric features from the hand 2114 under authentication are compared with normalized biometric features of one or more biometric profiles built for the user during training in block 2102. Biometric features are normalized (e.g., compensated for rotation, translate, and depth) using for example technique(s) like those discussed with reference to FIG. 21C below, since the user's hand 2114 is not in the same pose (and may not even be viewed by the same device 600) at authentication time $t_1$ as it was during training time $t_0$. Accordingly, the apparent position of biometric features 2113, 2116 in the region of interest 112 in block 2104 will change from the apparent position of the biometric features 2113, 2116 in region of interest 112 in block 2102. Thus, apparent differences in the biometric features 2113, 2116 due to the change in position of the hand 2114 relative to the device 600, and/or differences in construction between various implementations of device 600, are taken into account by normalizing biometric features during authentication to enable device 600 to identify hand 2114 in the pose of block 2104 as being the hand 2114 trained in the pose of block 2102 using a process like that described below with reference to FIG. 21C.

Now with reference to FIG. 21C, which illustrates acquisition 2100C of one or more normalized biometric features by the device 600 during training and comparison of biometric features captured from a subject hand being authenticated. During acquiring of biometric features to build a biometric profile set, as shown by block 2102, field of view 2112a presented to device 101 at training time $t_0$ includes hand 2114 which is to be biometrically modeled. At training time $t_0$, the biometric features 2113, 2116 (e.g., of hand 2114) are determined with respect to model reference frame 2120a e.g., by processing image data from cameras 102, 104 viewing hand 2114. Biometric profile sets comprising one or more biometric features normalized to model reference frame 2120a are built from the biometric features. A biometric model of the user can be constructed based upon one or more biometric profile sets.

When comparing biometric features from a captured pose of a hand 2114 to be authenticated, as shown by block 2104, at authentication time $t_1$, field of view 2112b presented by device 600 at authentication time $t_1$ includes hand 2114 in a new apparent position. Not only is the hand 2114 in a different position when authenticated vs. when taught, it is likely that the hand 2114 is authenticated at a different installation of device 600 at a different location when using the device 600 from when characteristics of the hand 2114 were originally taught to one of the device 600 installations. Accordingly, the reference frame 2120b of the hand as captured during authentication will have moved from an original or starting hand reference frame 2120a as described by a transformation $R^T$. It is noteworthy that application of the transformation $R^T$ enables the hand 2114 to be compared and/or recognized when rotated as well as translated relative to a taught pose of hand 2114. Implementations can provide transforming the position and rotation of reference frame 2120b with respect to reference frame 2120a and therefore, transforming the position and rotation of tracked subject 2113 with respect to 2120b, at authentication time $t_1$. Implementations can determine the position and rotation of tracked subject 2113 with respect to 2120a from the transformed position and rotation of reference frame 2120b with respect to reference frame 2120a and the transformed position and rotation of tracked subject 2113 with respect to 2120b.

In an implementation, a transformation $R^T$ is determined that moves captured (red) reference frame 2120b to model (black) reference frame 2120a. Applying the transformation $R^T$ to any point(s) captured relative to the captured (red) reference frame 2120b makes the point(s) lie on top of corresponding point(s) relative to model (black) reference frame 2120a. Then the tracked object 2114 will be in the right place from the point of view of model (black) reference frame 2120a to facilitate recognition, comparison and so forth. In determining the motion of object 2114, image processing system 106 can determine its location and direction by computationally analyzing images captured by cameras 102, 104 and motion information captured by sources 108, 110. For example, an apparent position of any point on the object (in 3D space) at capture time $$t = t_1 : \begin{bmatrix} x \\ y \\ z \\ 1 \end{bmatrix},$$

can be converted to a position of the point on the original model object at training time $$t = t_0 : \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}.$$

The correct location at capture time $t=t_1$ of a point on the tracked object with respect to model reference frame 120a is given by equation (5):

$$\begin{bmatrix} R_{ref}^T & (R_{ref}^T)*-T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (5)$$

Where:

$R_{ref}^T$—Represents the rotation matrix portion of an affine transform describing the transformation from the hand reference frame 2120b to the model reference frame 2120a.

$T_{ref}$—Represents a vector translation of the hand reference frame 2120b to the model reference frame 2120a.

Figure 22:
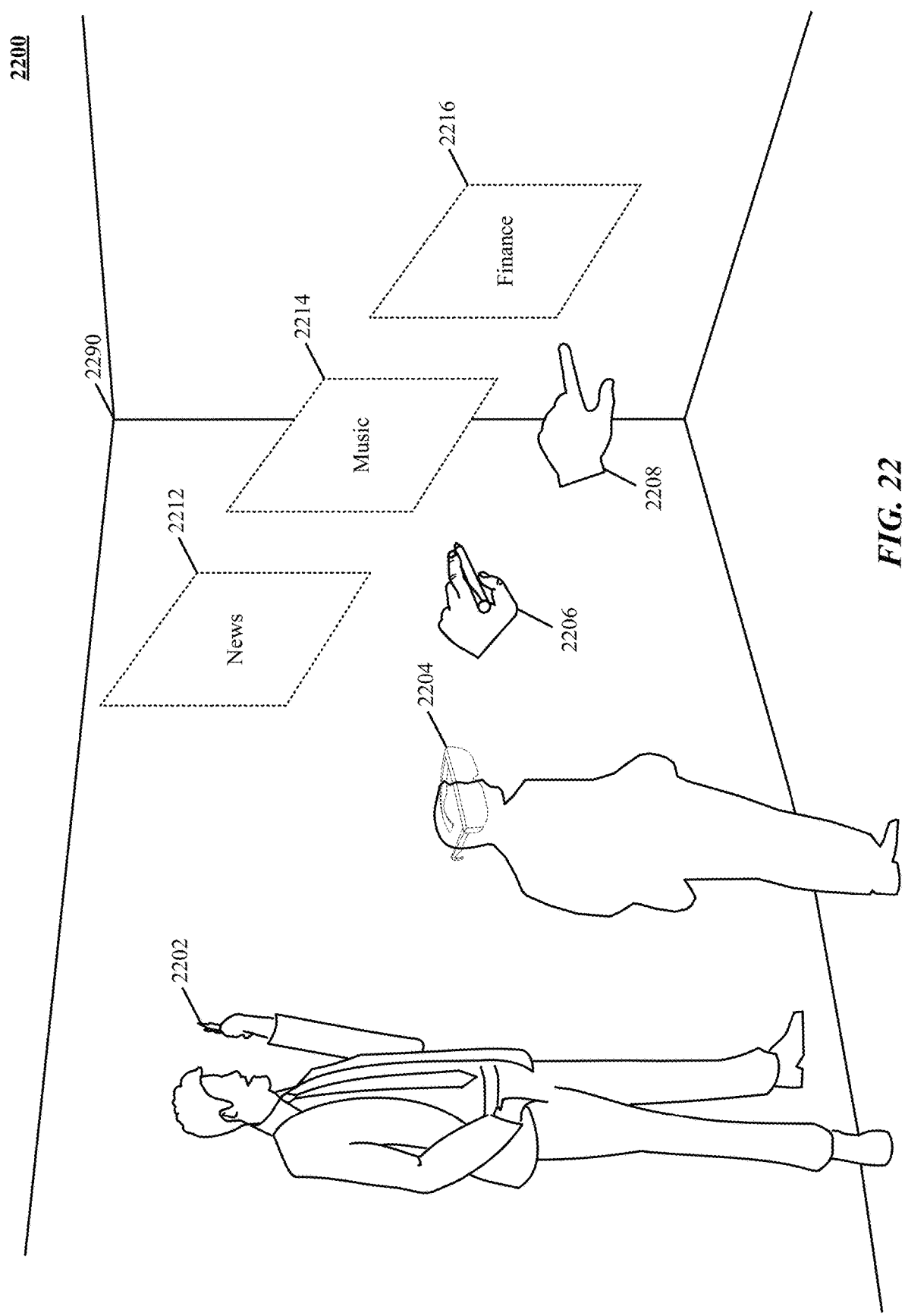
FIG. 22 is one implementation of selecting among virtual interaction modalities to interact with in a pervasive augmented environment.

Again with reference to FIG. 21C, block 2104 illustrates hand reference frame 2120b, which can be represented by a 3×3 matrix R'=[u$_1$', u$_2$', u$_3$'] and model frame 2120a, which can be represented by a 3×3 matrix R=[u$_1$, u$_2$, u$_3$]. The objective is to transform R' (reference frame 2120b) into R (reference frame 2120a) so that any point on the hand 2114 being authenticated known with reference to frame 2120b can be compared to a point or points of the hand 2114 as taught (i.e., known) with reference to frame 2120a. Accordingly, an affine transform $R^T_{ref}=R(R')^T$ will achieve this objective. Affine transform $R^T_{ref}$ can be expressed in terms of R and R' as shown by equation (6):

$$R_{ref}^T = \begin{bmatrix} u_1 \cdot u_1' & u_1 \cdot u_2' & u_1 \cdot u_3' \\ u_2 \cdot u_1' & u_2 \cdot u_2' & u_2 \cdot u_3' \\ u_3 \cdot u_1' & u_3 \cdot u_2' & u_3 \cdot u_3' \end{bmatrix} \quad (6)$$

$$T = \begin{bmatrix} a \\ b \\ c \end{bmatrix}$$

is a vector representing a translation of the object with respect to origin of the coordinate system of the translated frame Augmented Reality FIG. 22 is one implementation of selecting among virtual interaction modalities to interact with in a pervasive augmented environment 2200. Pervasive augmented environment 2200 that supplements the real world with virtual, computer-generated objects that appear to co-exist in the same space as the real world. A smart phone 2202 or heads up display 2204 can be used to implement an augmented reality functionality, according to one implementation by displaying a projected image or graphic (2212, 2214, 2216) in a real world space 2290 where the projected image or graphic is superimposed over a real-world view 2290 as perceived by the user through the lens elements of the smart phone 2202 or heads up display 2204.

In some implementations, the computer-generated graphics (2212, 2214, 2216) of the pervasive augmented environment 2200 can interact with a user's perceptions of a real-world environment 2290 using gestures (2206, 2208) or other body movements. In other implementations, a virtual object integrated into an augmented rendering of a real environment can be projected to a user of a smart phone 2202 or heads up display 2204. Motion information of a user body portion can be determined based at least in part upon sensory information received from imaging 102, 104 or acoustic or other sensory devices. Control information is communicated to a system based in part on a combination of the motion of the smart phone 2202 or heads up display 2204 and the detected motion of the user determined from the sensory information received from imaging 102, 104 or acoustic or other sensory devices. The virtual device experience can be augmented in some implementations by the addition of haptic, audio and/or other sensory information projectors. For example, with reference to FIG. 22, optional a video projector can project an image of a newspaper (e.g., virtual object 2212) superimposed in the living room 2290 of a user; thereby creating a virtual experience of reading an actual newspaper, even though no newspaper is present. In some implementations, an optional haptic projector can project the feeling of the texture of the "virtual newspaper" to the reader's finger. In other implementations, an optional audio projector can project the sound of a newspaper page turning in response to detecting the reader making a swipe to turn the newspaper page.

In other implementations, multiple virtual objects or virtual interaction spaces can be superimposed in a real world space to create an augmented experience for a user. In such an implementation, a gesture can be detected that selects one or more virtual objects or virtual interaction spaces in the pervasive augmented environment 2200. Further, subsequent gestures can be interpreted to virtually interact with the one or more selected virtual objects or virtual interaction spaces, as described above.

FIGS. 23A-E illustrate one implementation of interacting with marker images 2302 and 2314 on image board 2304 that trigger augmented illusions 2312 and 2316 in a pervasive virtual environment 2300A-E, when in the field of view 2315 of smart phone 2396's camera. In one implementation, a smart phone 2396 can detect one or more marker images or initialization signal sources in a real-world space and trigger augmented illusions 2312 and 2316 in response to the detection. In some implementations, one or more marker images or initialization signal sources are selected by a gesture performed by a user and interpreted by the smart phone 2396. Further, subsequent gestures can be detected to interact with the respective augmented illusions 2312 and 2316. In yet other implementations, paradigm setting gestures are detected that are specific to each of the generated augmented illusions 2312 and 2316 and uniquely control their responsiveness.

Figure 23A:
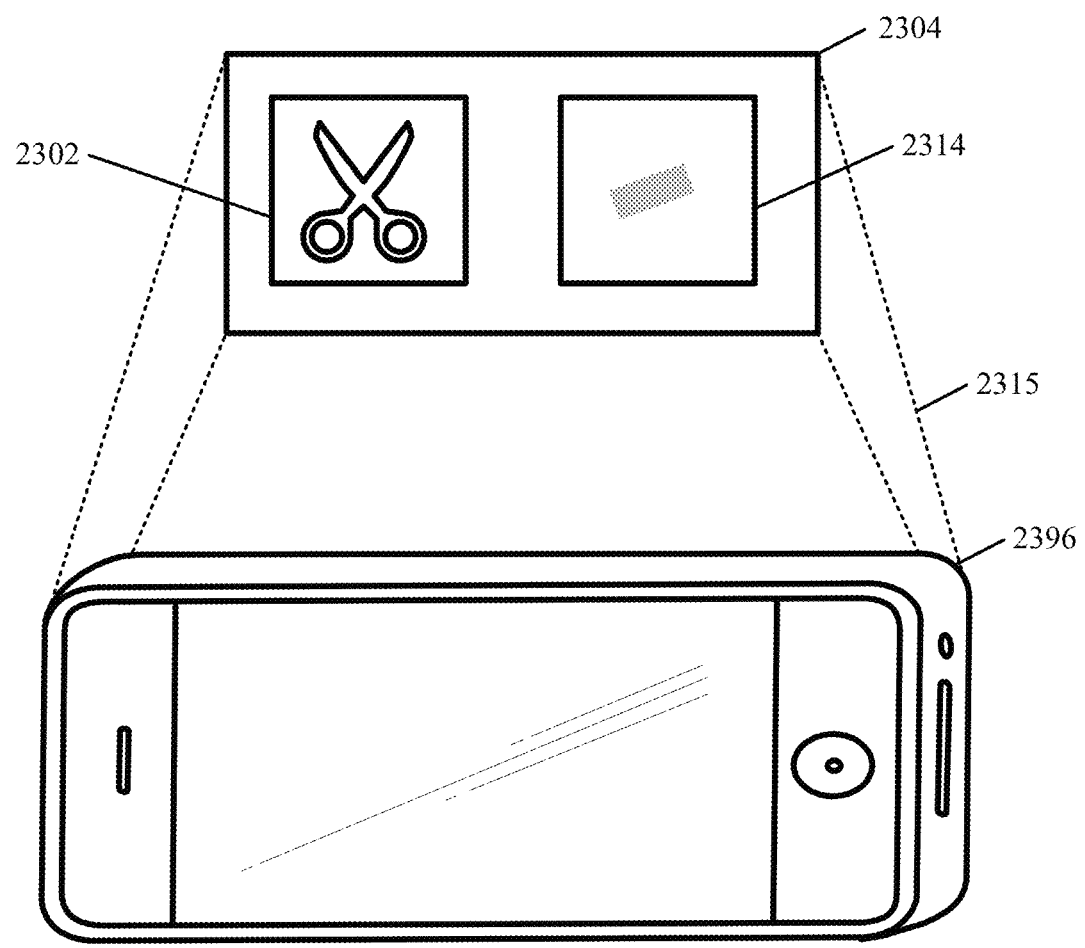
FIGS. 23A, 23B, 23C, 23D, and 23E illustrate one implementation of interacting with marker images that trigger augmented illusions in a pervasive virtual environment.
Figure 23B:
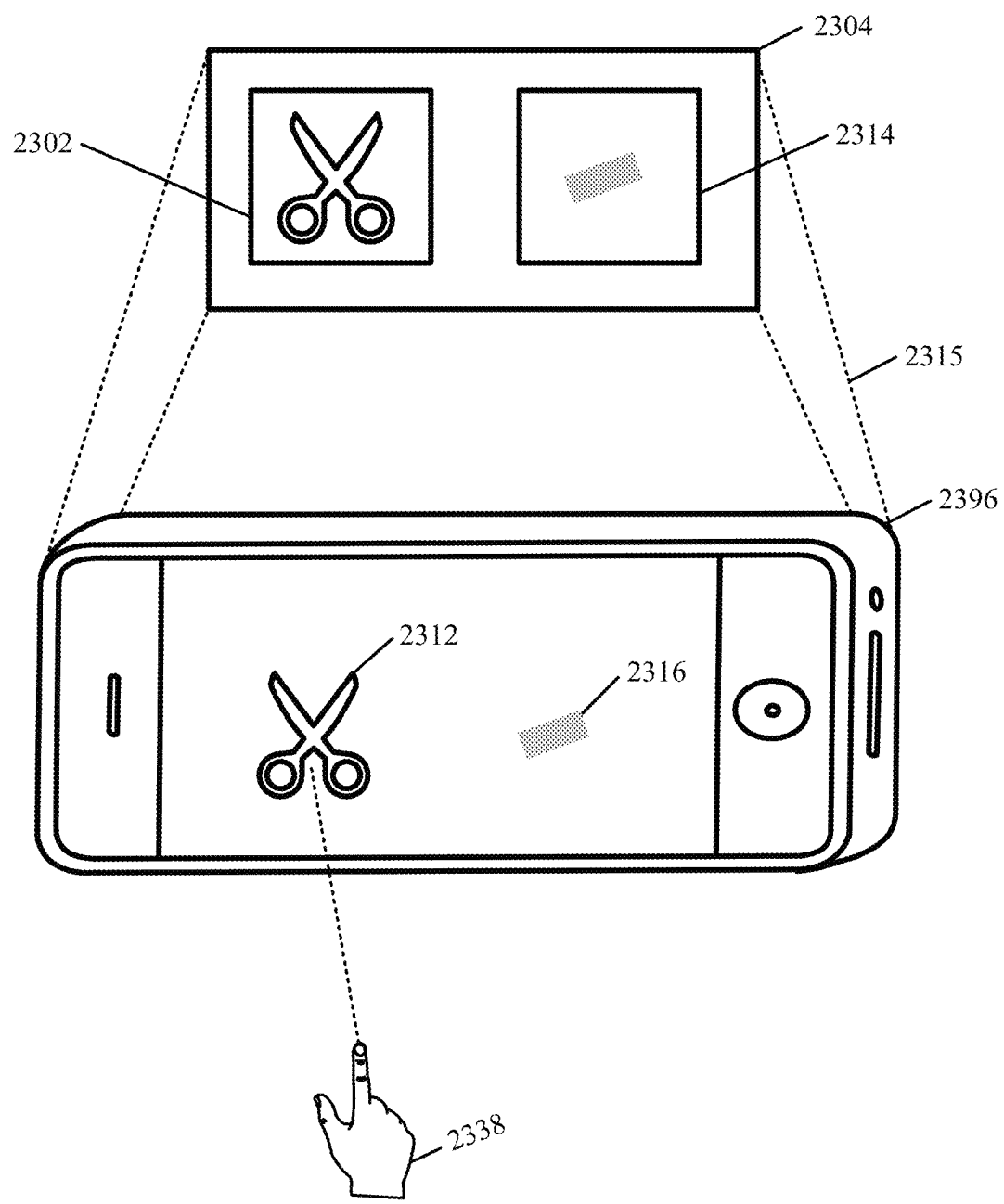
Figure 23C:
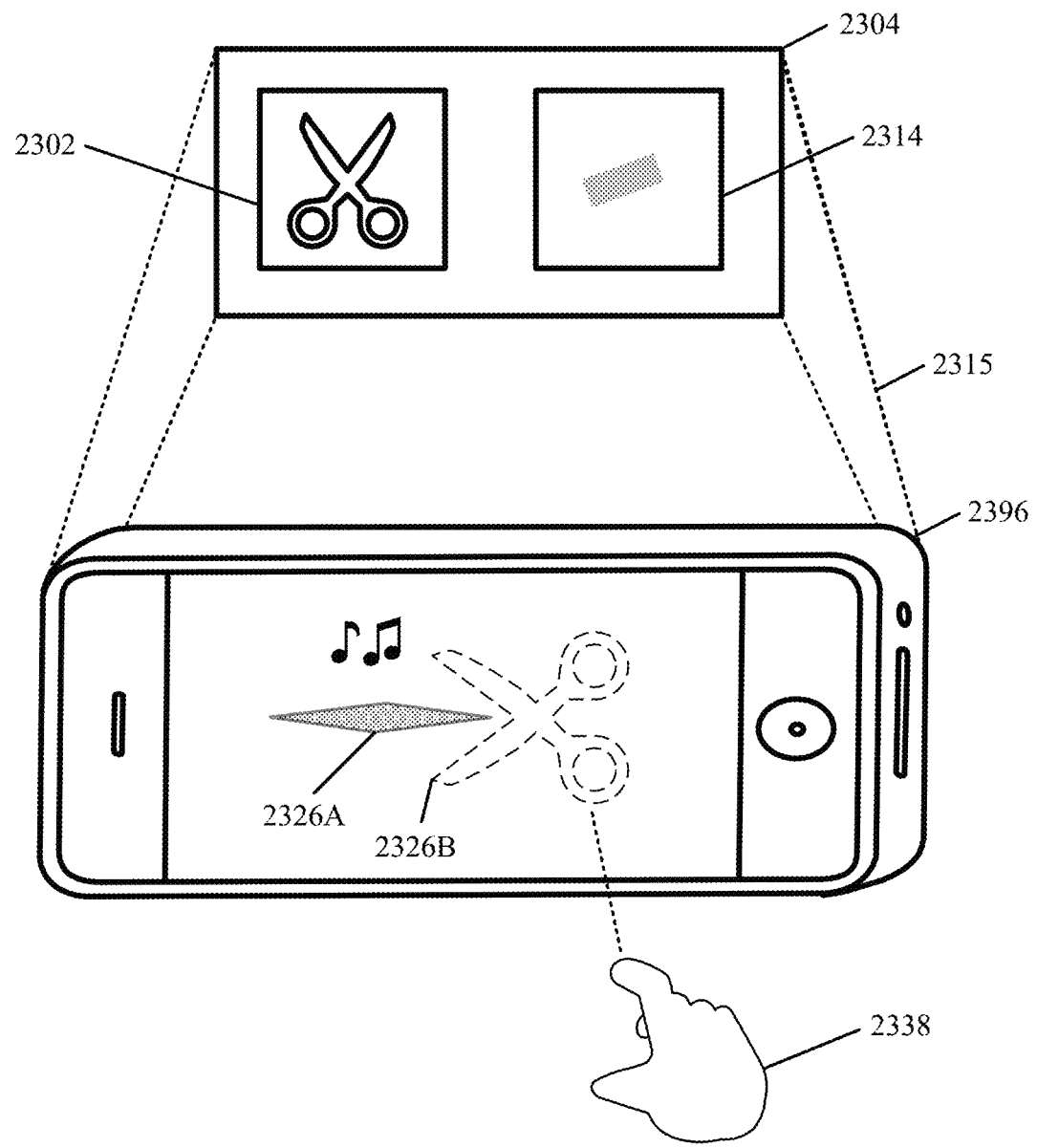
Figure 23D:
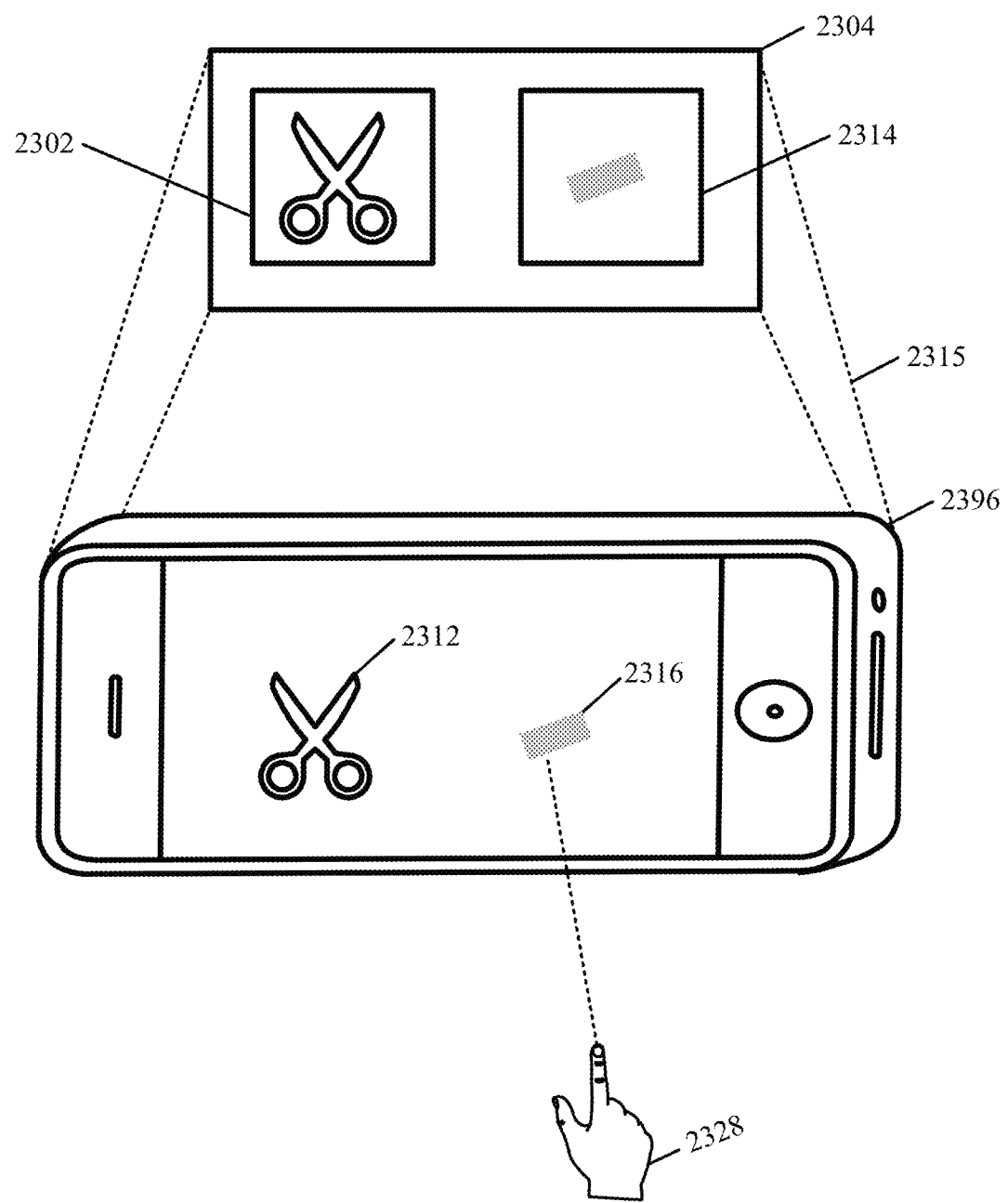
Figure 23E:
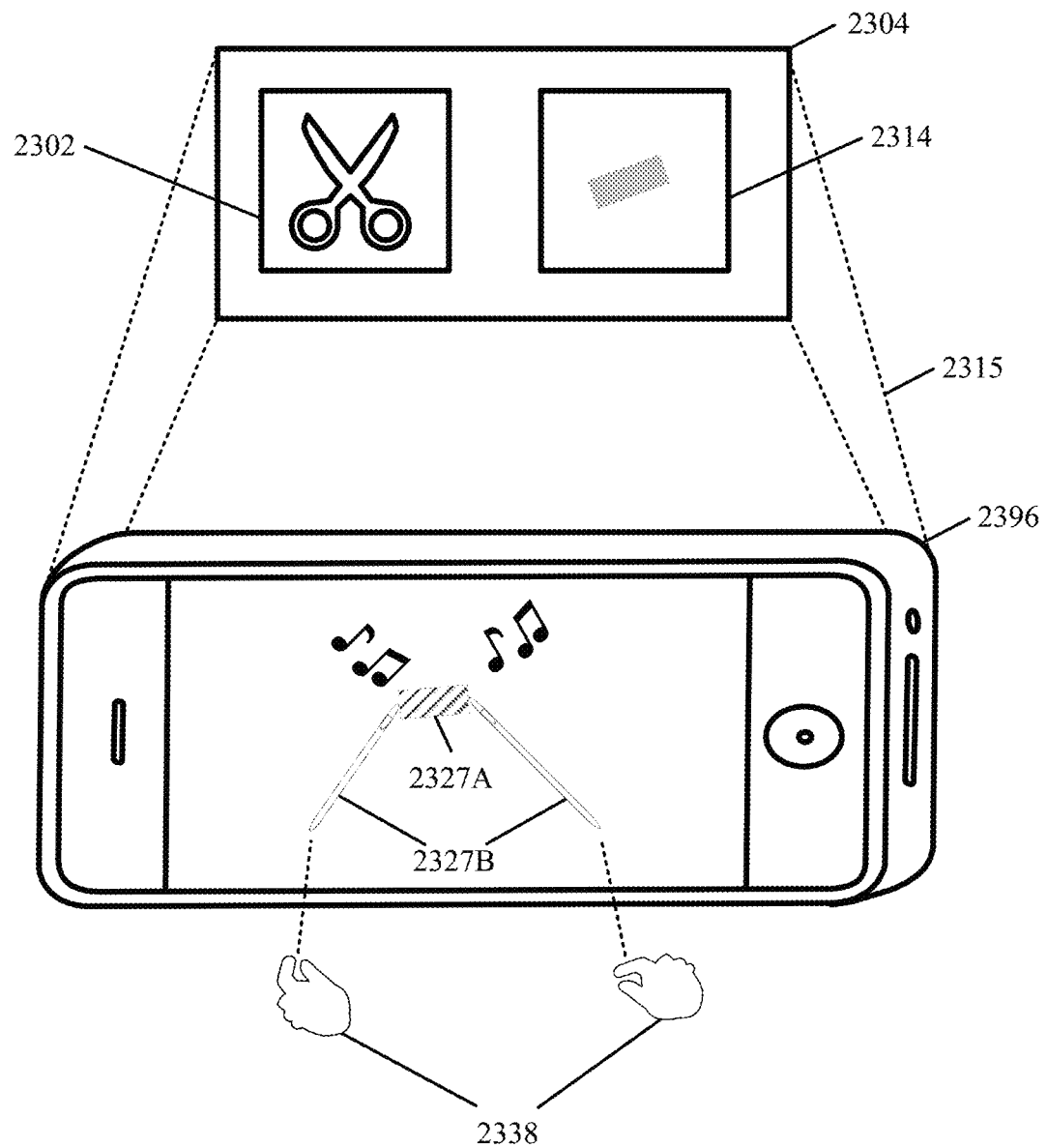

For example, as shown in FIGS. 23C-E, an image marker of a scissor 2302 and a drum pad 2314 are detected by the smart phone 2396. Further, a user performs a gesture 2338 such as a forward pointing finger to select one of the marker images. Once selected, a corresponding augmented illusion is generated for the selected marker image. Following this, a subsequent paradigm setting gesture 2338 is detected to set a context for interacting with the generated augmented illusion. In one instance, a twin-finger movement can mean cutting a virtual paper 2326A with the virtual scissor 2326B or drumming the virtual drum pad 2327A with virtual sticks 2327B.

Embedding Architectures

FIGS. 25A-I illustrate different implementations 2500A, 2500B, 2500C, 2500D, 2500E, 2500F, 2500G, 2500H, and 2500I of embedding a motion sensory control device in various devices. In one implementation, a motion sensory control device can be imbedded in various computing devices such as mobile or tablet accessories, notebooks, keyboards, AIOs, displays, TVs, STBs, or game consoles according to architectures show in FIGS. 25A-I.

Particular Implementations

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as pervasive computing environment, handheld mode, wide-area mode, augmented reality, embedding architectures, rigged hand, biometrics, etc.

These methods can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, these methods is described with reference to the system that carries out a method. The system is not necessarily part of the method.

Other implementations of the methods described in this section can include a non-transitory computer readable storage medium storing instructions executable by a processor to perform any of the methods described above. Yet another implementation of the methods described in this section can include a system including memory and one or more processors operable to execute instructions, stored in the memory, to perform any of the methods described above.

Some example implementations are listed below with certain implementations dependent upon the implementation to which they refer.

Some example implementations are listed below with certain implementations dependent upon the implementation to which they refer.

A method of selecting among devices to interact with includes using a smart phone equipped with a motion sensory control device that detects gestures in a three dimensional (3D) sensory space, detecting one or more heterogeneous devices that accept motion control commands; detecting a gesture in the 3D sensory space and interpreting the gesture as selecting one of the heterogeneous devices; and establishing a communication channel between the smart phone and the selected device.

One method implementation further includes creating data for display by the smart phone that identifies the heterogeneous devices and interpreting the gesture as selecting one of the identified heterogeneous devices.

Another method implementation further includes detecting one or more subsequent gestures, preprocessing them to reduce required bandwidth and sending the preprocessed gestures via the communication channel to the selected device.

A further method implementation further includes detecting a paradigm-setting gesture that sets a control paradigm used to preprocess one or more subsequent gestures to send to the selected device via the communications channel.

The on-screen responsiveness of the selected device to the subsequent gestures can be controlled based at least on the set control paradigm.

A still further method implementation further includes detecting a gesture in the 3D sensory space and automatically selecting a particular device from among the heterogeneous devices based at least on biometric information of a user performing the gesture.

The biometric information includes at least one of vein patterns, palm prints, and fingerprints of the user.

A method of selecting among devices in a living room to interact with includes using a smart phone equipped with a motion sensory control device that detects gestures in a three dimensional (3D) sensory space, detecting heterogeneous devices in a living room that accept motion control commands; detecting a voice command and interpreting the voice command as selecting one of the heterogeneous devices; and establishing a communication channel between the smart phone and the selected device.

One method implementation further includes detecting one or more gestures in the 3D sensory space, preprocessing them to reduce required bandwidth and sending the preprocessed gestures via the communication channel to the selected device.

Another method implementation further includes creating data for display by the smart phone that identifies the heterogeneous devices and interpreting the voice command as selecting one of the identified heterogeneous devices.

A further method implementation further includes detecting a paradigm-setting gesture that sets a control paradigm used to preprocess one or more gestures in the 3D sensory space to send to the selected device via the communications channel.

The on-screen responsiveness of the selected device to the gestures can be controlled based at least on the set control paradigm.

A method of selecting among devices in a living room to interact with includes using a smart phone equipped with a motion sensory control device that detects gestures in a three dimensional (3D) sensory space, detecting heterogeneous devices in a living room that accept motion control commands; creating data for display by the smart phone that identifies the heterogeneous devices and interpreting a touch command across the display as selecting one of the identified heterogeneous devices; and establishing a communication channel between the smart phone and the selected device.

One method implementation further includes detecting one or more gestures in the 3D sensory space, preprocessing them to reduce required bandwidth and sending the preprocessed gestures via the communication channel to the selected device.

Another method implementation further includes detecting a paradigm-setting gesture that sets a control paradigm used to preprocess one or more gestures in the 3D sensory space to send to the selected device via the communications channel.

The on-screen responsiveness of the selected device to the gestures can be controlled based at least on the set control paradigm.

A method of interacting with marker images that trigger augmented illusions includes using a smart phone equipped with a motion sensory control device that detects gestures in a three dimensional (3D) sensory space, detecting heterogeneous marker images that trigger augmented illusions in response to identification by the smart phone; detecting a gesture in the 3D sensory space and interpreting the gesture as selecting one of the heterogeneous marker images; and overlaying an augmented illusion rendered by the selected marker image on smart phone's display.

One method implementation further includes detecting one or more gestures in the 3D sensory space that alter responsiveness of contents displayed on the overlaid augmented illusion.

Another method implementation further includes detecting a paradigm-setting gesture that sets a control paradigm used to interpret one or more gestures in the 3D sensory space that manipulate the overlaid augmented illusion.

A method of operating a smart phone with reduced power consumption includes monitoring at least one physical parameter of a smart phone equipped with a motion sensory control device that detects gestures in a three dimensional (3D) sensory space; and in response to detection of a change in the physical parameter exceeding a specified threshold, automatically switching the smart phone from one operation mode to another. In implementations, the physical parameter is at least one of orientation, acceleration, velocity, angular acceleration, and angular velocity of the smart phone.

In some implementations, the physical parameter is monitored using at least one of an accelerometer, a gyroscope, magnetometers, and a tilt sensor.

One method implementation further includes switching the smart phone from one operation mode to another in response to a human specification.

Another method implementation further includes determining a hand-held mode of operation when the motion sensory control device is upright and moving; and switching the smart phone to the hand-held mode of operation.

A further method implementation further includes adjusting, in response to switching the smart phone to the hand-held mode of operation, one or more image-acquisition parameters of the motion sensory control device embedded in the smart phone; and acquiring image data in a sequence of digital image frames that capture an object of interest, compliant with the adjusted image-acquisition parameters.

The adjustable image-acquisition parameters can include frame size and frame capture rate.

In implementations adjusting the image-acquisition parameters includes at least reducing frame size by decreasing a number of digital image frames passed per unit time to a frame buffer that stores the digital image frames.

In some implementations adjusting the image-acquisition parameters includes at least reducing frame size by limiting image data acquisition to non-edge pixels.

In some implementations adjusting the image-acquisition parameters includes at least using a portion of frame buffer that stores digital image frames.

In some implementations adjusting the image-acquisition parameters includes at least reducing frame capture rate by decreasing a number of frames acquired per second.

A still further method implementation further includes adjusting, in response to switching the smart phone to the hand-held mode of operation, one or more image-analysis parameters of the motion sensory control device embedded in the smart phone; acquiring image data in a sequence of digital image frames that capture an object of interest; and analyzing the image frames, compliant with the adjusted image-analysis parameters, to detect the object and to approximate an object contour.

In implementations the adjustable image-analysis parameters include analysis algorithm and analysis density.

In some implementations adjusting the image-analysis parameters further include reducing frame size by resampling to a lower resolution.

In some implementations the analysis further includes approximating a plurality of closed curves across the detected object that collectively define an approximated object contour.

In some implementations the image-analysis parameter is a density of the closed curves.

In some implementations each of the digital image frames includes a sequence of data lines, at least one image-analysis parameter specifies a number of data lines analyzed per digital image frame in approximating an object contour.

In some implementations adjusting the image-analysis parameters includes at least analyzing a reduced amount of image data per digital image frame.

One method implementation further includes terminating, in response to switching the smart phone to the hand-held mode of operation, acquisition of image data.

Another method implementation further includes terminating, in response to switching the smart phone to the hand-held mode of operation, analysis of image data.

A further method implementation further includes determining a wide-area mode of operation when the motion sensory control device is laid flat and stationary in the 3D sensory space; and switching the smart phone to the wide-area mode of operation.

One method implementation further includes adjusting, in response to switching the smart phone to the wide-area mode of operation, one or more image-acquisition parameters of the motion sensory control device embedded in the smart phone; and acquiring image data in a sequence of digital image frames that capture an object of interest, compliant with the adjusted image-acquisition parameters.

In implementations the adjustable image-acquisition parameters include frame size and frame capture rate.

In some implementations adjusting the image-acquisition parameters includes at least spiking frame size by increasing a number of digital image frames passed per unit time to a framer buffer that stores the digital image frames.

In some implementations adjusting the image-acquisition parameters includes at least spiking frame size by extending image data acquisition to edge pixels.

In some implementations adjusting the image-acquisition parameters includes at least using an amplified portion of frame buffer that stores digital image frames.

In some implementations adjusting the image-acquisition parameters includes at least spiking frame capture rate by increasing a number of frames acquired per second.

One method implementation further includes adjusting, in response to switching the smart phone to the wide-area mode of operation, one or more image-analysis parameters of the motion sensory control device embedded in the smart phone; acquiring image data in a sequence of digital image frames that capture an object of interest; and analyzing the image frames, compliant with the adjusted image-analysis parameters, to detect the object and to approximate an object contour.

In implementations the adjustable image-analysis parameters include analysis algorithm and analysis density.

In some implementations adjusting the image-analysis parameters further include increasing frame size by resampling to a higher resolution.

In some implementations the analysis further includes approximating a plurality of closed curves across the detected object that collectively define an approximated object contour.

In some implementations the image-analysis parameter is a density of the closed curves.

In some implementations each of the digital image frames includes a sequence of data lines, at least one image-analysis parameter specifies a number of data lines analyzed per digital image frame in approximating the object contour.

In some implementations adjusting the image-analysis parameters includes at least analyzing an increased amount of image data per digital image frame.

One method implementation further includes initiating, in response to switching the smart phone to the wide-area mode of operation, acquisition of image data.

Another method implementation further includes initiating, in response to switching the smart phone to the wide-area mode of operation, analysis of image data.

A further method implementation further includes initiating, in response to switching the smart phone to the wide-area mode of operation and detecting a gesture in the 3D sensory space, acquisition of image data.

A still further method implementation further includes initiating, in response to switching the smart phone to the wide-area mode of operation and detecting a gesture in the 3D sensory space, analysis of image data.

A yet further method implementation further includes initiating, in response to switching the smart phone to the wide-area mode of operation, discovery of one or more devices to establish a communication channel between the smart phone and selected one of the discovered devices.

A yet still further method implementation further includes creating data for display by the smart phone that identifies the discovered one or more devices.

A yet still further method implementation further includes detecting a gesture in the 3D sensory space and interpreting the gesture as selecting one of the discovered devices.

A yet still further method implementation further includes detecting one or more subsequent gestures, preprocessing them to reduce required bandwidth and sending the preprocessed gestures via a communication channel to the selected device.

A yet still further method implementation further includes detecting a paradigm-setting gesture that sets a control paradigm used to preprocess one or more subsequent gestures to send to the selected device via a communications channel.

A yet still further method implementation further includes controlling on-screen responsiveness of the selected device to the subsequent gestures based at least on the set control paradigm.

A yet still further method implementation further includes determining a drift-compensation mode of operation when the motion sensory control device is moving; and switching the smart phone to the drift-compensation mode of operation.

A yet still further method implementation further includes distinguishing, in response to switching the smart phone to the drift-compensation mode of operation, motion information of the motion sensory control device from motion information of one or more objects of interest tracked using the motion sensory control device; and automatically accounting for motion information of the motion sensory control device in analysis of image data in a sequence of digital image frames that capture an object of interest.

A yet still further method implementation further includes detecting apparent position and orientation of the tracked object of interest caused by repositioning of the motion sensory control device; and calculating actual position and orientation of the tracked object of interest by digitally overlaying on each other an initial digital image frame and a final digital image frame.

In some implementations the initial digital image frame captures the object of interest immediately before the repositioning of the motion sensory control device.

In some implementations the final digital image frame captures the object of interest immediately following the repositioning of the motion sensory control device.

A method of selecting among devices to interact with includes using a smart phone equipped with a motion sensory control device that detects gestures in a three dimensional (3D) sensory space, detecting heterogeneous devices in a living room that accept motion control commands; calculating a level of proximity between the smart phone and the heterogeneous devices for each of the heterogeneous devices, wherein the level of proximity is based at least on received signal strength indicator (RSSI) of respective heterogeneous devices; automatically selecting a particular device with a highest level of proximity; and establishing a communication channel between the smart phone and the selected device.

One method implementation further includes detecting one or more subsequent gestures, preprocessing them to reduce required bandwidth and sending the preprocessed gestures via the communication channel to the selected device.

Another method of implementation further includes creating data for display by the smart phone that identifies the heterogeneous devices and interpreting the gesture as selecting one of the identified heterogeneous devices.

A further method of implementation further includes detecting a paradigm-setting gesture that sets a control paradigm used to preprocess one or more subsequent gestures to send to the selected device via the communications channel.

A still further method of implementation further includes controlling on-screen responsiveness of the selected device to the subsequent gestures based at least on the set control paradigm.

A method of selecting among devices to interact with includes using a smart phone equipped with a motion sensory control device that detects gestures in a three dimensional (3D) sensory space, detecting heterogeneous devices that accept motion control commands; calculating a level of proximity between the smart phone and the heterogeneous devices for each of the heterogeneous devices, wherein the level of proximity is based at least on positional information of the heterogeneous devices; automatically selecting a particular device with a highest level of proximity; and establishing a communication channel between the smart phone and the selected device.

One method implementation further includes determining positional information of the heterogeneous devices within the 3D sensory space by: broadcasting one or more emissions from each of the devices in an ordered scan pattern; detecting the emissions and recognizing the scan pattering being emitted using the motion control sensory device; calculating synchronization information about a reference point incorporated in the ordered scan pattern; and determining positional information about each of the devices based at least on information about one or more points of interest in the respective emissions and the synchronization information.

In implementations the synchronization information includes a correspondence between a reference point in space and timing information of an event in the ordered scan pattern that identifies when the event occurred at the reference point in space.

In implementations the event is a pulse in the ordered scan pattern.

In implementations the event is a pause in the ordered scan pattern.

In implementations the event is a cyclical restart in the ordered scan pattern.

One method implementation further includes determining positional information of each of the devices based at least on the ordered scan pattern by comparing at least one characteristic of a signal received by the smart phone with the timing information of the event in the ordered scan pattern for the reference point in space.

In implementations the characteristic of the signal is at least one of intensity, amplitude, frequency, polarization, and phase of the emission.

In implementations information about the points of interest includes peak amplitudes.

In implementations information about the points of interest includes frequency changes.

In implementations information about the points of interest includes phase changes.

Another method implementation further includes detecting a paradigm-setting gesture that sets a control paradigm used to preprocess one or more subsequent gestures to send to the selected device via the communications channel.

A further method implementation further includes controlling on-screen responsiveness of the selected device to the subsequent gestures based at least on the set control paradigm.

A method of selecting among devices to interact with includes using a smart phone equipped with a motion sensory control device that detects gestures in a three dimensional (3D) sensory space, detecting heterogeneous devices that accept motion control commands; automatically selecting a most frequently interacted device from among the heterogeneous devices; and establishing a communication channel between the smart phone and the selected device.

One method implementation further includes detecting one or more subsequent gestures, preprocessing them to reduce required bandwidth and sending the preprocessed gestures via the communication channel to the selected device.

Another method implementation further includes creating data for display by the smart phone that identifies the heterogeneous devices and interpreting the gesture as selecting one of the identified heterogeneous devices.

A further method implementation further includes detecting a paradigm-setting gesture that sets a control paradigm used to preprocess one or more subsequent gestures to send to the selected device via the communications channel.

A still further method implementation further includes controlling on-screen responsiveness of the selected device to the subsequent gestures based at least on the set control paradigm.

A method of selecting among devices to interact with includes using a smart phone equipped with a motion sensory control device that detects gestures in a three dimensional (3D) sensory space, detecting heterogeneous devices that accept motion control commands; automatically selecting a most recently interacted device from among the heterogeneous devices; and establishing a communication channel between the smart phone and the selected device.

One method implementation further includes detecting one or more subsequent gestures, preprocessing them to reduce required bandwidth and sending the preprocessed gestures via the communication channel to the selected device.

Another method implementation further includes creating data for display by the smart phone that identifies the heterogeneous devices and interpreting the gesture as selecting one of the identified heterogeneous devices.

A further method implementation further includes detecting a paradigm-setting gesture that sets a control paradigm used to preprocess one or more subsequent gestures to send to the selected device via the communications channel.

A still further method implementation further includes controlling on-screen responsiveness of the selected device to the subsequent gestures based at least on the set control paradigm.

A method of selecting among devices to interact with includes using a smart phone equipped with a motion sensory control device that detects gestures in a three dimensional (3D) sensory space, detecting heterogeneous devices that accept motion control commands; automatically selecting a particular device from among the heterogeneous devices based at least on a pre-determined user specification; and establishing a communication channel between the smart phone and the selected device.

In implementations the pre-determined user specification identifies a particular device and time specific information to automatically select the device at a user-specified time.

One method implementation further includes detecting one or more subsequent gestures, preprocessing them to reduce required bandwidth and sending the preprocessed gestures via the communication channel to the selected device.

Another method implementation further includes creating data for display by the smart phone that identifies the heterogeneous devices and interpreting the gesture as selecting one of the identified heterogeneous devices.

A further method implementation further includes detecting a paradigm-setting gesture that sets a control paradigm used to preprocess one or more subsequent gestures to send to the selected device via the communications channel.

A still further method implementation further includes controlling on-screen responsiveness of the selected device to the subsequent gestures based at least on the set control paradigm.

A yet further method implementation further includes identifying at least one geo-location of the selected device; and sending gestures detected by the smart phone, in a localized format determined based at least on the identified geo-location, to the selected device via the communications channel.

A yet still further method implementation further includes translating the detected gestures into speech voiced in a language local to the identified geo-location of the selected device; and sending the speech to the selected device.

A yet still further method implementation further includes translating the detected gestures into text written in a language local to the identified geo-location of the selected device; and sending the text to the selected device.

A yet still further method implementation further includes translating the detected gestures into speech voiced in a language specified by a user; and sending the speech to the selected device.

A yet still further method implementation further includes translating the detected gestures into text written in a language specified by a user; and sending the text to the selected device.

A method of selecting among devices to interact with includes using a smart phone equipped with a motion sensory control device that detects gestures in a three dimensional (3D) sensory space, detecting heterogeneous devices that accept motion control commands; automatically selecting a particular device from among the heterogeneous devices based at least on a time of day; and establishing a communication channel between the smart phone and the selected device.

One method implementation further includes automatically selecting an appliance from the heterogeneous devices when the time of day is morning.

Another method implementation further includes automatically selecting a computing device from the heterogeneous devices when the time of day is midday.

A further method implementation further includes automatically selecting an entertainment device from the heterogeneous devices when the time of day is evening.

A still further method implementation further includes detecting one or more subsequent gestures, preprocessing them to reduce required bandwidth and sending the preprocessed gestures via the communication channel to the selected device.

A yet further method implementation further includes creating data for display by the smart phone that identifies the heterogeneous devices and interpreting the gesture as selecting one of the identified heterogeneous devices.

A yet still further method implementation further includes detecting a paradigm-setting gesture that sets a control paradigm used to preprocess one or more subsequent gestures to send to the selected device via the communications channel.

A yet still further method implementation further includes controlling responsiveness of the selected device to the subsequent gestures based at least on the set control paradigm.

A method of gesturally interacting with devices that lack gestural responsiveness includes using a smart phone equipped with a motion sensory control device that detects gestures in a three dimensional (3D) sensory space, detecting one or more heterogeneous devices that are unresponsive to motion control commands; detecting a gesture in the 3D sensory space and interpreting the gesture as selecting one of the devices; and establishing a communication channel between the smart phone and the selected device.

One method implementation further includes identifying a library of analogous gestures that are analogous to control manipulations performed using standard input commands accepted by the devices; detecting a gesture in a 3D sensory space and identifying the gesture from the library of analogous gestures; and supplying a signal to the selected device that mimics a standard input command based at least on the detected and identified gesture.

Another method implementation further includes populating the library of analogous gestures by: receiving a selection from a user of a control manipulation performed using the standard input command accepted by the selected device; prompting the user to perform a gesture; and assigning the gesture as analogous to the selected control manipulation and updating the library of analogous gestures to include the assigned gesture.

In an implementation performance of identified gestures from the library of analogous gestures causes on-screen responsiveness produced by respective control manipulations performed using the standard input command acceptable by the selected device.

A further method implementation further includes creating data for display by the smart phone that identifies the devices and interpreting the gesture as selecting one of the identified devices.

A yet further method implementation further includes detecting one or more subsequent gestures, preprocessing them to reduce required bandwidth and sending the preprocessed gestures via the communication channel to the selected device.

A yet still further method implementation further includes detecting a paradigm-setting gesture that sets a control paradigm used to preprocess one or more subsequent gestures to send to the selected device via the communications channel.

A yet still further method implementation further includes controlling on-screen responsiveness of the selected device to the subsequent gestures based at least on the set control paradigm.

A method of gesturally interacting with devices that lack gestural interfaces includes using a smart phone equipped with a motion sensory control device that detects gestures in a three dimensional (3D) sensory space, detecting one or more heterogeneous appliances that are unresponsive to motion control commands and lack gestural interfaces; detecting a gesture in the 3D sensory space and interpreting the gesture as selecting one of the appliances; and establishing a communication channel between the smart phone and the selected appliance.

One method implementation further includes creating data for display by the smart phone that identifies a library of analogous gestures that are analogous to control manipulations performed using standard input commands accepted by the appliances; detecting a gesture in a 3D sensory space and identifying the gesture from the library of analogous gestures; and supplying a signal to the selected appliance that mimics a standard input command based at least on the detected and identified gesture.

In an implementation the data for display created by the smart phone are dedicated to a particular appliance such that the analogous gestures are analogous to control manipulations performed using standard input commands accepted by the particular appliance.

One method implementation further includes populating the library of analogous gestures by: receiving a selection from a user of a control manipulation performed using the standard input command accepted by the selected device; prompting the user to perform a gesture; and assigning the gesture as analogous to the selected control manipulation and updating the library of analogous gestures to include the assigned gesture.

In an implementation performance of identified gestures from the library of analogous gestures causes responsiveness produced by respective control manipulations performed using the standard input command acceptable by the selected appliance.

Another method implementation further includes creating data for display by the smart phone that identifies the appliances and interpreting the gesture as selecting one of the identified appliances.

A further method implementation further includes detecting one or more subsequent gestures, preprocessing them to reduce required bandwidth and sending the preprocessed gestures via the communication channel to the selected appliance.

A still further method implementation further includes detecting a paradigm-setting gesture that sets a control paradigm used to preprocess one or more subsequent gestures to send to the selected appliance via the communications channel.

A yet further method implementation further includes controlling responsiveness of the selected appliance to the subsequent gestures based at least on the set control paradigm.

A yet still further method implementation further includes pointing the smart phone towards a particular appliance such that the particular appliance in a field of view of the smart phone; and automatically identifying the particular appliance as selected one of the heterogeneous appliances for gestural interaction.

A yet still further method implementation further includes broadcasting device identity tokens from the heterogeneous appliances over an ultra-short-range communication channel, wherein the device identity tokens are accepted by the smart phone; and automatically identifying a particular appliance as selected one of the heterogeneous appliances for gestural interaction based at least on device information included in a device identity token broadcasted by the particular appliance.

A yet still further method implementation further includes exchanging the device identity tokens between the heterogeneous appliances and the smart phone over the ultra-short-range communication channel by tapping the smart phone against the appliances.

In some implementations the device information included in the device identity token specifies a pre-determined time to automatically select the device.

In some implementations the device information included in the device identity token specifies a control paradigm to control responsiveness of the particular appliance to gestures detected in the 3D sensory space.

A method of selecting among heterogeneous devices to interact with includes using a smart phone equipped with a motion sensory control device that detects gestures in a three dimensional (3D) sensory space, detecting one or more heterogeneous devices that are unresponsive to motion control commands; receiving a standard input command that performs one or more control manipulations on a particular device; identifying the particular device as selected one of the devices responsive to the control manipulations; and establishing a communication channel between the smart phone and the selected device.

One method implementation further includes identifying the particular device as selected one of the devices responsive to the control manipulations when a count of standard input commands exceeds a specified threshold.

Another method implementation further includes identifying the particular device as selected one of the devices responsive to the control manipulations when a count of the control manipulations exceeds a specified threshold.

In some implementations the standard input command is an optical command.

In some implementations the standard input command is a haptic command.

In some implementations the standard input command is an audio command.

In some implementations the standard input command is a signal generated by a standard input device.

A further method implementation further includes detecting one or more subsequent gestures, preprocessing them to reduce required bandwidth and sending the preprocessed gestures via the communication channel to the selected device.

A yet further method implementation further includes detecting a paradigm-setting gesture that sets a control paradigm used to preprocess one or more subsequent gestures to send to the selected device via the communications channel.

A still further method implementation further includes controlling responsiveness of the selected device to the subsequent gestures based at least on the set control paradigm.

A method of selecting among devices to interact with includes using a smart phone equipped with a motion sensory control device that detects gestures in a three dimensional (3D) sensory space, detecting one or more heterogeneous devices that accept motion control commands; detecting a gesture in the 3D sensory space and automatically selecting a particular device from among the heterogeneous devices based at least on biometric information of a user performing the gesture; and establishing a communication channel between the smart phone and the selected device.

In implementations the biometric information includes at least one of vein patterns, palm prints, and fingerprints of the user.

One method implementation further includes, responsive to identifying the user based on the biometric information, setting a user-specific control paradigm to interpret one or more subsequent gestures from the user, wherein the user-specific control paradigm controls responsiveness of the selected device.

Another method implementation further includes controlling authorization to interact with heterogeneous devices based on identity of the user determined by the biometric information.

A further method implementation further includes, responsive to identifying a user based on the biometric information, setting a role-specific control paradigm to interpret one or more subsequent gestures from the user, wherein the user-specific control paradigm controls responsiveness of the selected device.

In implementations the role-specific control paradigm is based on at least one of job function, title, department, industry type, and pre-determined designation of the user.

A still further method implementation further includes creating data for display by the smart phone that identifies the heterogeneous devices and interpreting the gesture as selecting one of the identified heterogeneous devices.

A yet further method implementation further includes detecting one or more subsequent gestures, preprocessing them to reduce required bandwidth and sending the preprocessed gestures via the communication channel to the selected device.

A yet still further method implementation further includes detecting a paradigm-setting gesture that sets a control paradigm used to preprocess one or more subsequent gestures to send to the selected device via the communications channel.

A yet still further method implementation further includes controlling on-screen responsiveness of the selected device to the subsequent gestures based at least on the set control paradigm.

A method of distinguishing between users issuing gestural commands in a pervasive three dimensional (3D) sensory environment includes using at least one motion sensory control system that detects gestures in a pervasive three dimensional (3D) sensory environment, detecting one or more heterogeneous devices that accept motion control commands; detecting multiple users in the 3D sensory environment and identifying each of the users based at least on their respective biometric information; and determining gesture control paradigms specific to each of the identified users and interpreting gestures from the users based on the determined gesture control paradigms, wherein the gesture control paradigms control responsiveness of the heterogeneous devices.

One method implementation further includes automatically selecting a particular device from among the heterogeneous devices for each of the identified users to interact with based on respective preferences of the users.

In some implementations the user preferences specify a pre-determined time to automatically select a particular device from among the heterogeneous devices.

In some implementations the biometric information includes at least one of vein patterns, palm prints, and fingerprints of the user.

In some implementations the motion sensory control system is embedded in a portable device.

In some implementations the motion sensory control system includes one or more motion sensory control devices.

A method of distinguishing control gestures from proximate non-control gestures in a pervasive three dimensional (3D) sensory space includes detecting a set of gestures performed by different users in a pervasive 3D sensory environment and identifying control gestures in the set of gestures that control responsiveness of one of more devices in the 3D sensory space by: (i) determining a dominant user from among the users based at least on one or more spatial behaviors of the users in the 3D sensory space; and (ii) triggering a response to gestures performed by the dominant user without triggering a response to gestures performed by the non-dominant users.

In implementations the spatial behaviors include positions of the users in the 3D sensory space.

In some implementations the spatial behaviors include postures of the users in the 3D sensory space.

In some implementations the spatial behaviors include voice frequencies of the users in the 3D sensory space.

In some implementations the spatial behaviors include lengths of speech of the users in the 3D sensory space.

One method implementation further includes identifying non-dominant users based at least on one or more spatial behaviors of the users in the 3D sensory space.

A method of selecting among virtual interaction modalities to interact with includes using a smart phone to trigger an augmented environment based on detection of an initialization signal, wherein the augmented environment includes one or more virtual interaction modalities that are integrated into an augmented rendering of physical space and accept motion control commands; detecting a gesture in the 3D sensory space using a motion sensory control device embedded in the smart phone; interpreting the gesture as selecting one of the virtual interaction modalities; and establishing a communication channel between the smart phone and the selected virtual interaction modality.

In implementations the initialization signal is generated by a marker image in the physical space.

In some implementations the initialization signal is generated by a spatial element of the physical space.

One method implementation further includes creating data for display by the smart phone that identifies the virtual interaction modalities and interpreting the gesture as selecting one of the identified virtual interaction modalities.

Another method implementation further includes detecting a haptic command in the 3D sensory space and interpreting the haptic command as selecting one of the virtual interaction modalities.

A further method implementation further includes detecting a vocal command in the 3D sensory space and interpreting the vocal command as selecting one of the virtual interaction modalities.

A still further method implementation further includes detecting an optical command in the 3D sensory space and interpreting the optical command as selecting one of the virtual interaction modalities.

A yet further method implementation further includes detecting a gesture in the 3D sensory space and automatically selecting a particular virtual interaction modality from among the virtual interaction modalities based at least on biometric information of a user performing the gesture.

In implementations the biometric information includes at least one of vein patterns, palm prints, and fingerprints of the user.

One method implementation further includes calculating a level of proximity between the smart phone and the virtual interaction modalities for each of the virtual interaction modalities, wherein the level of proximity is based at least on positional information of the virtual interaction modalities; and automatically selecting a particular virtual interaction modality with a highest level of proximity.

Another method implementation further includes automatically selecting a particular virtual interaction modality based at least on a time of day.

A further method implementation further includes automatically selecting a most frequently interacted virtual interaction modality from among the virtual interaction modalities.

A still further method implementation further includes automatically selecting a most recently interacted virtual interaction modality from among the virtual interaction modalities.

A yet further method implementation further includes detecting a paradigm-setting gesture that sets a control paradigm specific to the selected virtual interaction modality.

A yet still further method implementation further includes controlling responsiveness of the selected virtual interaction modality to subsequent gestures based at least on the set control paradigm.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

The invention claimed is:

1. A method of selecting among devices to interact with, the method including:
capturing, using a smart phone equipped with a motion sensory control device that detects gestures made by a hand moving freely in at least three dimensions in a three dimensional (3D) sensory space, a series of temporally sequential images of the hand as it moves;
automatically detecting, by the smart phone, multiple heterogeneous external devices that (i) are external to the smart phone and the motion sensory control device and (ii) accept motion control commands;
detecting, in images of the hand as captured, a first gesture made in the 3D sensory space;
interpreting the detected first gesture as selecting a first selected external device from the multiple heterogeneous external devices;
establishing a communication channel with which motion control commands are exchanged between the smart phone and the first selected external device;
detecting a paradigm-setting gesture that identifies one of the first selected external device and a second selected external device; and
processing a subsequent gesture in the 3D sensory space to send a motion control command to the one of the first and second selected external devices identified by the paradigm-setting gesture.

2. The method of claim 1, further including creating data for display by the smart phone that identifies the heterogeneous external devices and interpreting the subsequent gesture made in the 3D sensory space as selecting the one of the first and second selected external devices identified from the data.

3. The method of claim 1, further including detecting one or more subsequent gestures, processing the subsequent gestures, thereby reducing bandwidth needed to send motion control information, and sending the gestures via a communication channel to the one of the first and second selected external devices.

4. The method of claim 1, wherein the detected paradigm-setting gesture sets a control paradigm, and wherein the method further comprises using the control paradigm to process one or more subsequent gestures to send to the one of the first and second selected external devices.

5. The method of claim 4, further including controlling on-screen responsiveness of the one of the first and second selected external devices to one or more subsequent gestures based at least on the control paradigm.

6. The method of claim 1, further including detecting a gesture in the 3D sensory space and automatically selecting a particular external device selected from among the multiple heterogeneous external devices that accepts motion control commands based at least on biometric information determined from a hand of a user while performing the gesture.

7. The method of claim 6, wherein the biometric information is determined from at least one of vein patterns, palm prints, and fingerprints of the hand.

8. The method of claim 1, further including:
detecting, by the smart phone equipped with a motion sensory control device that detects gestures in a three dimensional (3D) sensory space, a second gesture in the 3D sensory space and interpreting the detected second gesture as selecting the second selected external device from the multiple heterogeneous external devices; and
establishing a second communication channel with which motion control commands are exchanged between the smart phone and the second selected external device.

9. The method of claim 8, further including creating data for display by the smart phone that identifies the first selected external device and the second selected external device and interpreting a gesture as selecting one of the communication channel and the second communication channel.

10. The method of claim 1, further including controlling on-screen responsiveness of the one of the first and second selected external devices to subsequent gestures, based at least on the paradigm-setting gesture.

11. A non-transitory machine readable storage medium storing instructions which when executed by a processor perform:
capturing, using a smart phone equipped with a motion sensory control device that detects gestures made by a hand moving freely in at least three dimensions in a three dimensional (3D) sensory space, a series of temporally sequential images of the hand as it moves;
automatically detecting, by the smart phone, multiple heterogeneous external devices that (i) are external to the smart phone and the motion sensory control device and (ii) accept motion control commands;
detecting, in images of the hand as captured, a first gesture in the 3D sensory space;
interpreting the first detected gesture as selecting a first selected external device from the multiple heterogeneous external devices;
establishing a communication channel with which motion control commands are exchanged between the smart phone and the first selected external device;
detecting, by the smart phone equipped with a motion sensory control device that detects gestures in a three dimensional (3D) sensory space, a second gesture in the 3D sensory space;
interpreting the detected second gesture as selecting a second selected external device from the multiple heterogeneous external devices;
establishing a second communication channel with which motion control commands are exchanged between the smart phone and the second selected external device; and
detecting a paradigm-setting gesture that identifies one of the first and second selected external devices, and processing a subsequent gesture in the 3D sensory space to send a motion control command to one of the first and second selected external devices identified by the paradigm-setting gesture.

12. A system, including:

a processor;

an interface with a motion sensory control device that detects gestures in a three dimensional (3D) sensory space; and a memory storing instructions which when executed by a processor perform:

automatically detecting multiple heterogeneous external devices that (i) are external to the system and (ii) accept motion control commands;

detecting, using the motion sensory control device that detects gestures made by a hand moving freely in at least three dimensions in a three dimensional (3D) sensory space, a first gesture in the 3D sensory space by capturing a series of temporally sequential images of the hand as it moves;

interpreting the detected first gesture as selecting a first selected external device from the multiple heterogeneous external devices;

establishing a communication channel with which motion control commands are exchanged between the system and the first selected external device;

detecting, using the motion sensory control device that detects gestures made by a hand moving freely in at least three dimensions in a three dimensional (3D) sensory space, a second gesture in the 3D sensory space by capturing a series of temporally sequential images of the hand as it moves captured using cameras of the motion sensory control device;

interpreting the detected second gesture as selecting a second selected external device from the multiple heterogeneous external devices;

establishing a second communication channel with which motion control commands are exchanged between the system and the second selected external device; and detecting a paradigm-setting gesture that identifies one of the first and second selected external devices, and processing a subsequent gesture in the 3D sensory space to send a motion control command to one of the first and second selected external devices identified by the paradigm-setting gesture.

* * * * *